(12) United States Patent
Ramaswamy

(10) Patent No.: US 11,655,924 B2
(45) Date of Patent: May 23, 2023

(54) QUICK DISCONNECT COUPLING

(71) Applicant: Parker-Hannifin Corporation, Cleveland, OH (US)

(72) Inventor: Nagarajan Ramaswamy, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 209 days.

(21) Appl. No.: 17/263,407

(22) PCT Filed: Aug. 6, 2019

(86) PCT No.: PCT/US2019/045249
§ 371 (c)(1),
(2) Date: Jan. 26, 2021

(87) PCT Pub. No.: WO2020/033370
PCT Pub. Date: Feb. 13, 2020

(65) Prior Publication Data
US 2021/0310594 A1    Oct. 7, 2021

Related U.S. Application Data

(60) Provisional application No. 62/717,146, filed on Aug. 10, 2018.

(51) Int. Cl.
*F16L 29/04* (2006.01)
*F16L 37/34* (2006.01)
*F16L 37/35* (2006.01)
(52) U.S. Cl.
CPC ............... *F16L 29/04* (2013.01); *F16L 37/34* (2013.01); *F16L 37/35* (2013.01)
(58) Field of Classification Search
CPC ............ F16L 29/04; F16L 37/35; F16L 37/32
See application file for complete search history.

(56) References Cited

U.S. PATENT DOCUMENTS 2,453,389 A * 11/1948 Thomas ................. F16L 29/04
137/614.03
2,884,981 A * 5/1959 Wurzburger ............ F16L 29/04
285/91

(Continued)

FOREIGN PATENT DOCUMENTS

| EP | 1837580 A1 | 9/2007 |
| EP | 2505899 A1 | 10/2012 |
| GB | 1152093 | 5/1969 |

OTHER PUBLICATIONS

International Search Report and Written Opinion dated Nov. 6, 2019 for corresponding International Application PCT/US2019/045249.

(Continued)

*Primary Examiner* — David Colon-Morales
(74) *Attorney, Agent, or Firm* — Renner, Otto, Boisselle & Sklar, LLP

(57) ABSTRACT

A coupling having a male nipple (12) and a female coupler (14), in which one or both of the coupling members provides a simplified construction with a reduced number of parts for minimizing assembly time and overall costs. The coupling member(s) may include unique interlocking elements (38, 49), such as flexible finger elements, that slidably secure the valve sleeve(s) to the valve bodies. The female coupler (14) may include a valve body (23) with a unique interface, such as interlocking teeth, for rotatably coupling to a thread sleeve (51). The thread sleeve (51) may have a bendable web for facilitating assembly of a spring for an actuating sleeve. The actuating sleeve may be formed with a hollow annular internal chamber. The male nipple (12) may include the actuating sleeve instead of the female coupler (14). Other features also may be optimized, such as via additive manufacturing techniques, including coupling threads, fluid orifices, biasing members, and seal members.

24 Claims, 28 Drawing Sheets

(56) References Cited

U.S. PATENT DOCUMENTS

| | | | | |
|---|---|---|---|---|
| 2,898,963 | A * | 8/1959 | Courtot | F16L 29/04 285/85 |
| 3,446,245 | A * | 5/1969 | Snyder, Jr. | F16L 15/008 285/276 |
| 3,706,318 | A * | 12/1972 | Baniadam | F16L 29/04 251/149.4 |
| 4,543,993 | A | 10/1985 | Calvin et al. | |
| 4,674,535 | A * | 6/1987 | de Menibus | F16L 29/04 251/282 |
| 4,949,745 | A * | 8/1990 | McKeon | F16L 37/23 137/15.09 |
| 5,546,984 | A * | 8/1996 | Arcaro | G03G 15/0886 137/614 |
| 6,024,124 | A * | 2/2000 | Braun | F16L 37/35 137/614.04 |
| 6,158,717 | A | 12/2000 | Van Scyoc et al. | |
| 6,170,522 | B1 * | 1/2001 | Tanida | F16L 29/04 137/614.04 |
| 6,523,863 | B2 | 2/2003 | Ishiwata | |
| 7,111,641 | B2 * | 9/2006 | Marban | F16L 55/1026 137/614.03 |
| 7,575,024 | B2 * | 8/2009 | Zeiber | F16L 29/04 251/149.6 |
| 7,762,279 | B2 * | 7/2010 | Zeiber | F16L 29/04 251/149.6 |
| 9,080,712 | B2 * | 7/2015 | Tiberghien | F16L 37/23 |
| 9,217,524 | B2 * | 12/2015 | Nick | F16L 29/04 |
| 9,279,529 | B2 * | 3/2016 | Zhang | F16L 37/148 |
| 9,879,811 | B2 | 1/2018 | Gennasio et al. | |
| 10,619,786 | B2 * | 4/2020 | Jenski | F16L 57/04 |
| 2012/0241021 | A1 * | 9/2012 | Nick | F16L 29/04 137/614.06 |

OTHER PUBLICATIONS

Written Opinion of the IPOEA dated Aug. 3, 2020 for corresponding International Application PCT/US2019/045249.

International Report on Patentability dated Dec. 15, 2020 for corresponding International Application PCT/US2019/045249.

* cited by examiner

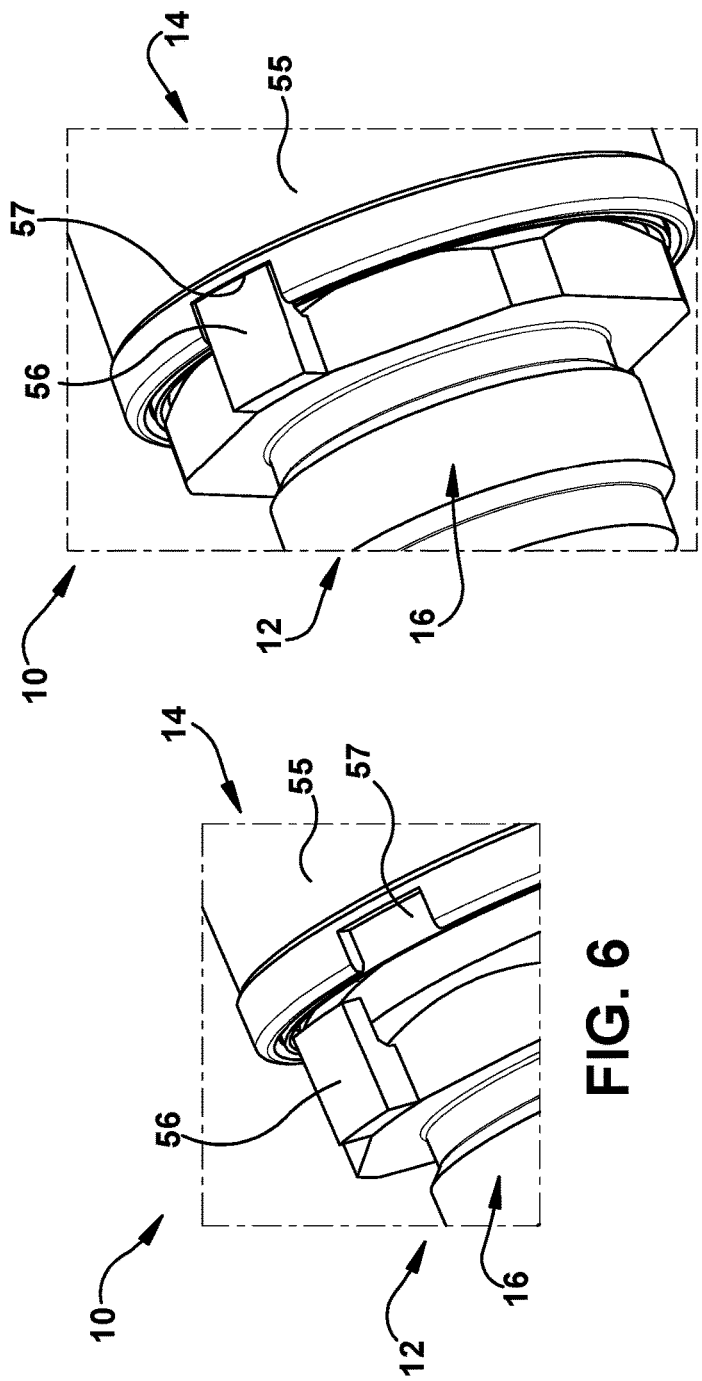
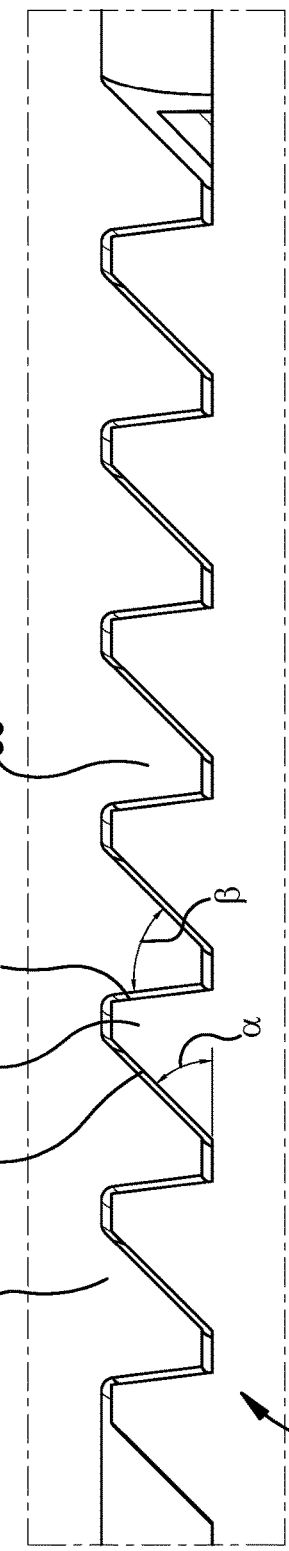
FIG. 6
FIG. 7
FIG. 8

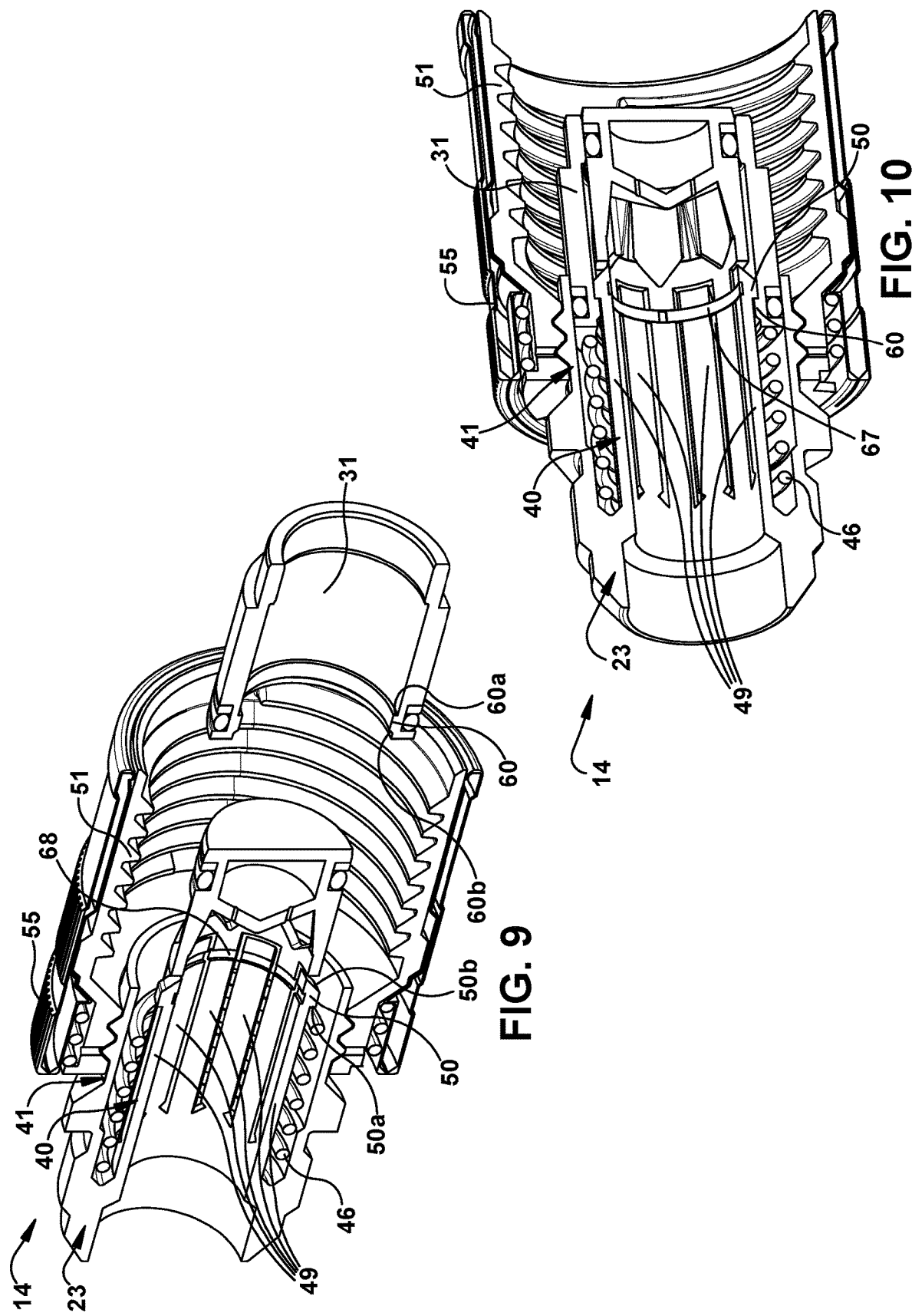

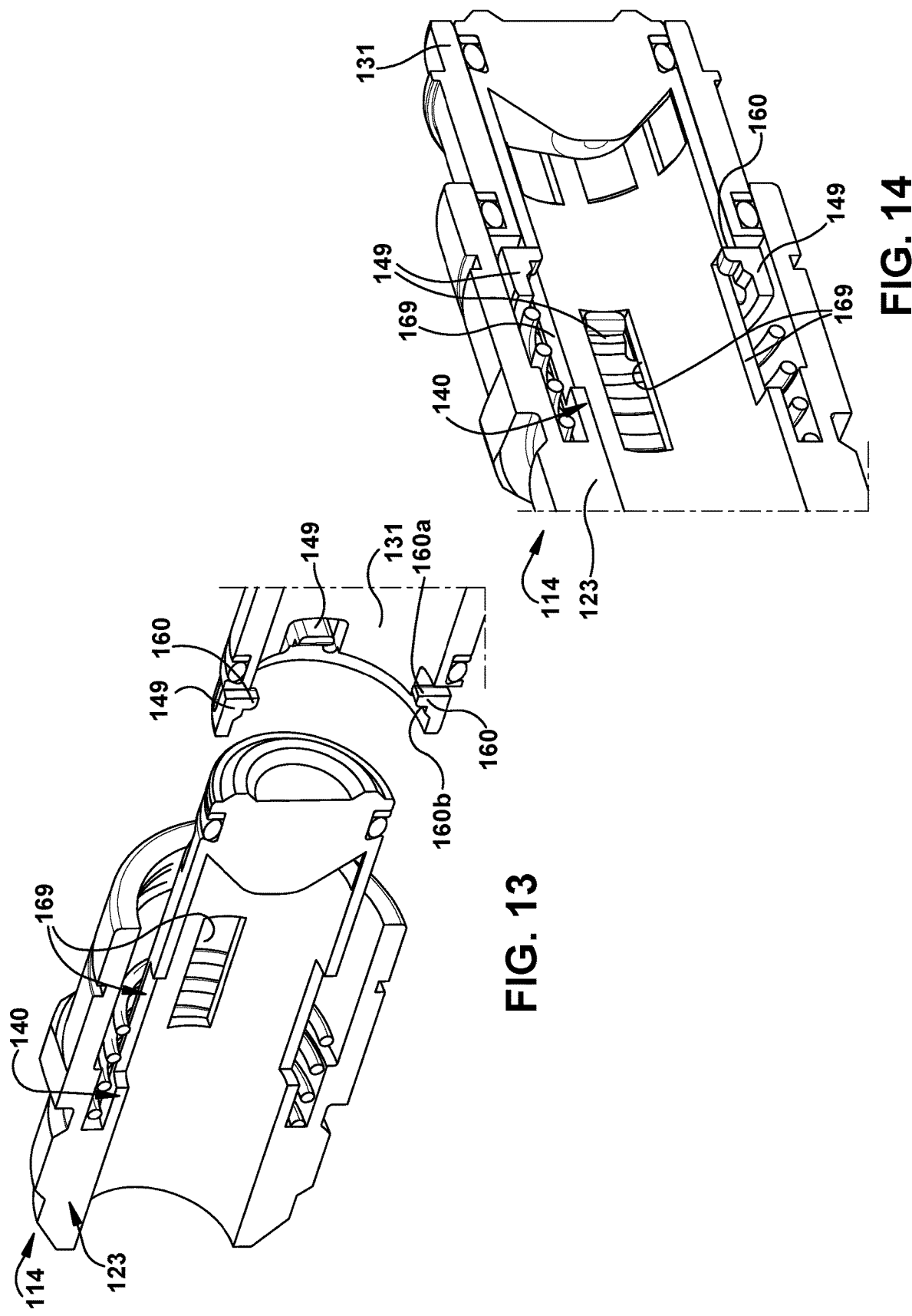

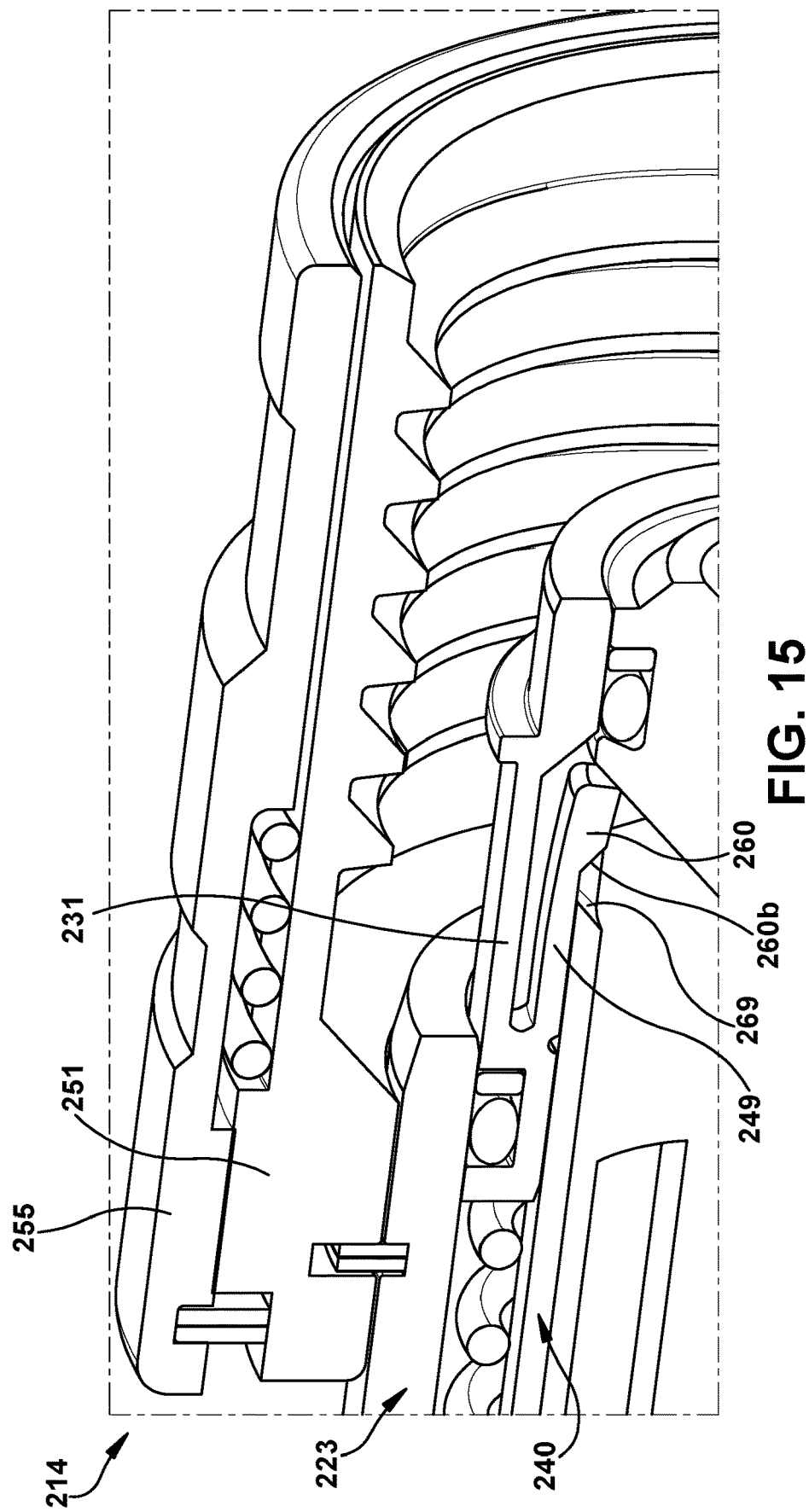

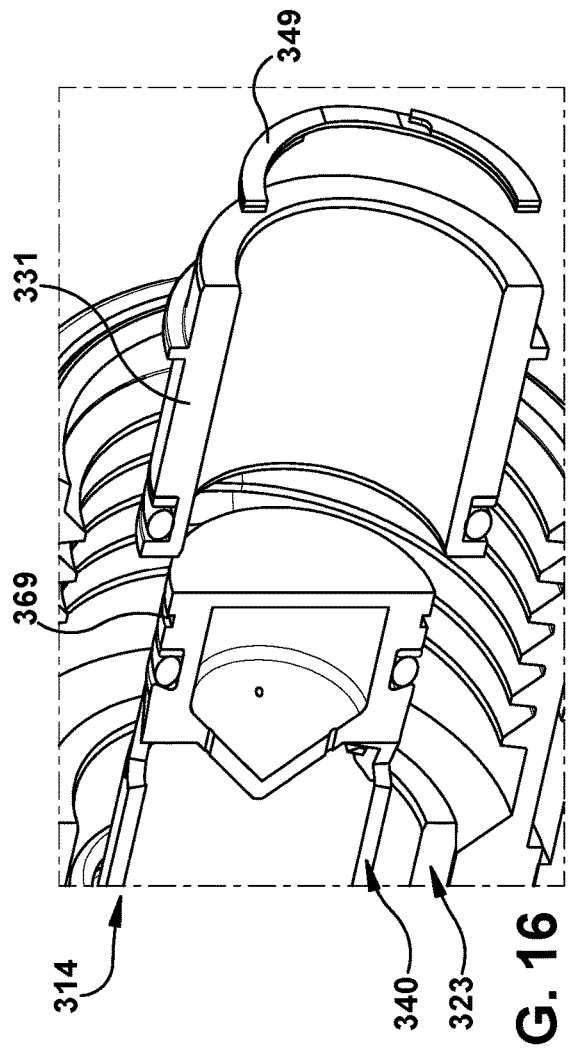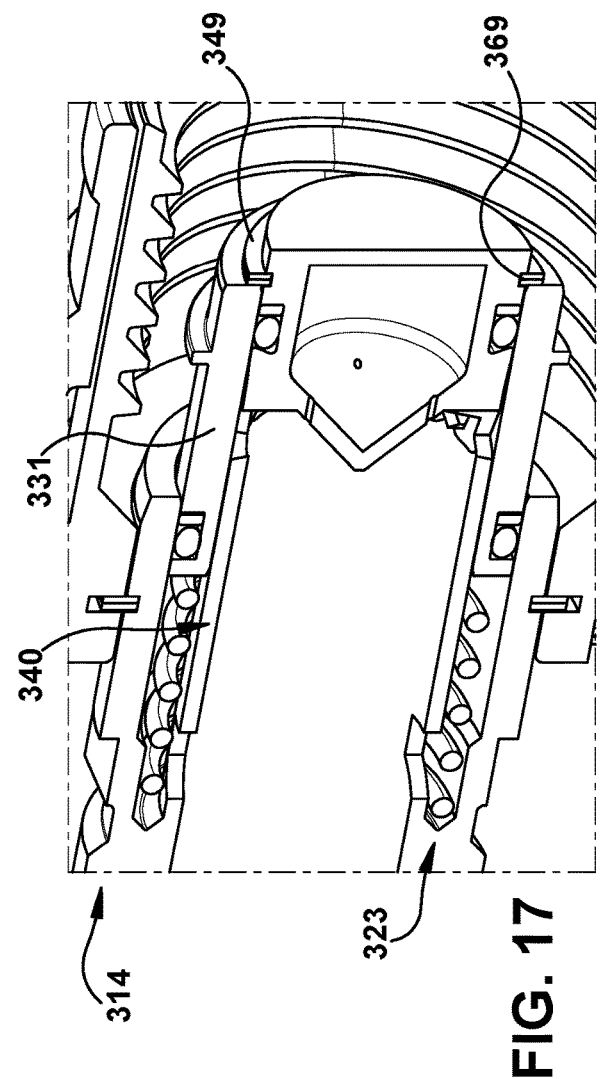

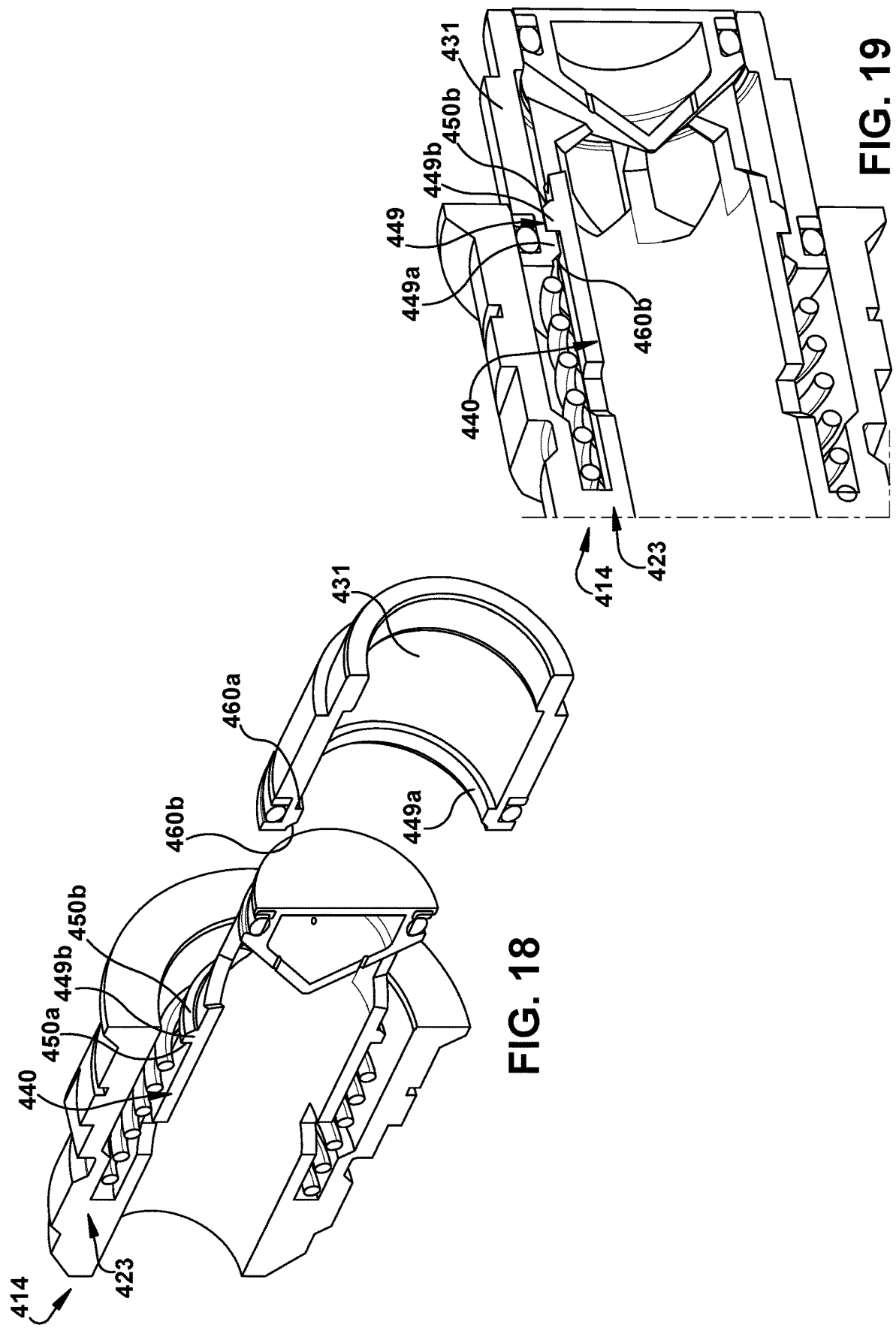

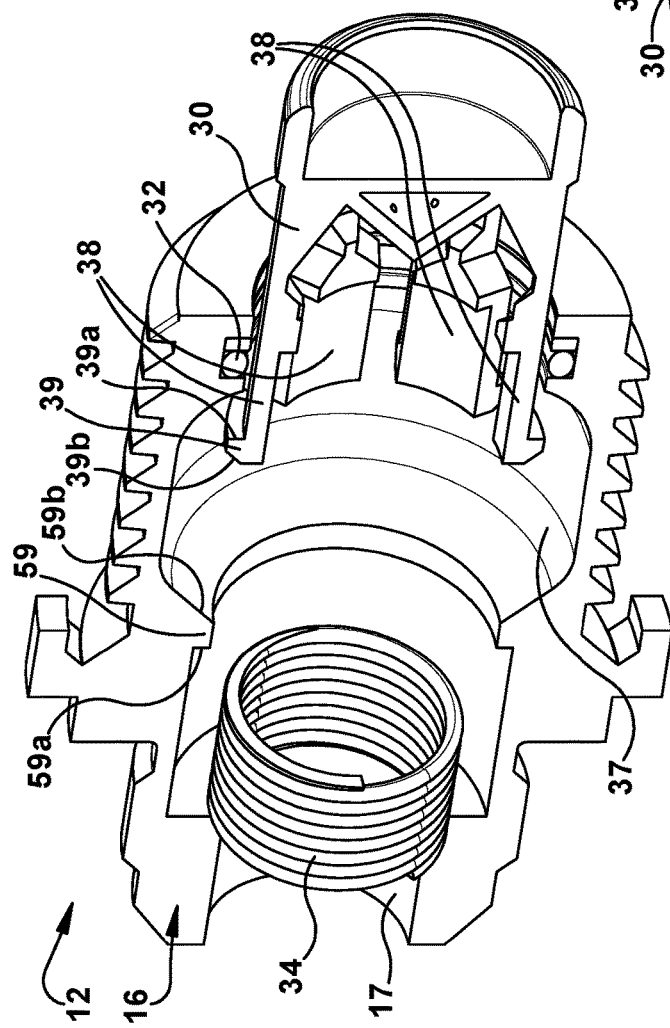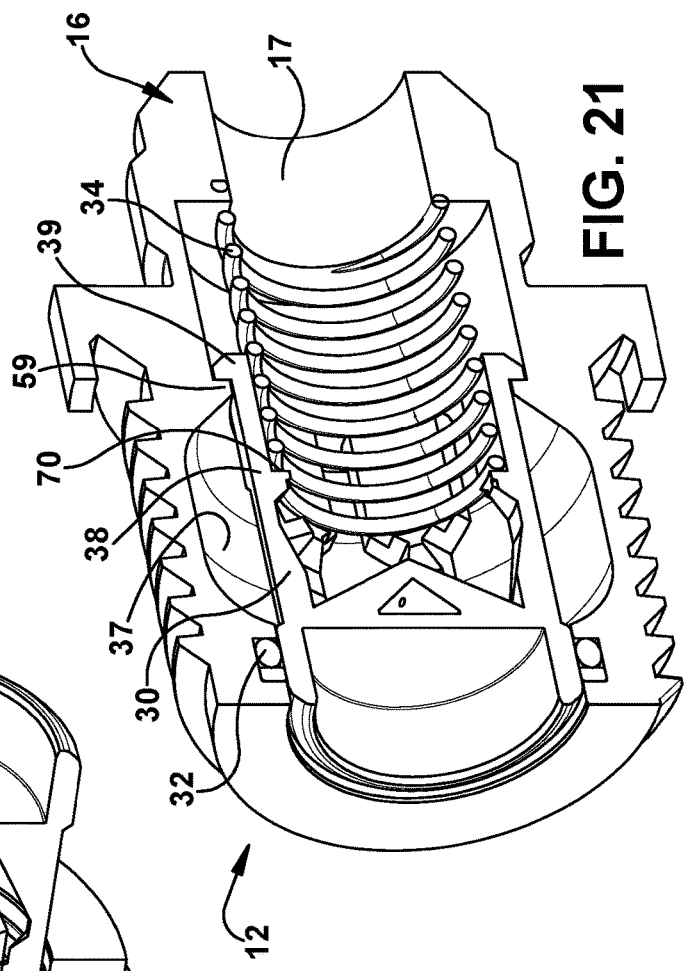

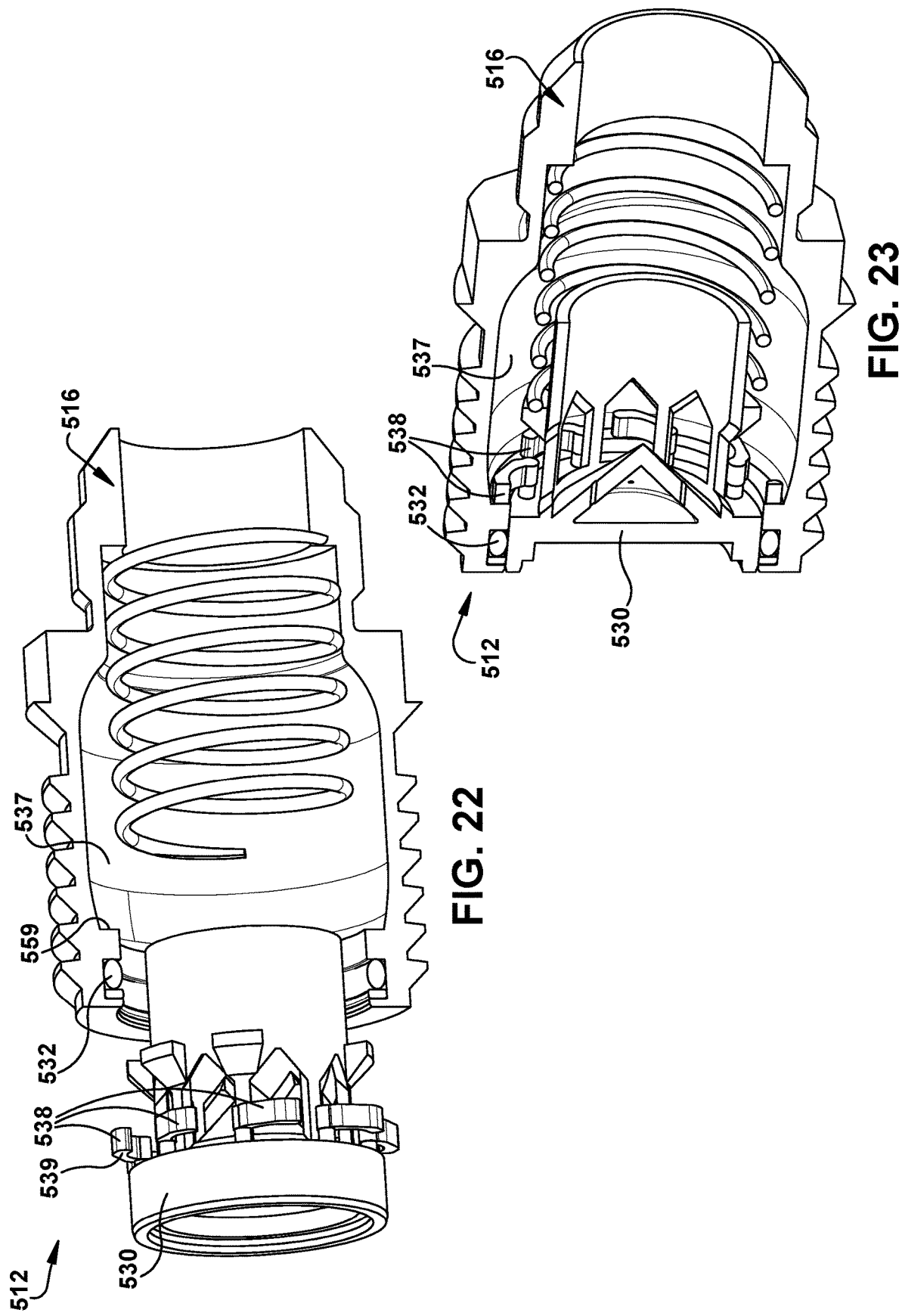

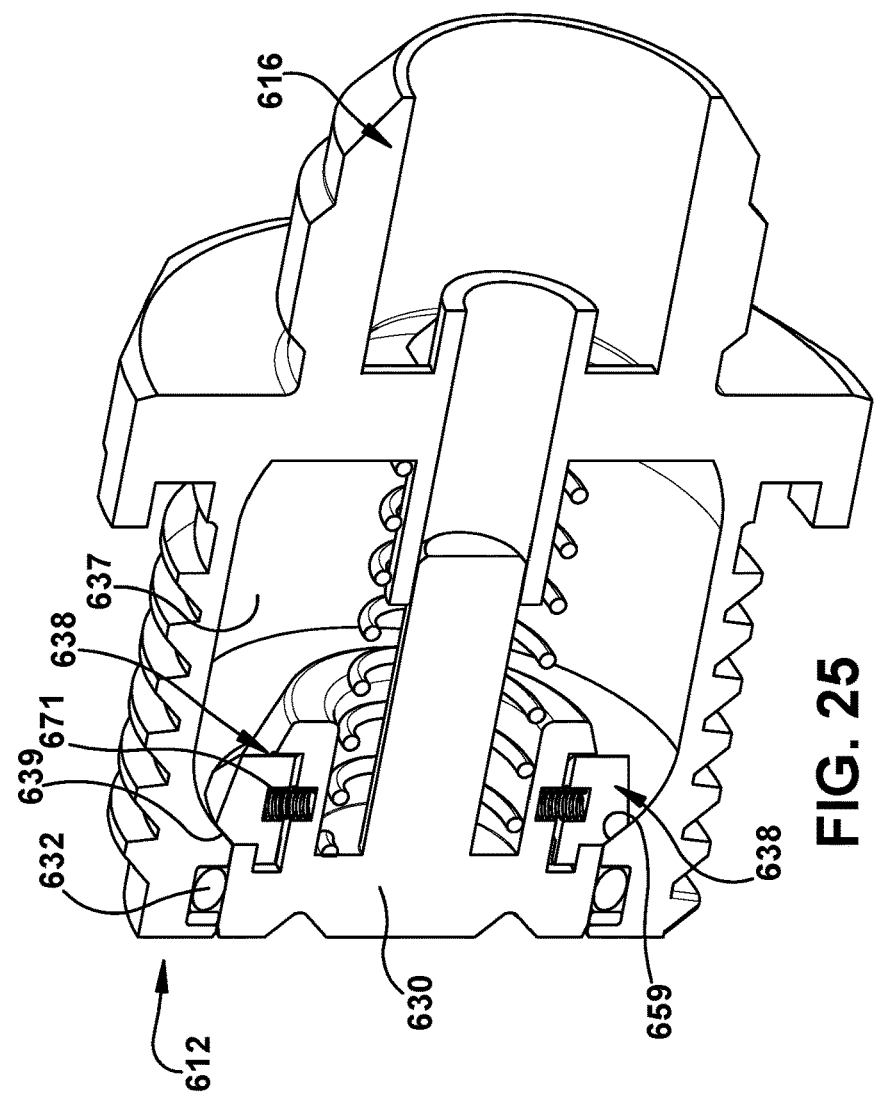
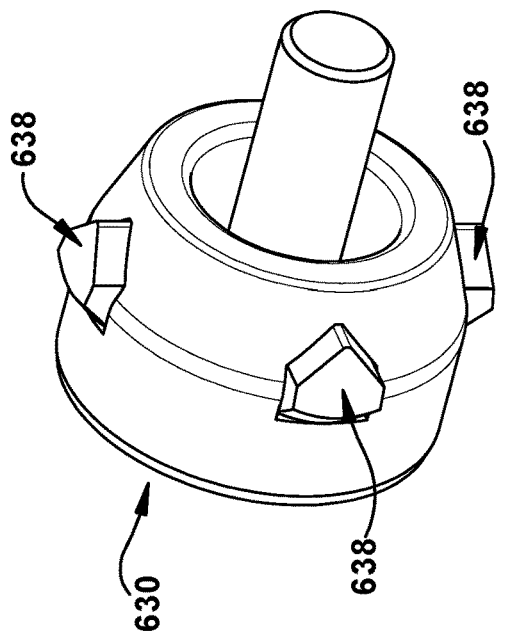
FIG. 25
FIG. 24

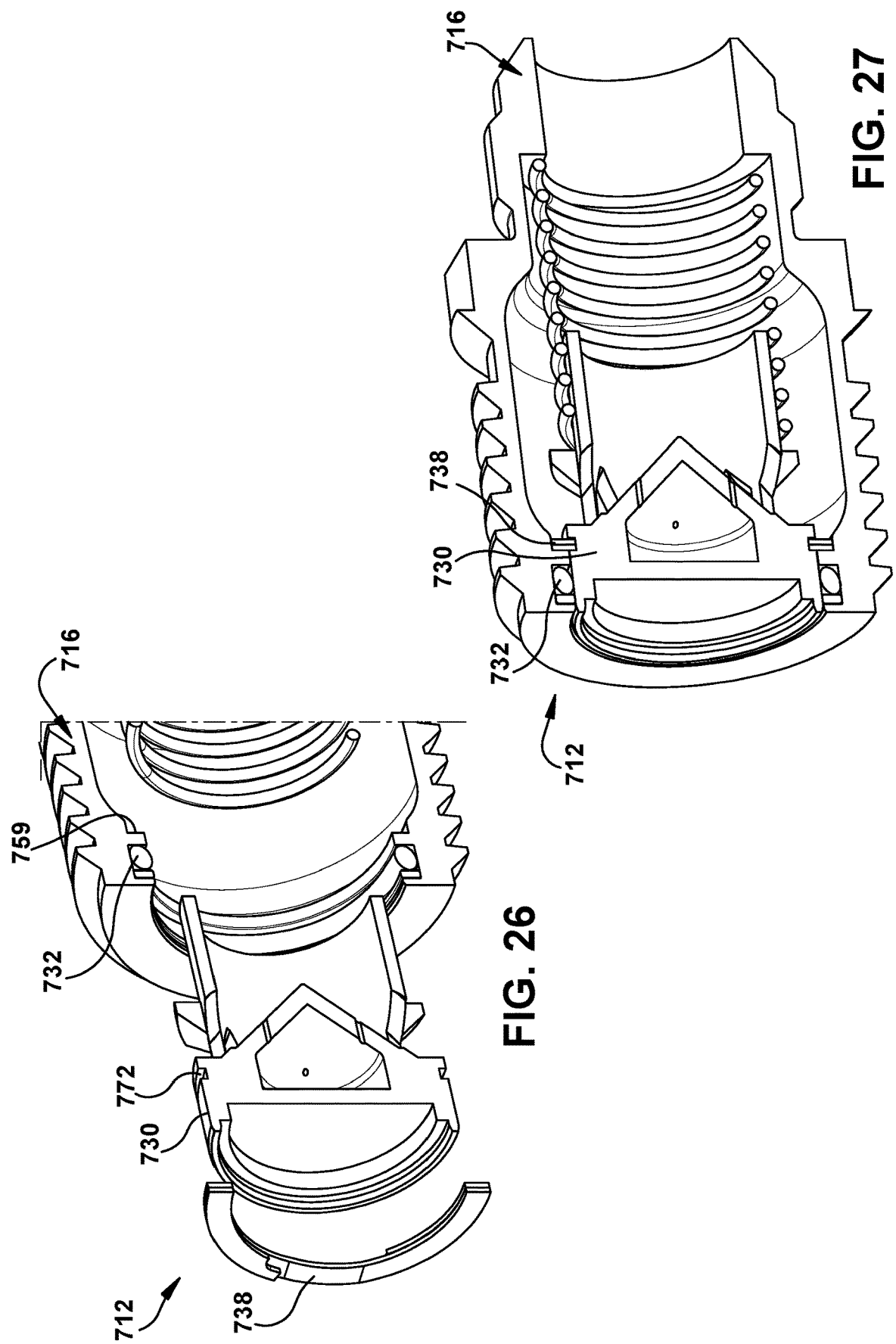

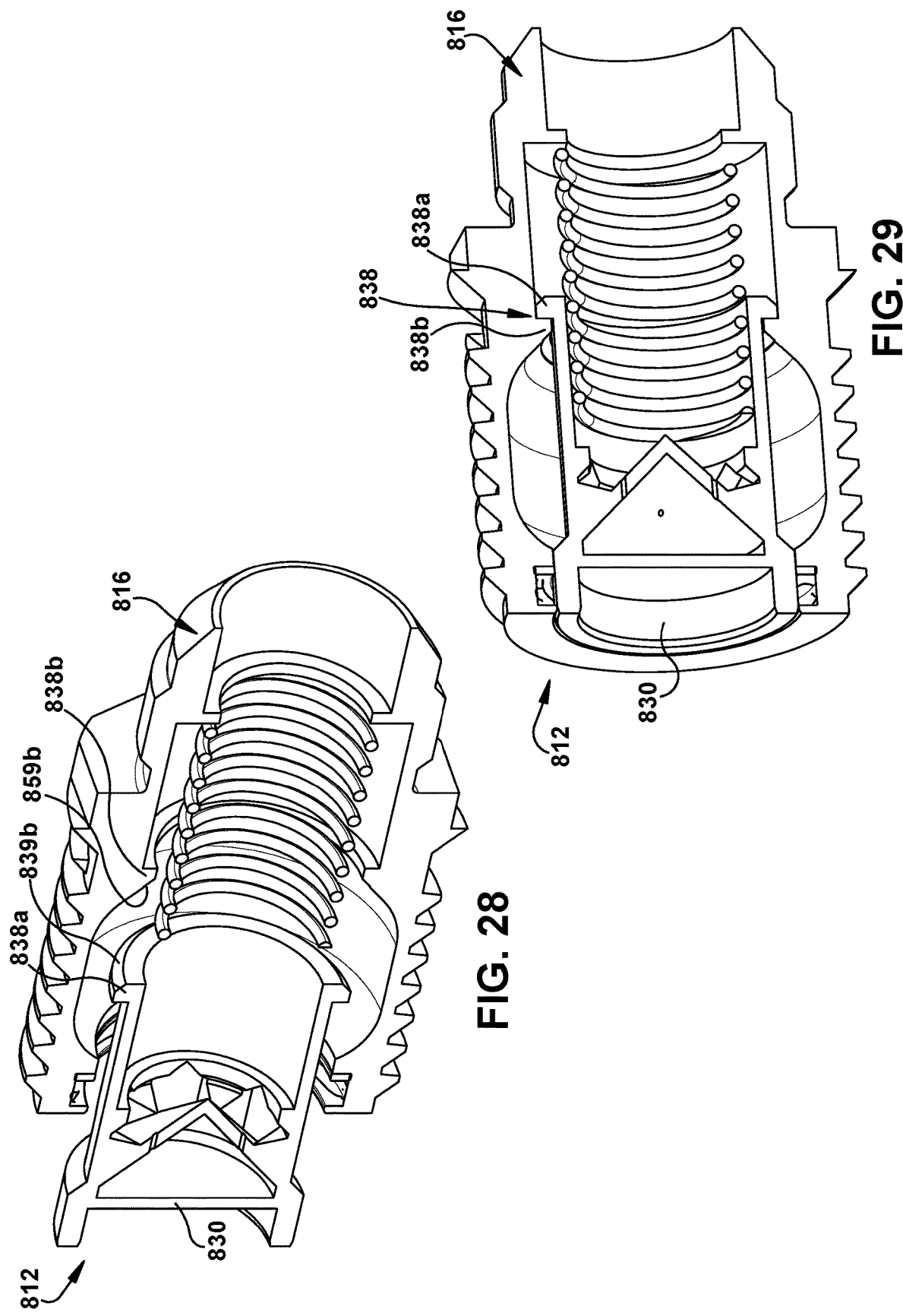

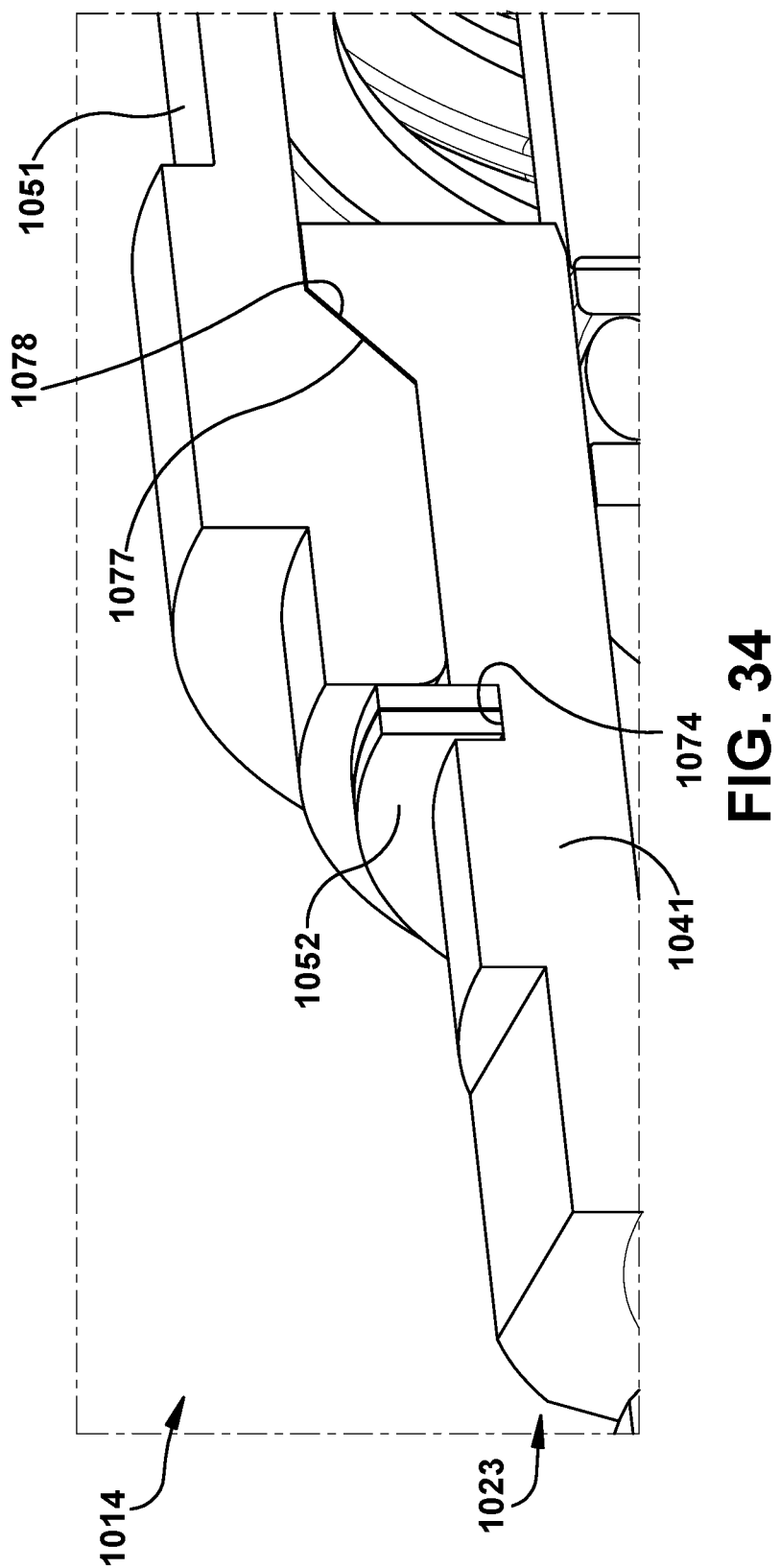

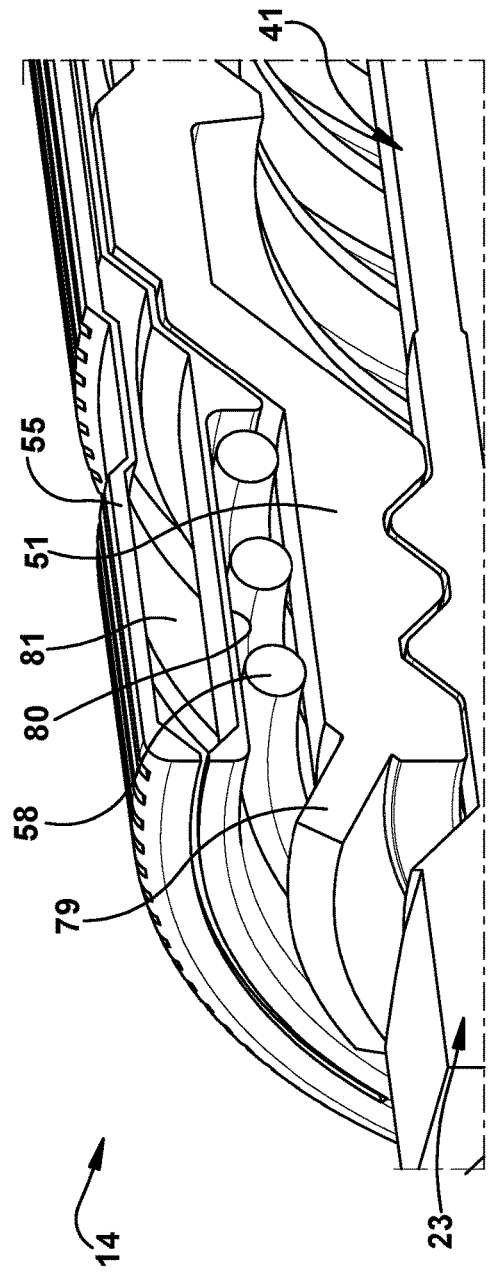
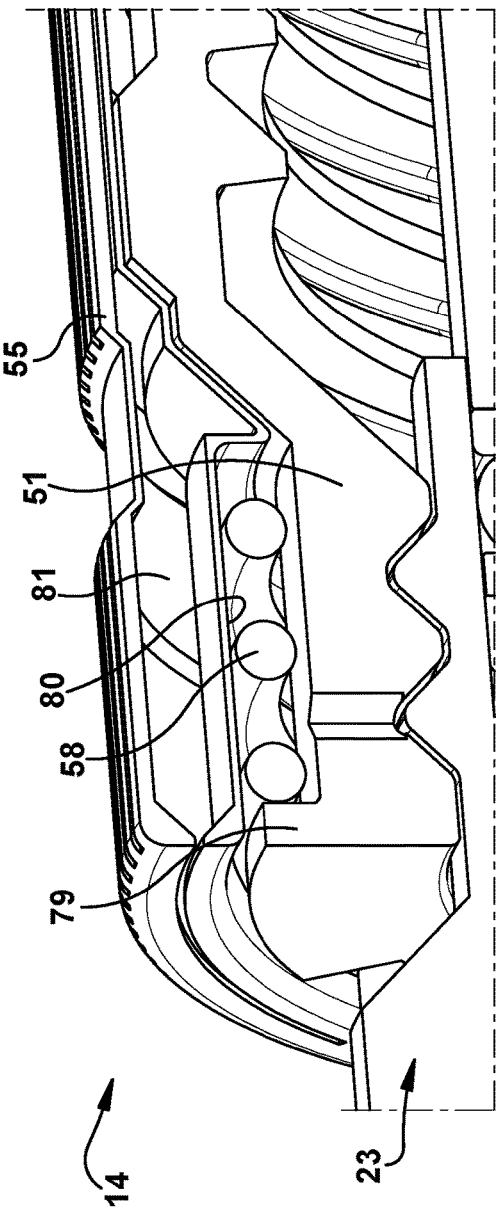

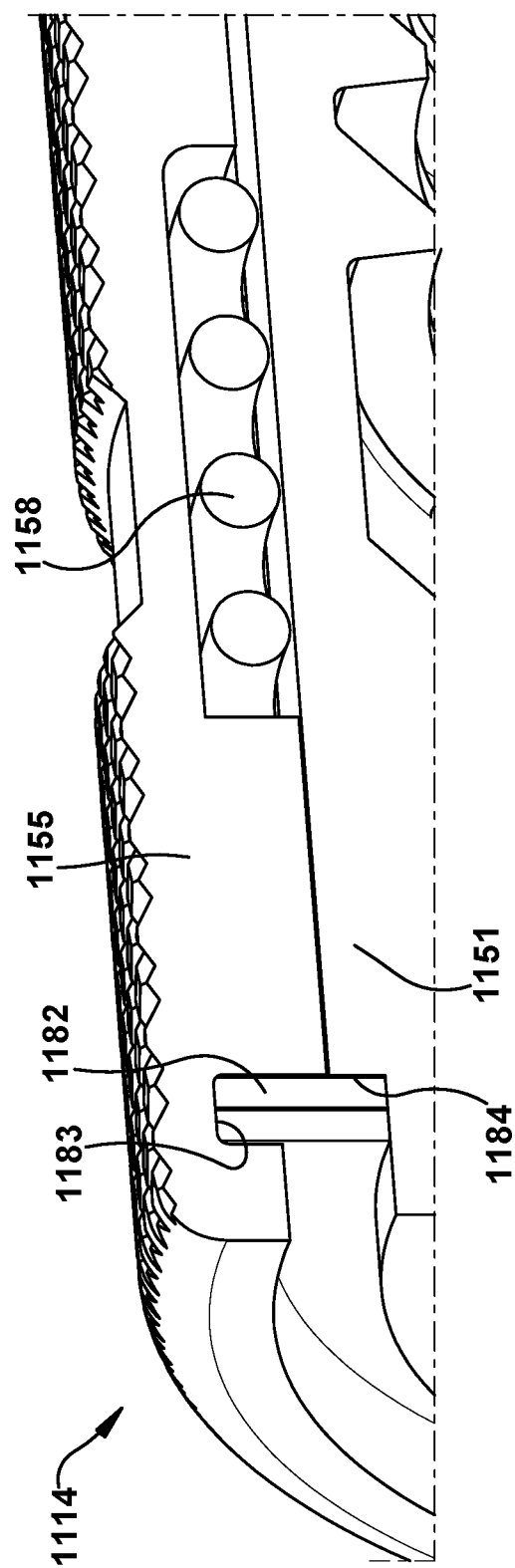

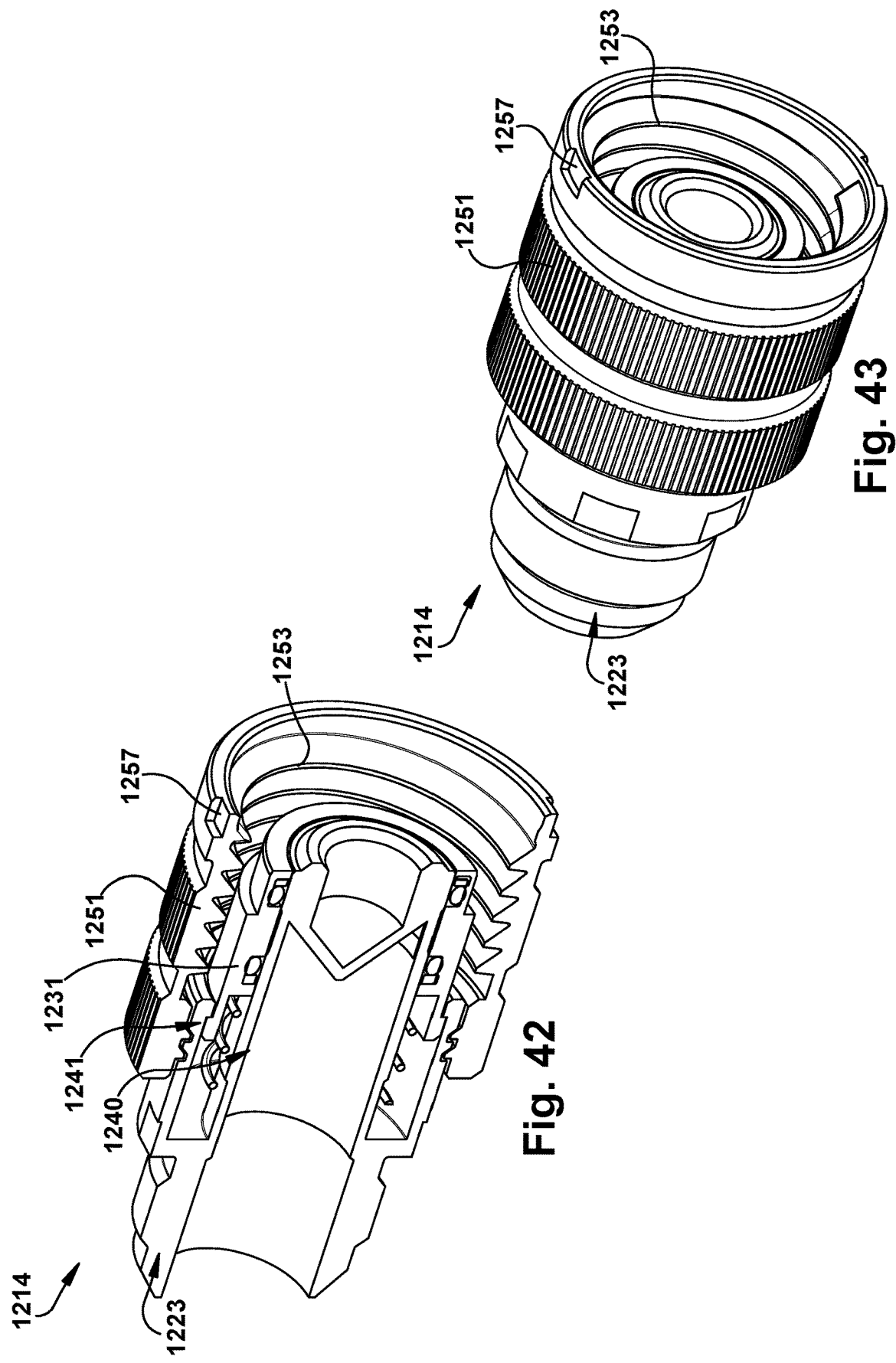

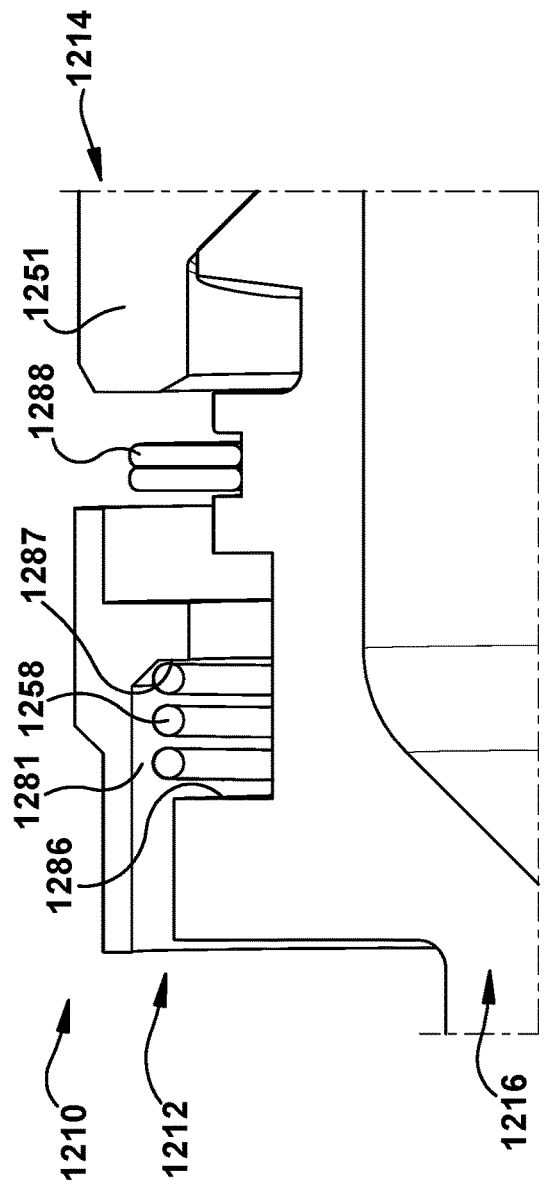
Fig. 44
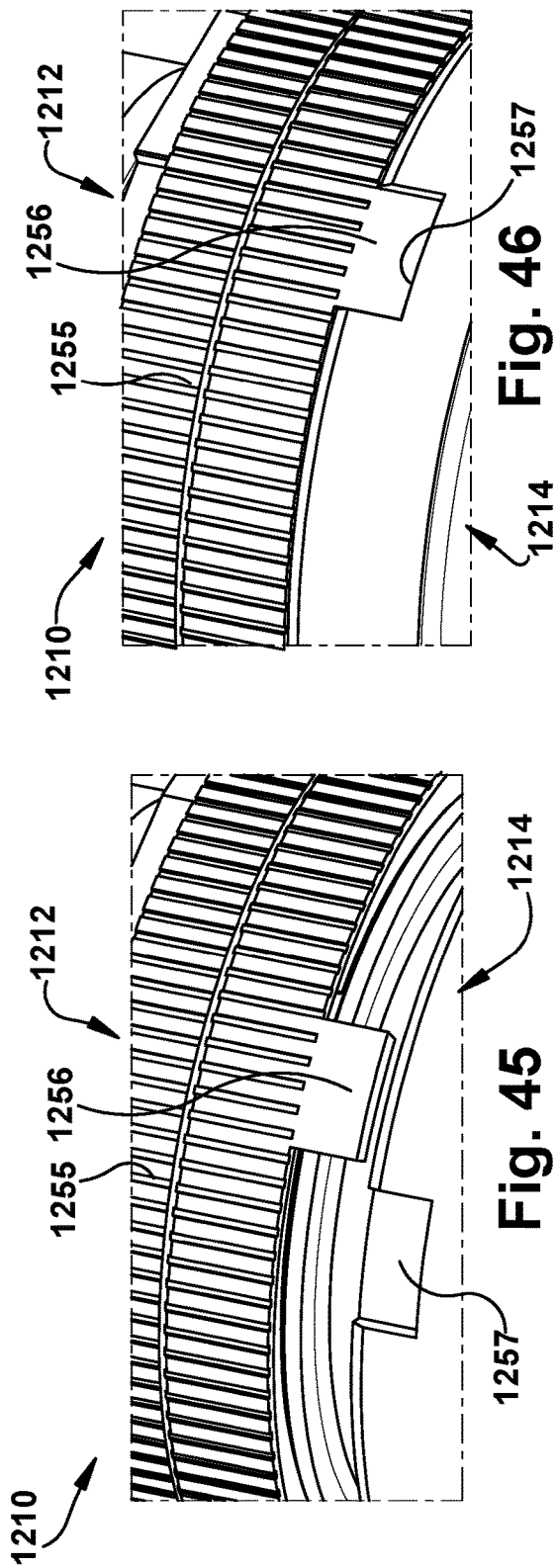
Fig. 46
Fig. 45

QUICK DISCONNECT COUPLING

RELATED APPLICATIONS

This application is a national phase of International Application No. PCT/US2019/045249 filed Aug. 6, 2019, which claims the benefit of U.S. Provisional Application No. 62/717,146 filed Aug. 10, 2018, all of which are hereby incorporated herein by reference in their entireties.

FIELD OF INVENTION

The present invention relates generally to quick connect/disconnect couplings, and more particularly to quick connect/disconnect couplings having a female coupler and a male nipple, such as for use in severe service applications including aerospace and the like.

BACKGROUND

Quick connect/disconnect fluid couplings are commonly used to connect hydraulic fluid lines in aerospace applications. These quick connect/disconnect couplings generally include a male nipple and a female coupler that are mated together for fluid connection. The male nipple generally includes a cylindrical body having a nipple portion at one end for insertion into a receiving end of the female coupler. The male nipple and female coupler each include a connection at their respective opposite ends to facilitate connection to fluid lines of the hydraulic system. When the nipple portion of the male nipple is inserted into the receiving end of the female coupler, fluid flow may be established through flow passages in each of the coupling members. Typically, one or both of the coupling members includes a valve member that is opened to permit fluid flow when the coupling members are fully-coupled together, and that is closed to terminate fluid flow when the coupling members are disconnected.

In aerospace applications, such quick connect/disconnect couplings should provide for ease of maintenance when servicing the aircraft or other vehicle. For example, such couplings should permit the removal and/or replacement of associated equipment on the vehicle with minimal or preferably no loss of hydraulic fluid. Moreover, such quick connect/disconnect couplings should provide quick disconnect capabilities, self-sealing action, and visual/touch indication of the fully-coupled position. Typically, such quick connect/disconnect couplings are thread-together couplings that provide a mechanical advantage for these severe service applications that experience high-pressure loads. Such thread-together couplings should offer a simple one-hand operation for the connect/disconnect sequence, as well as provide reliable performance during the servicing of the fluid systems. However, existing couplings of the type described above typically require numerous components that must be machined and assembled together, which results in a complicated and expensive construction.

SUMMARY OF INVENTION

The present invention provides a quick connect/disconnect coupling having a male nipple and female coupler, in which one or both of these coupling members provide a unique simplified construction with a reduced number of parts for minimizing assembly time and overall costs.

More particularly, according to one aspect of the invention, one or more parts of the male nipple and/or female coupler may be formed by an additive manufacturing process, in which multiple portions of the associated coupling member(s) are formed together as a unitary construction. Utilization of such additive manufacturing processes also may provide unique and advantageous structural features of the associated coupling member(s). Such features also may reduce the number of machined parts for each coupling member, and may further reduce inventory build-up for such parts. Assembly time and complexity of assembly also may be reduced. Furthermore, special tools and assembly machines may be minimized or eliminated. Overall, such features may reduce the overall cost of the design, while still meeting or exceeding industry standards.

According to an aspect of the invention, a quick connect/disconnect fluid coupling includes a male nipple and a female coupler; the male nipple having: a male valve body extending along a longitudinal axis, the male valve body having an axially extending through-passage; wherein a radially outward portion of the male valve body has radially outwardly protruding threads, each thread having a first side and an axially opposite second side, wherein the first side is inclined relative to the radially outward portion of the male valve body by a first angle in a range of 30-degrees to 60-degrees, and wherein the second side is inclined relative to the radially outward portion of the male valve body by a second angle in a range of 80-degrees to 100-degrees; and the female coupler having: a female valve body extending along a longitudinal axis, the female valve body having an axially extending through-passage; and a rotatable thread sleeve radially outwardly of the female valve body, the rotatable thread sleeve being supported by the female valve body and being configured to freely rotate about the longitudinal axis of the female valve body; wherein the rotatable thread sleeve has radially inwardly protruding threads that are configured to threadably engage the threads of the male nipple to couple the female coupler to the male nipple.

According to another aspect of the invention, a female coupler for a quick connect/disconnect coupling includes: a female valve body extending along a longitudinal axis, the female valve body having an axially extending through-passage; a sealing sleeve axially moveable within the female valve body between a closed-position, which restricts fluid flow through the female valve body, and an open position, which permits fluid flow through the female valve body; and a resilient interlocking element configured to slidably secure the sealing sleeve within the female valve body.

In some exemplary embodiments, the sealing sleeve is slidably disposed radially outwardly of a radially inward portion of the female valve body; and the resilient interlocking element includes at least one flexible finger element formed by the radially inward portion of the female valve body, the at least one flexible finger element being configured to interlockingly engage with the sealing sleeve to permit the sealing sleeve to move between a forward and a rearward position within the female valve body, in which the flexible finger element has a stop that is configured to restrict further forward movement of the sealing sleeve beyond the forward position.

In some exemplary embodiments, the sealing sleeve is slidably disposed radially outwardly of a radially inward portion of the female valve body; and the resilient interlocking element includes at least one flexible finger element formed by a portion of the sealing sleeve, the at least one flexible finger element being configured to interlockingly engage with the radially inward portion of the female valve body to permit the sealing sleeve to move between a forward and a rearward position within the female valve body, in which the flexible finger element has a stop that is configured to restrict further forward movement of the sealing sleeve beyond the forward position.

In some exemplary embodiments, the flexible finger element formed by the portion of the sealing sleeve is disposed toward a rearward portion of the sealing sleeve, wherein at least a portion of the flexible finger element protrudes radially inwardly into an axially extending slot in the radially inward portion of the female valve body, and the stop of the flexible finger element is configured to engage a surface that at least partially defines an axial end portion of the slot.

In some exemplary embodiments, the flexible finger element formed by the portion of the sealing sleeve is configured as a spring leg having a radially inward bias, such that at least a portion of the flexible finger element protrudes radially inwardly into an axially extending slot in the radially inward portion of the female valve body, and a portion of the spring leg serves as the stop, and is configured to engage a surface that at least partially defines an axial end portion of the slot.

In some exemplary embodiments, the sealing sleeve is slidably disposed radially outwardly of a radially inward portion of the female valve body; and the resilient interlocking element includes a discrete snap ring disposed in a radial groove of the radially inward portion of the female valve body, the snap ring being configured to permit the sealing sleeve to move between a forward and a rearward position within the female valve body, in which the snap ring serves as a stop that is configured to restrict further forward movement of the sealing sleeve beyond the forward position.

According to another aspect of the invention, a female coupler for a quick connect/disconnect coupling includes: a female valve body extending along a longitudinal axis, the female valve body having a radially inward portion that at least partially defines an axially extending through-passage; a sealing sleeve axially moveable within the female valve body between a closed-position, which restricts fluid flow through the female valve body, and an open position, which permits fluid flow through the female valve body; and wherein the sealing sleeve has a radially inward thread portion configured to thread past a radially outward thread portion of the radially inward portion of the female valve body, such that the sealing sleeve is permitted to move between a forward and a rearward position within the female valve body, in which the respective thread portions serve as stops that are configured to restrict further forward movement of the sealing sleeve beyond the forward position.

According to another aspect of the invention, a male nipple for a quick connect/disconnect coupling includes: a male valve body extending along a longitudinal axis, the male valve body having an axially extending through-passage; a flow sleeve axially moveable within the male valve body between a closed-position, which restricts fluid flow through the male valve body, and an open position, which permits fluid flow through the male valve body; and a resilient interlocking element configured to slidably secure the flow sleeve within the male valve body.

In some exemplary embodiments, the resilient interlocking element includes at least one flexible finger element formed by a portion of the flow sleeve, the at least one flexible finger element being configured to interlockingly engage with the male valve body to permit the flow sleeve to move between a forward and a rearward position within the male valve body, in which the flexible finger element has a stop that is configured to restrict further forward movement of the flow sleeve beyond the forward position.

In some exemplary embodiments, the resilient interlocking element includes a plurality of spring legs that are disposed circumferentially about at least a portion of the flow sleeve, the plurality of spring legs being configured to interlockingly engage with the male valve body to permit the flow sleeve to move between a forward and a rearward position within the male valve body; and wherein each of the plurality of spring legs is configured to have a radially outward bias, and each of the plurality of spring legs has a stop that is configured to engage the male valve body to restrict further forward movement of the flow sleeve beyond the forward position.

In some exemplary embodiments, the resilient interlocking element includes a plurality of spring-biased pins that are disposed circumferentially about at least a portion of the flow sleeve, the plurality of spring-biased pins being configured to interlockingly engage with the male valve body to permit the flow sleeve to move between a forward and a rearward position within the male valve body; and wherein each of the plurality of spring-biased pins is radially outwardly biased, and each of the plurality of spring-biased pins has a stop that is configured to engage the male valve body to restrict further forward movement of the flow sleeve beyond the forward position.

In some exemplary embodiments, the resilient interlocking element includes a discrete snap ring disposed in a radial groove of the flow sleeve, the snap ring being configured to permit the flow sleeve to move between a forward and a rearward position within the male valve body, in which the snap ring serves as a stop that is configured to restrict further forward movement of the flow sleeve beyond the forward position.

According to another aspect of the invention, a male nipple for a quick connect/disconnect coupling includes: a male valve body extending along a longitudinal axis, the male valve body having a radially inward portion that at least partially defines an axially extending through-passage; a flow sleeve axially moveable within the male valve body between a closed-position, which restricts fluid flow through the male valve body, and an open position, which permits fluid flow through the male valve body; wherein the flow sleeve has a radially outward thread portion configured thread past a radially inward thread portion of the radially inward portion of the male valve body, such that the flow sleeve is permitted to move between a forward and a rearward position within the male valve body, in which the respective thread portions serve as stops that are configured to restrict further forward movement of the flow sleeve beyond the forward position.

According to another aspect of the invention, a female coupler for coupling to a male nipple of a quick connect/disconnect coupling includes: a female valve body extending along a longitudinal axis, the female valve body having an axially extending through-passage; and a rotatable thread sleeve radially outwardly of the female valve body, the rotatable thread sleeve having radially inwardly protruding threads that are configured to threadably engage corresponding threads of the male nipple to couple the female coupler to the male nipple; wherein the rotatable thread sleeve is coupled to a radially outward portion of the female valve body at an interface that permits the thread sleeve to freely rotate about the longitudinal axis of the female valve body while axially constraining the thread sleeve; and wherein the interface includes opposing interlocking teeth disposed on the female valve body and on the rotatable thread sleeve.

According to another aspect of the invention, a female coupler for coupling to a male nipple of a quick connect/disconnect coupling includes: a female valve body extending along a longitudinal axis, the female valve body having an axially extending through-passage; and a rotatable thread sleeve radially outwardly of the female valve body, the rotatable thread sleeve having radially inwardly protruding threads that are configured to threadably engage corresponding threads of the male nipple to couple the female coupler to the male nipple; wherein the rotatable thread sleeve is coupled to a radially outward portion of the female valve body with a resilient element that permits the thread sleeve to freely rotate about the longitudinal axis of the female valve body while axially constraining the thread sleeve.

In some exemplary embodiments, the resilient element includes a marcel spring, the marcel spring being disposed in corresponding grooves of the female valve body and the thread sleeve.

In some exemplary embodiments, the resilient element includes a snap ring, the snap ring being disposed in at least one groove of the female valve body and/or the thread sleeve.

According to another aspect of the invention, a female coupler for coupling to a male nipple of a quick connect/disconnect coupling includes: a female valve body extending along a longitudinal axis, the female valve body having an axially extending through-passage; a rotatable thread sleeve radially outwardly of the female valve body, the rotatable thread sleeve having radially inwardly protruding threads that are configured to threadably engage corresponding threads of the male nipple to couple the female coupler to the male nipple; and an actuating sleeve radially outwardly of the rotatable thread sleeve, wherein the actuating sleeve has a hollow annular internal chamber.

In some exemplary embodiments, the hollow annular internal chamber is filled with fireproof material.

In some exemplary embodiments, the actuating sleeve is biased forwardly by a spring, and the thread sleeve has a bendable web portion that is configured to contain the spring in a spring chamber that is formed between a portion of the thread sleeve and a portion of the actuating sleeve.

According to another aspect of the invention, a female coupler for coupling to a male nipple of a quick connect/disconnect coupling includes: a female valve body extending along a longitudinal axis, the female valve body having an axially extending through-passage; a rotatable thread sleeve radially outwardly of the female valve body, the rotatable thread sleeve having radially inwardly protruding threads that are configured to threadably engage corresponding threads of the male nipple to couple the female coupler to the male nipple; a spring-biased actuating sleeve radially outwardly of the rotatable thread sleeve; and a snap ring that couples the actuating sleeve to the thread sleeve, the snap ring being configured to permit the actuating sleeve to move between a forward and rearward position relative to the thread sleeve.

According to another aspect of the invention, a quick connect/disconnect fluid coupling includes a male nipple and a female coupler; the female coupler having: a female valve body extending along a longitudinal axis, the female valve body having an axially extending through-passage; and a rotatable thread sleeve radially outwardly of the female valve body, the rotatable thread sleeve being supported by the female valve body and being configured to freely rotate about the longitudinal axis of the female valve body; the male nipple having: a male valve body extending along a longitudinal axis, the male valve body having an axially extending through-passage; and a spring-biased actuating sleeve radially outwardly of the male valve body; wherein a radially outward portion of the male valve body has radially outwardly protruding threads that are configured to threadably engage corresponding radially inwardly protruding threads of the thread sleeve; and wherein the actuating sleeve of the male nipple is biased forwardly, and wherein the actuating sleeve is configured to move relative to the male valve body between a forward position, in which the actuating sleeve of the male nipple is configured to engage the thread sleeve of the female coupler to restrict rotational movement of the thread sleeve, and a rearward position, in which the actuating sleeve of the male nipple is configured to disengage from the thread sleeve of the female coupler to permit rotational movement of the thread sleeve, thereby permitting the female coupler to be threadably decoupled from the male nipple.

According to another aspect of the invention, a quick connect/disconnect fluid coupling includes a male nipple and a female coupler; the male nipple having: a male valve body extending along a longitudinal axis, the male valve body having an axially extending through-passage; and a flow sleeve axially moveable within the male valve body between a closed-position, which restricts fluid flow through the male valve body, and an open position, which permits fluid flow through the male valve body; the female coupler having: a female valve body extending along a longitudinal axis, the female valve body having an axially extending through-passage; and a sealing sleeve axially moveable within the female valve body between a closed-position, which restricts fluid flow through the female valve body, and an open position, which permits fluid flow through the female valve body; wherein the flow sleeve of the male nipple and/or a radially inward portion of the female valve body has a fluid orifice for enabling fluid flow through the female and/or male valve body when the sealing sleeve and/or the flow sleeve are in the open position; and wherein the fluid orifice of the flow sleeve and/or the fluid orifice of the radially inward portion of the female valve body is optimized for fluid flow.

According to another aspect of the invention, a quick connect/disconnect fluid coupling includes a male nipple and a female coupler: the male nipple having: a male valve body extending along a longitudinal axis, the male valve body having an axially extending through-passage; and a flow sleeve axially moveable within the male valve body between a closed-position, in which the flow sleeve engages a seal member of the male nipple and restricts fluid flow through the male valve body, and an open position, in which the flow sleeve disengages from the seal member and permits fluid flow through the male valve body; the female coupler having: a female valve body extending along a longitudinal axis, the female valve body having an axially extending through-passage; and a sealing sleeve axially moveable within the female valve body between a closed-position, in which the sealing sleeve engages a seal member of the female coupler and restricts fluid flow through the female valve body, and an open position, in which the sealing sleeve disengages from the seal member and permits fluid flow through the female valve body; wherein the seal member of the female coupler and/or the seal member of the male nipple is made of one or more of: perfluoroelastomer (FFKM/FFPM), fluoroelastomer (FKM/FPM), TFE /Propropylene Rubber (FEPM), polydimethylsiloxane (silicone rubber—Q, MQ, VMQ, PMQ, PVMQ), Tetrafluoroethylene Propylene (AFLAS), Fluorosilicone rubber (silicone rubber—FMQ, FVMQ), Polytetrafluoroethylene (PTFE), Polyethylenetetrafluoroethylene (ETFE), and/or Ethylene Propylene Rubber (EPR, EPDM).

In some exemplary embodiments, the seal member of the female coupler and/or the seal member of the male nipple has one or more of the following configurations: male or piston gland without back-up ring, male or piston gland with one back-up ring, male or piston gland with two back-up rings, female or cylinder gland without back-up ring, female or cylinder gland with one back-up ring, female or cylinder gland with two back-up rings, face seal gland, dovetail groove gland, half dovetail groove gland, and/or triangular groove gland.

According to another aspect of the invention, a quick connect/disconnect fluid coupling includes a male nipple and a female coupler; the male nipple having: a male valve body extending along a longitudinal axis, the male valve body having an axially extending through-passage; a flow sleeve axially moveable within the male valve body between a closed-position, which restricts fluid flow through the male valve body, and an open position, which permits fluid flow through the male valve body; and a spring configured to bias the flow sleeve toward the closed position; the female coupler having: a female valve body extending along a longitudinal axis, the female valve body having an axially extending through-passage; a sealing sleeve axially moveable within the female valve body between a closed-position, which restricts fluid flow through the female valve body, and an open position, which permits fluid flow through the female valve body; and a spring configured to bias the sealing sleeve toward the closed position; wherein the spring of the female coupler and/or the spring of the male nipple has a bellows configuration; or wherein the spring of the female coupler and/or the spring of the male nipple has a diamond-fold configuration.

According to another aspect of the invention, one or more parts of the female coupler and/or one or more parts of the male nipple are formed by an additive manufacturing process.

In some exemplary embodiments, one or more of the following parts are formed by an additive manufacturing process: the female valve body, the sealing sleeve of the female coupler, the spring of the female coupler, the thread sleeve of the female coupler, the actuating sleeve of the female coupler, the male valve body, the spring of the male nipple, and/or the flow sleeve of the male nipple.

According to another aspect of the invention, one or more parts of the female coupler and/or one or more parts of the male nipple is formed as a unitary structure, such as via an additive manufacturing process.

In some exemplary embodiments, one or more of the following parts are formed as a unitary structure: the female valve body, including a radially inner portion and a radially outer portion, the radially inner portion defining an axial flow passage and having a fluid orifice for enabling fluid flow through the female valve body; and/or the flow sleeve of the male nipple, in which the flow sleeve has a sealing portion for engaging a seal member of the male nipple, and a fluid orifice for enabling fluid flow through the male valve body.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention, in which similar reference numerals are used to indicate the same or similar elements in the various figures, except where noted below.

FIG. 2 shows an uncoupled state of the female coupler and the male nipple.

FIG. 3 shows an intermediate coupled state of the female coupler with the male nipple.

FIG. 4 shows another intermediate coupled state with further advancement of the female coupler onto the male nipple.

FIG. 5 shows a fully-coupled state between the female coupler and the male nipple.

FIG. 6 is a partial perspective view of the male nipple and female coupler in an intermediate coupling state with an exemplary locking tang of the male nipple disengaged from a corresponding locking slot of the female coupler.

FIG. 7 is a partial perspective view of the male nipple and female coupler in a fully-coupled with the locking tang of the male nipple engaged with the corresponding locking slot of the female coupler.

FIG. 8 is an enlarged cross-sectional view of the corresponding threads of the male nipple and the female coupler threaded together in a coupled state.

FIG. 9 is a perspective cutaway view of the female coupler in FIG. 1, in which an exemplary sealing sleeve is shown prior to slidable securement with an exemplary female valve body via exemplary flexible finger elements formed by a portion of the valve body.

FIG. 10 is a perspective cutaway view showing the sealing sleeve in FIG. 9 slidably secured to the female valve body via the flexible finger elements.

FIG. 13 is a perspective cutaway view of another exemplary embodiment of a female coupler, in which an exemplary sealing sleeve is shown prior to slidable securement with an exemplary female valve body via exemplary flexible finger elements formed by a portion of the sealing sleeve.

FIG. 14 is a perspective cutaway view showing the sealing sleeve in FIG. 13 slidably secured to the female valve body via the flexible finger elements.

FIG. 15 is a perspective cutaway view of another exemplary embodiment of a female coupler, in which an exemplary sealing sleeve is slidably secured to an exemplary female valve body via a spring leg formed by a portion of the sealing sleeve.

FIG. 16 is a perspective cutaway view of another exemplary embodiment of a female coupler, in which an exemplary sealing sleeve is shown prior to slidable securement with an exemplary female valve body via a snap ring.

FIG. 17 is a perspective cutaway view showing the sealing sleeve in FIG. 16 slidably secured to the female valve body via the snap ring.

FIG. 18 is a perspective cutaway view of another exemplary embodiment of a female coupler, in which an exemplary sealing sleeve is shown prior to slidable securement with an exemplary female valve body via captive screw thread(s).

FIG. 19 is a perspective cutaway view showing the sealing sleeve in FIG. 18 slidably secured to the female valve body via the captive screw thread(s).

FIG. 20 is a perspective cutaway view of the male nipple in FIG. 1, in which an exemplary flow sleeve is shown prior to slidable securement with an exemplary male valve body via exemplary flexible finger elements formed by a portion of the flow sleeve.

FIG. 21 is a perspective cutaway view showing the flow sleeve in FIG. 20 slidably secured to the male valve body via the flexible finger elements.

FIG. 22 is a perspective cutaway view of another exemplary embodiment of a male nipple, in which an exemplary flow sleeve is shown prior to slidable securement with an exemplary male valve body via exemplary spring legs formed by a portion of the flow sleeve.

FIG. 23 is a perspective cutaway view showing the flow sleeve in FIG. 22 slidably secured to the male valve body via the spring legs.

FIG. 24 is a perspective view of another exemplary flow sleeve of the exemplary male nipple, in which the flow sleeve has spring-biased pins for slidable securement to a male valve body.

FIG. 25 is a perspective cutaway view showing the flow sleeve in FIG. 24 slidably secured to the male valve body via the spring-biased pins.

FIG. 26 is a perspective cutaway view of another exemplary embodiment of a male nipple, in which an exemplary flow sleeve is shown prior to slidable securement with an exemplary male valve body via a snap ring.

FIG. 27 is a perspective cutaway view showing the flow sleeve in FIG. 26 slidably secured to the male valve body via the snap ring.

FIG. 28 is a perspective cutaway view of another exemplary embodiment of a male nipple, in which an exemplary flow sleeve is shown prior to slidable securement with an exemplary male valve body via captive screw thread(s).

FIG. 29 is a perspective cutaway view showing the flow sleeve in FIG. 28 slidably secured to the male valve body via the captive screw thread(s).

FIG. 34 is an enlarged perspective cutaway view of another exemplary embodiment of a female coupler showing an exemplary thread sleeve coupled to an exemplary female valve body via a snap ring.

FIG. 35 is an enlarged perspective cutaway view of a portion of the female coupler in FIG. 1 showing the exemplary thread sleeve with a bendable web portion in an uninstalled position for allowing insertion of the spring into a spring chamber.

FIG. 36 is an enlarged perspective cutaway view showing the thread sleeve in FIG. 35 with the web portion bent upward to contain the spring in the spring chamber.

FIG. 37 is an enlarged perspective cutaway view of another exemplary female coupler in which a discrete snap ring couples the actuating sleeve to the thread sleeve.

FIG. 42 is a cutaway perspective view of another exemplary embodiment of a female coupler for coupling with the male nipple in FIG. 39, in which the female coupler is devoid of an actuating sleeve.

FIG. 43 is an outer perspective view of the female coupler in FIG. 42.

FIG. 44 is an enlarged cross-sectional view of the male nipple in FIG. 39 coupled to the female coupler in FIG. 41 in an unlocked state with the actuating sleeve of the male nipple pulled away from the female coupler.

FIG. 45 is an enlarged outer perspective view of the male nipple in FIG. 39 coupled to the female coupler in FIG. 41 in an unlocked state with a locking tang of the male nipple disengaged from a corresponding locking slot of the female coupler.

FIG. 46 is an enlarged outer perspective view of the male nipple in FIG. 39 coupled to the female coupler in FIG. 41 in a locked state with the locking tang of the male nipple engaged with the corresponding locking slot of the female coupler.

DETAILED DESCRIPTION

A quick connect/disconnect coupling having a male nipple and a female coupler is described in detail below, in which one or both of the coupling members provides a simplified construction with a reduced number of parts for minimizing assembly time and overall costs. For example, as described in further detail below, one or both of the coupling members may include unique interlocking elements, such as flexible finger elements or the like, that slidably secure the corresponding valve sleeves to the respective valve bodies. The female coupler may include a valve body with a unique interface, such as opposing interlocking teeth, for rotatably coupling to a thread sleeve. The thread sleeve may have a bendable web for facilitating assembly of a spring for an actuating sleeve that is axially movable relative to the thread sleeve. The actuating sleeve may be formed with a hollow annular internal chamber, which may reduce weight and/or allow the actuating sleeve to be filled with fireproof material. In some embodiments, the male nipple may include the actuating sleeve instead of the female coupler. Other features of the coupling member(s) also may be optimized, such as via additive manufacturing techniques, including unique coupling threads, fluid orifices, biasing members, and/or seal members.

The principles and aspects of the present invention have particular application to quick connect/disconnect fluid couplings for aerospace applications, and thus will be described below chiefly in this context. It is also understood, however, that the principles and aspects of this invention may be applicable to other fluid couplings for other applications where it is desirable to provide a unique simplified construction of the coupling members for minimizing assembly time and overall costs, while also enhancing various features of the coupling members for improved performance.

Figure 1:
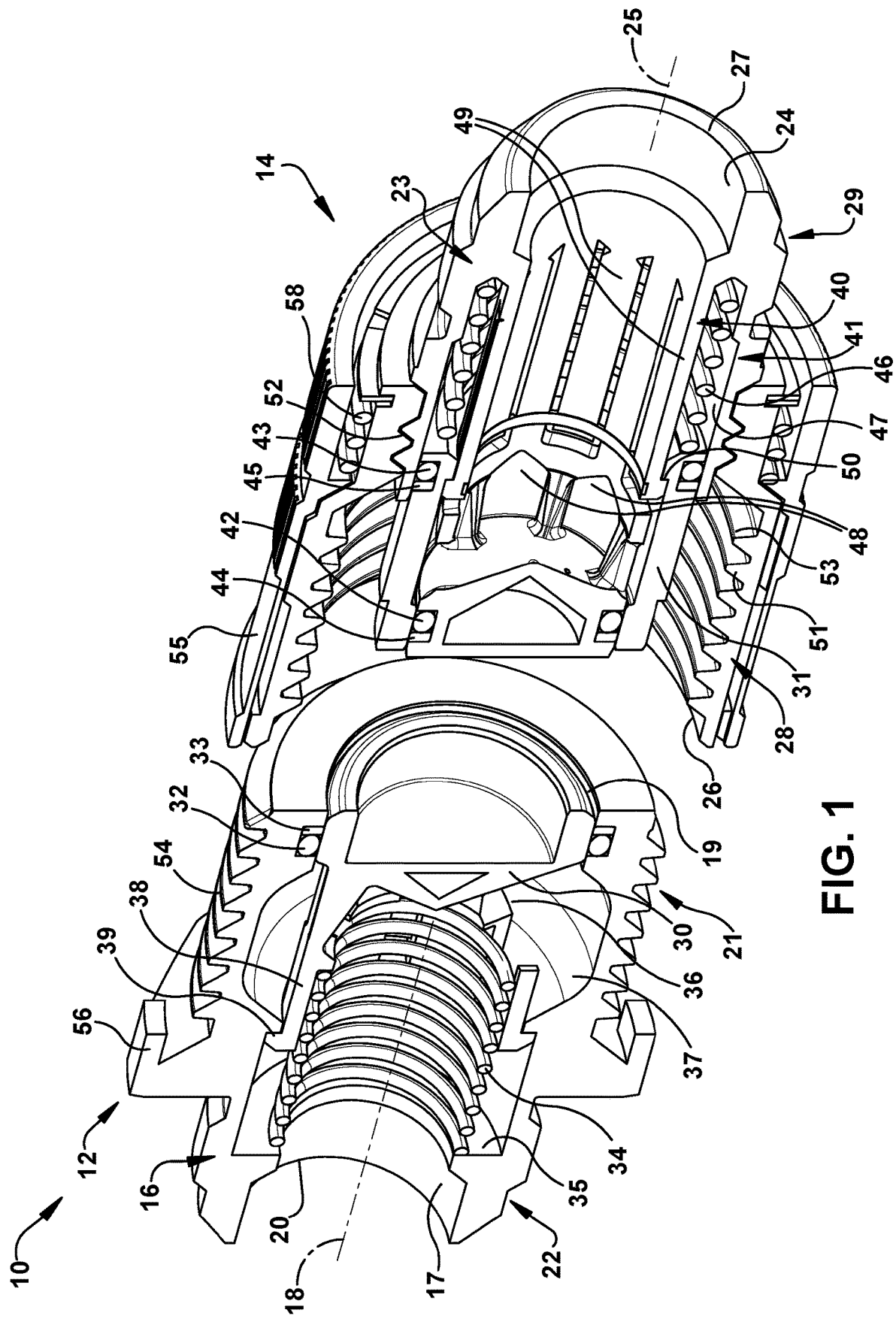
FIG. 1 is a perspective cutaway view of an exemplary quick connect/disconnect coupling, including an exemplary male nipple and an exemplary female coupler.

Referring to FIG. 1, an exemplary quick connect/disconnect fluid coupling 10 is shown, including a male nipple 12 and a female coupler 14 (also referred to as "coupling members"), which are shown in an uncoupled state. The male nipple 12 generally includes a male valve body 16 having a through-passage 17 extending along its longitudinal axis 18 for enabling fluid flow from a forward opening 19 to a rearward opening 20 of the valve body 16. The male nipple 12 has a forward end portion 21 configured for insertion into and engagement with the female coupler 14, and a rearward end portion 22 configured to connect with a fluid conduit or suitable housing of a hydraulic or other fluid system (not shown). The female coupler 14 generally includes a female valve body 23 having a through-passage 24 extending along its longitudinal axis 25 for enabling fluid flow from a forward opening 26 to a rearward opening 27 of the valve body 23. The female coupler 14 has a forward end portion 28 configured for receiving the forward end portion 21 of the male nipple 12, and a rearward end portion 29 configured to connect with a fluid conduit or suitable housing of the hydraulic or other fluid system (not shown).

Figure 2:
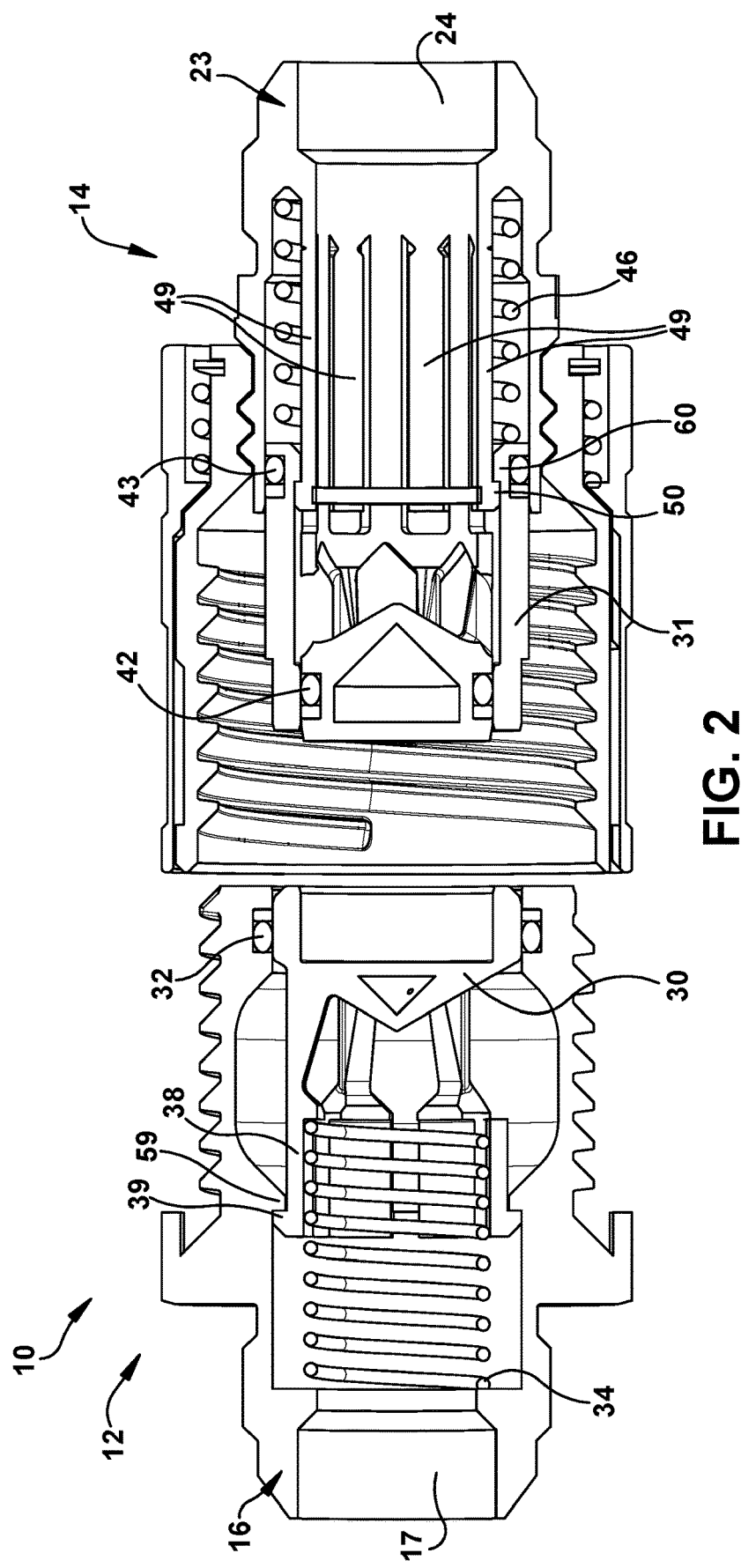
FIGS. 2-5 show cross-sectional side views of the male nipple and female coupler in FIG. 1 during an exemplary coupling sequence.
Figure 5:
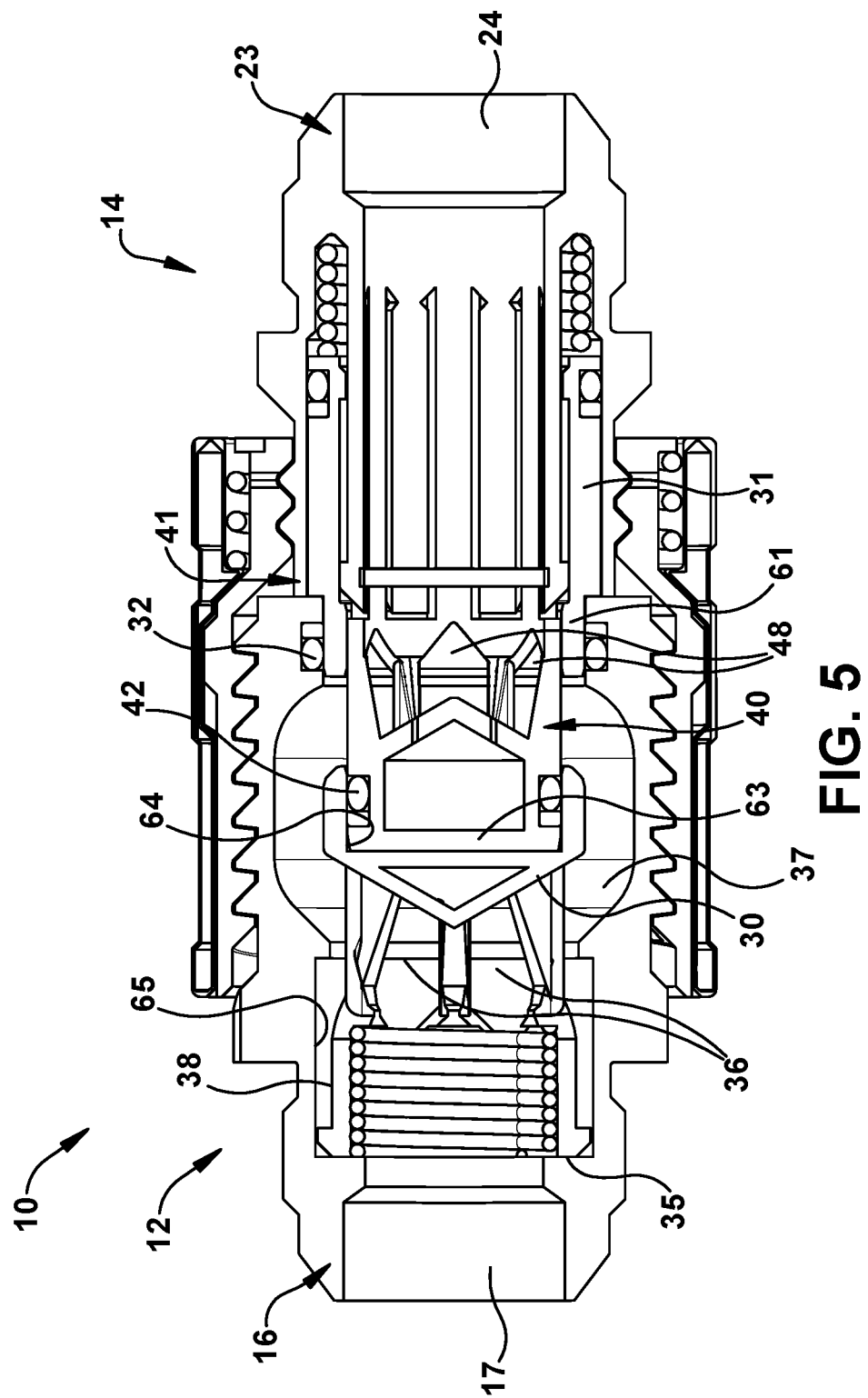

As discussed in further detail below, the male nipple 12 includes an axially moveable flow sleeve 30, and the female coupler 14 includes an axially moveable sealing sleeve 31. These respective sleeves 30, 31 each serve as valve members in the respective coupling members 12, 14, and each is configured to move between a closed-position, which restricts fluid flow through the corresponding valve body, and an open position, which permits fluid flow through the corresponding valve body. As discussed further below, when the male nipple 12 is inserted by a sufficient distance into the female coupler 14 to a coupled state (as shown in FIG. 5, for example), the respective sleeves 30, 31 move to their open positions to establish fluid flow through the respective passages 17, 24. When the male nipple 12 and the female coupler 14 are decoupled from each other (as shown in FIG. 2, for example), the respective sleeves 30, 31 move to their closed positions to terminate fluid flow through the respective passages 17, 24.

As shown, the male nipple 12 includes at least one sealing member 32, which may be disposed in a radial groove at a radially inward portion of the male valve body 16. In the illustrated embodiment, the seal member 32 is an O-ring seal, and the male nipple 12 further includes a back-up ring 33 disposed in the radial groove. The male nipple 12 also includes a biasing member 34, such as a spring, which is configured to bias the flow sleeve 30 forwardly toward the closed position, such that a radially outward portion of the flow sleeve 30 sealingly engages the sealing member 32 to restrict flow through the valve body 16 (as shown in FIG. 2, for example). In the illustrated embodiment, the biasing member 34 is a coil spring, a rearward portion of which engages a rearward shoulder portion 35 defined by the male valve body 16.

In exemplary embodiments, the flow sleeve 30 has at least one fluid orifice 36 for enabling fluid flow across the flow sleeve 30 and through the male valve body 16 when the flow sleeve 30 is disengaged from the sealing member 32 in an open position (as shown in FIG. 5, for example). As shown, an inner surface of the male valve body 16 defines a radially enlarged internal pocket 37, which further enables fluid flow through the valve body 16, as discussed in further detail below. Also discussed in further detail below, an interlocking element 38, such as a resilient finger element, is provided for slidably securing the flow sleeve 30 to the male valve body 16. As shown in FIGS. 2-5, for example, such slidable securement by the interlocking element 38 permits the flow sleeve 30 to slidably move between a forward (e.g., closed) position (FIG. 2) and a rearward (e.g., open) position (FIG. 5) within the male valve body 16, and further secures or contains the flow sleeve 30 to the male valve body 16 by providing a stop 39, such as an abutment, that restricts further forward movement of the flow sleeve 30 beyond the forward position.

Still referring to FIG. 1, the female coupler 14 will now be described in further detail. As shown, the female valve body 23 includes a radially inward portion 40 and a radially outward portion 41. In exemplary embodiments, the inward portion 40 and outward portion 41 are formed as a unitary and integral structure, such as via an additive manufacturing technique. It is understood, however, that in some embodiments the radially inward portion 40 and radially outward portion 41 may be discrete members that are coupled together to at least partially form the female valve body 23.

As shown, the female coupler 14 includes at least one sealing member 42, which may be disposed in a radially outer groove toward a forward end of the radially inward portion 40 of the female valve body 23. In exemplary embodiments, the sealing sleeve 31 also may include another sealing member 43, which may be disposed in a radial groove at a radially outer portion of the sealing sleeve 31. In the illustrated embodiment, the seal member(s) 42, 43 are O-ring seals, which may be used in conjunction with respective back-up rings 44, 45. The female coupler 14 also includes a biasing member 46, such as a spring, which is configured to bias the sealing sleeve 31 forwardly toward its closed position, such that a radially inward portion of the sealing sleeve 31 sealingly engages the sealing member 42 to restrict flow through the valve body 23 (as shown in FIG. 2, for example). In the illustrated embodiment, the biasing member 46 is a coil spring, which is contained within a spring chamber 47 that is formed by an annular gap between the radially inward portion 40 and the radially outward portion 41 of the female valve body 23.

In the illustrated embodiment, the radially inward portion 40 of the female valve body 23 has an internal surface that at least partially defines the axial through-passage 24. The radially inward portion 40 also includes at least one fluid orifice 48 for enabling fluid flow across the inner portion 40 and through the female valve body 23 when the sealing sleeve 31 is disengaged from the sealing member 42 in an open position (as shown in FIG. 5, for example). As discussed in further detail below, an interlocking element 49, such as a resilient finger element, is provided for slidably securing the sealing sleeve 31 to the female valve body 23. As shown in FIGS. 2-5, for example, such slidable securement by the interlocking element 49 permits the sealing sleeve 31 to slidably move between a forward (e.g., closed) position (FIG. 2) and a rearward (e.g., open) position (FIG. 5) within the female valve body 23, and further secures or contains the sealing sleeve 31 to the female valve body 23 by providing a stop 50, such as an abutment, that restricts further forward movement of the sealing sleeve 31 beyond the forward position.

As shown, the female coupler 14 also includes a rotatable thread sleeve 51 that is supported by an outer surface of the radially outward portion 41 of the female valve body 23. In the illustrated embodiment, the rotatable thread sleeve 51 is coupled to the radially outward portion of the female valve body at an interface 52, such as via opposing interlocking teeth, that permits the thread sleeve 51 to freely rotate about the longitudinal axis 25 of the female valve body 23 while axially constraining the thread sleeve 51. The rotatable thread sleeve 51 also includes a plurality of radially inwardly protruding threads 53 that are configured to threadably engage corresponding radially outwardly protruding threads 54 on the radially outward portion of the male valve body 16 to couple the female coupler 14 to the male nipple 12 (as shown in FIGS. 2-5, for example).

The female coupler 14 may further include an actuating sleeve 55 that is co-rotatable with the thread sleeve 51. The actuating sleeve 55 may be disposed radially outwardly of the thread sleeve 51, and is configured to move between a forward position and rearward position relative to the thread sleeve 51 for engaging or disengaging from the male nipple 12 to provide a locking feature for the coupling 10. For example, as shown in FIG. 7, the male valve body 16 may include one or more protrusions, or tangs 56, that are configured to fit within corresponding slots 57 of the actuating sleeve 55 when the actuating sleeve 55 is in a forward position and the coupling members 12, 14 are in a fully-coupled position. The engagement of the locking tang 56 with the locking slot 57 restricts rotational movement of the thread sleeve 51, thereby restricting decoupling of the coupling members 12, 14. Such engagement also serves as a visual indication that the coupling members 12, 14 are fully-coupled together. As shown in FIG. 6, the actuating sleeve 55 may be moved to a rearward position, in which the tangs 56 of the male nipple disengage from the slots 57 of the actuating sleeve 55, to permit rotational movement of the thread sleeve 51, thereby permitting the female coupler 14 to be threadably decoupled from the male nipple 12. In exemplary embodiments, the female coupler 14 includes a biasing member 58, such as a spring, that is axially interposed between corresponding portions of the actuating sleeve 55 and the thread sleeve 51 to provide a bias toward the forward (e.g., locked) position.

Referring to FIGS. 2-5, an exemplary sequence of coupling the male nipple 12 to the female coupler 14 is shown. FIG. 2 depicts the coupling 10 in an uncoupled state. As shown, the flow sleeve 30 of the male nipple is in a forward position such that the radially outward portion of the flow sleeve 30 sealingly engages with the sealing member 32 to close the flow path through the male valve body 16. The male biasing member 34 urges the flow sleeve 30 forward, and the stop 39 of the interlocking element 38 abuts a radially inward shoulder portion 59 of the male valve body 16 to prevent the flow sleeve 30 from further forward movement. In addition, the sealing sleeve 31 of the female coupler 14 is in a forward position such that a radially inward portion of the sealing sleeve 31 engages the sealing member 42, and the rearward portion of the sealing sleeve 31 provides further sealing with the second sealing member 43, which cooperate to close the flow path through the female valve body 23. The female biasing member 46 urges the sealing sleeve 31 forward, and the stop 50 of the interlocking element 49 abuts a radially inward shoulder portion 60 of the sealing sleeve 31 to prevent the sealing sleeve 31 from further forward movement.

Figure 3:
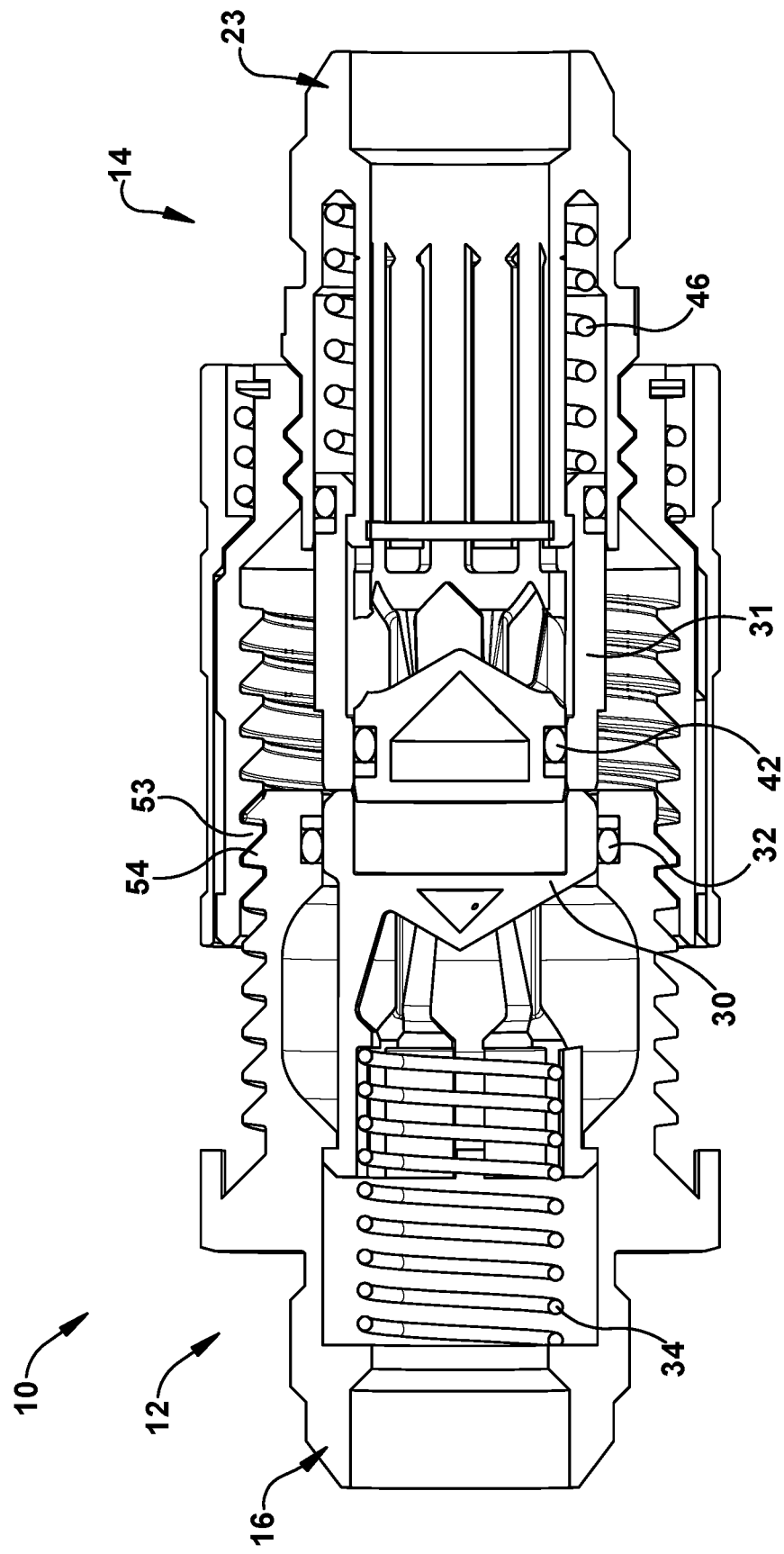

FIG. 3 shows the female coupler 14 partially threadably coupled with the male nipple 12. The respective threads 53, 54 of the female coupler 14 and male nipple 12 may be engaged before the sealing sleeve 31 and flow sleeve 30 are contacted. In this state, the sealing sleeve 31 and flow sleeve 30 are still in their respective closed positions.

Figure 4:
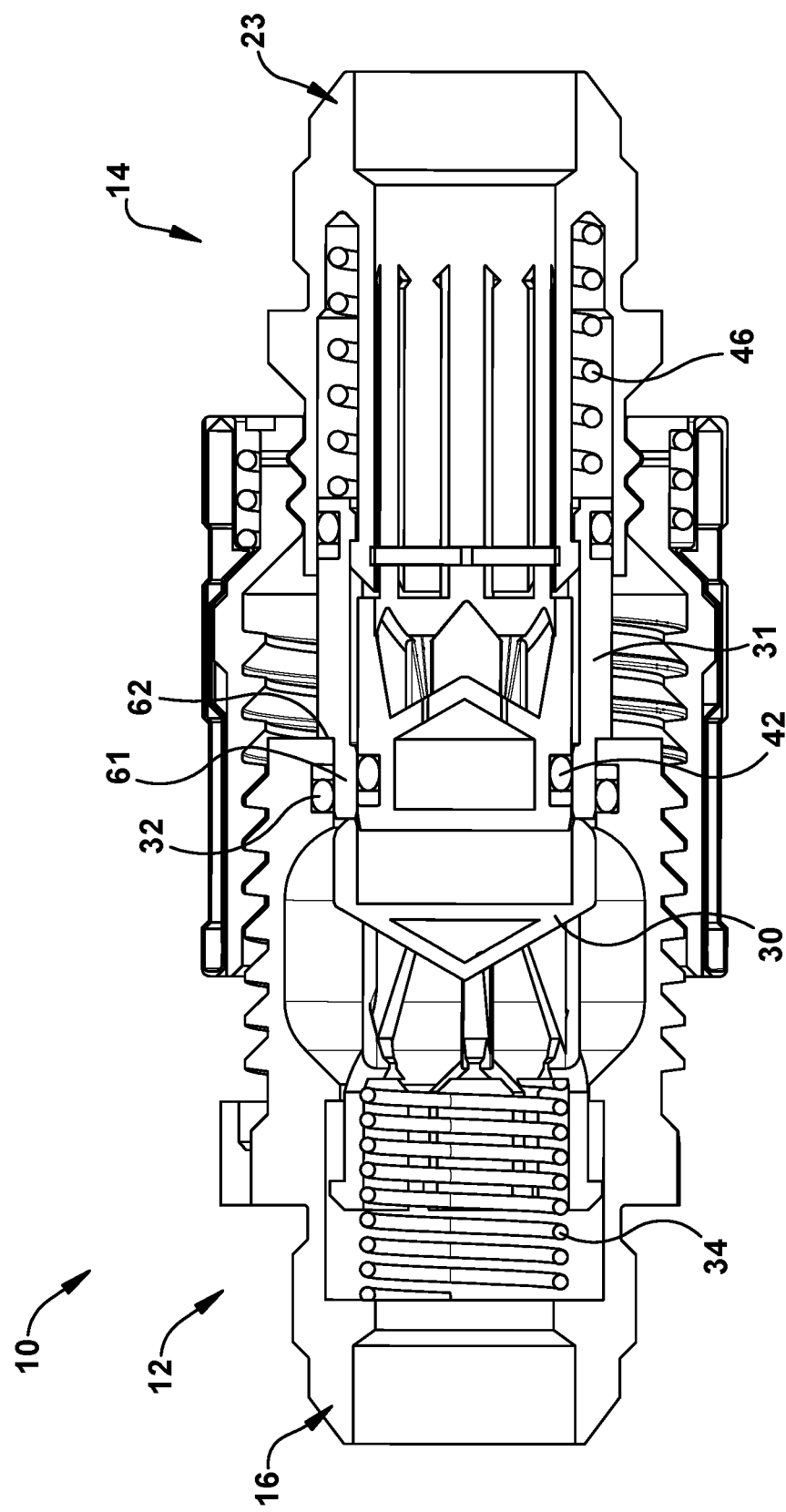

FIG. 4 shows the female coupler 14 further threadably coupled with the male nipple 12, such that a forward end of the sealing sleeve 31 engages a corresponding forward end of the flow sleeve 30, thereby moving the sealing sleeve 31 rearward toward its open position. In the illustrated embodiment, the spring force of the female coupler spring 46 is greater than the spring force of the male nipple spring 34, such that the flow sleeve 30 of the male nipple disengages from the male seal member 32 before the sealing sleeve 31 of the female coupler disengages from its seal member 42. In this manner, the sealing sleeve 31 of the female coupler remains closed, and a radially outer forward end portion 61 of the sealing sleeve 31 may sealingly engage the seal member 32 in the male nipple to provide an interface seal between the coupling members 12, 14 prior to opening flow therebetween. Also as shown in this state, a radially outer shoulder portion 62 toward the forward end portion 61 of the sealing sleeve 31 engages a front face of the male valve body 16, such that further threading of the female coupler 14 onto the male nipple 12 will urge the sealing sleeve 31 rearwardly toward its opened position.

FIG. 5 shows the female coupler 14 and male nipple 12 in a fully-coupled state. As shown, a forward nose portion 63 of the radially inner portion 40 of the female valve body 23 is received within a recessed portion 64 of the flow sleeve 30. As the female coupler 14 is further threaded onto the male nipple 12, this forward nose portion 63 urges flow sleeve 30 rearwardly. In addition, a radially inner surface of the recessed portion 64 engages the sealing member 42 of the female coupler 14. The interlocking element 38 of the flow sleeve 30 rides within an axially elongated radial groove 65 in the male valve body 16 and abuts the rearward shoulder portion 35 of the male valve body 16 when the flow sleeve 30 is in the fully open position. Also as shown, the front face of the male valve body 16 continues to urge the sealing sleeve 31 rearwardly until the front face of the male valve body 16 abuts a corresponding front face of the radially outward portion 41 of the female valve body 23 such that the sealing sleeve 31 is in its fully open position. During this coupling sequence, the seal member 32 of the male valve body 16 maintains the interface seal with the forward end portion 61 of the sealing sleeve 31. In the exemplary fully-coupled state, fluid is permitted to flow through the axial through-passage 24 defined by the radially inward 40 portion of the female valve body 23, through the orifice(s) 48 in the radially inward portion 40, into the enlarged pocket 37 in the male valve body 23, through the orifice(s) 36 in the flow sleeve 30, and out through the axial through passage 17 of the male valve body 16. It is understood that although fluid may flow from right to left in the illustration, fluid flow may flow in either direction through the fluid coupling 10.

Referring to FIGS. 6 and 7, as the fluid coupling 10 is moved toward the fully-coupled state, the forward end portion of the actuating sleeve 55 touches the locking tangs 56 of the male valve body 16 (shown in FIG. 6, for example). As the female coupler 14 continues to thread onto the male nipple 12, the actuating sleeve 55 is biased forwardly, such that the locking tangs 56 snap into the locking slots 57 of the actuating sleeve 55 (shown in FIG. 7, for example). The locking tangs 56 of the nipple 12 received within the locking slots 57 of the coupler 14 serves as a visual indicator that the coupler 14 is fully engaged with the nipple 12.

Referring to FIG. 8, an enlarged cross-sectional view shows the threaded engagement of the male nipple 12 with the female coupler 14. As shown, in exemplary embodiments, the radially outward portion of the male valve body 16 includes the radially outwardly protruding threads 54 having a first side 66a and an axially opposite second side 66b, in which the first side 66a is inclined relative to the radially outward surface of the male valve body having the threads by a first angle (α) in a range of 30-degrees to 60-degrees, and the second side 66b is inclined relative to the radially outward surface of the male valve body having the threads by a second angle (β) in a range of 80-degrees to 100-degrees. More particularly, the first side 66a of the threads may be inclined relative to the axis of the male valve body by an angle of about 45-degrees, and the second side 66b of the threads may be inclined by an angle of about 90-degrees. As shown, the radially inwardly protruding threads 53 of the rotatable thread sleeve 51 have the same configuration relative to the inner surface of the thread sleeve to threadably engage the threads 54 of the male nipple 12 to couple the female coupler 14 to the male nipple 12.

Such a configuration of the threads 53, 54 provides improvements over existing designs of threadable quick disconnect couplings, which have been known to utilize a 29-degree square thread. More particularly, providing one side of the thread 53 and/or 54 with an angle in the range of 30-degrees to 60-degrees, more preferably 45-degrees, will help to additively manufacture, or "print," the corresponding threads 53 and/or 54 of the male nipple 12 and/or female coupler 14 according to various additive manufacturing principles without the need for a support structure during the printing process. The 30-degree to 60-degree thread surface also may act as a clearance angle that will help to mate the two coupling members 12, 14 together. Moreover, such a configuration of the threads having an angle of 30-degrees to 60-degrees on one side and 80-degrees to 100-degrees on the opposite side will provide improved strength compared to the 29-degree square thread. More particularly, the respective coupling members 12, 14 may be configured such that the thread surface having the incline of 80-degrees to 100-degrees, more particularly 90-degrees, will enhance the load-handling capability of the quick coupling, such that the quick coupling may withstand full axial and thrust load due to pressure, vibration, impulse, and/or other load condition.

Referring to FIGS. 9-19, various exemplary embodiments of the interlocking element that slidably secures the sealing sleeve to the radially inward portion of the female valve body will be described in further detail.

Figure 11:
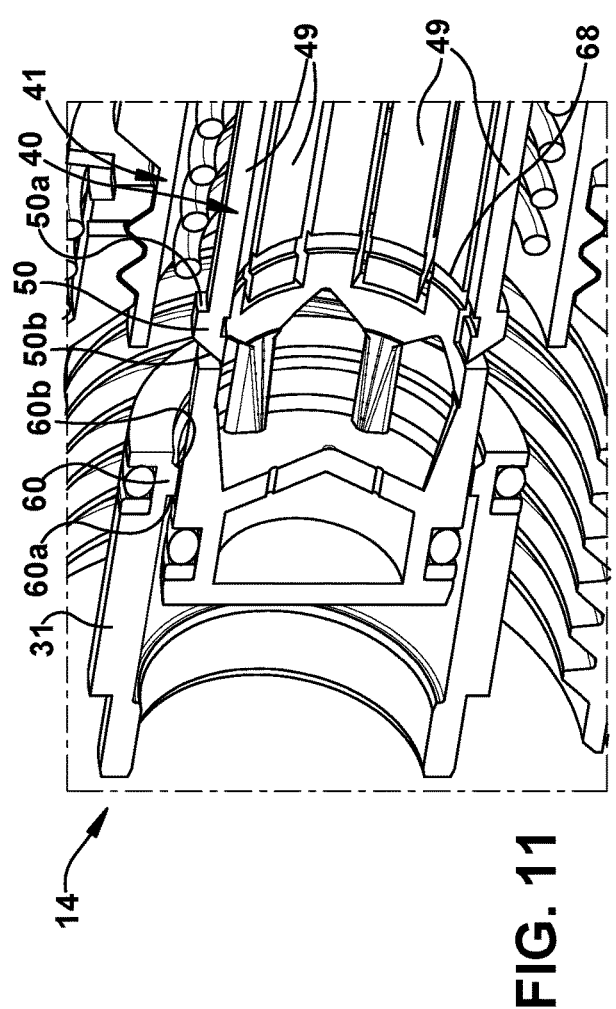
FIGS. 11 and 12 are close-up perspective cutaway views of FIGS. 9 and 10, respectively, except shown from the opposite side.
Figure 12:
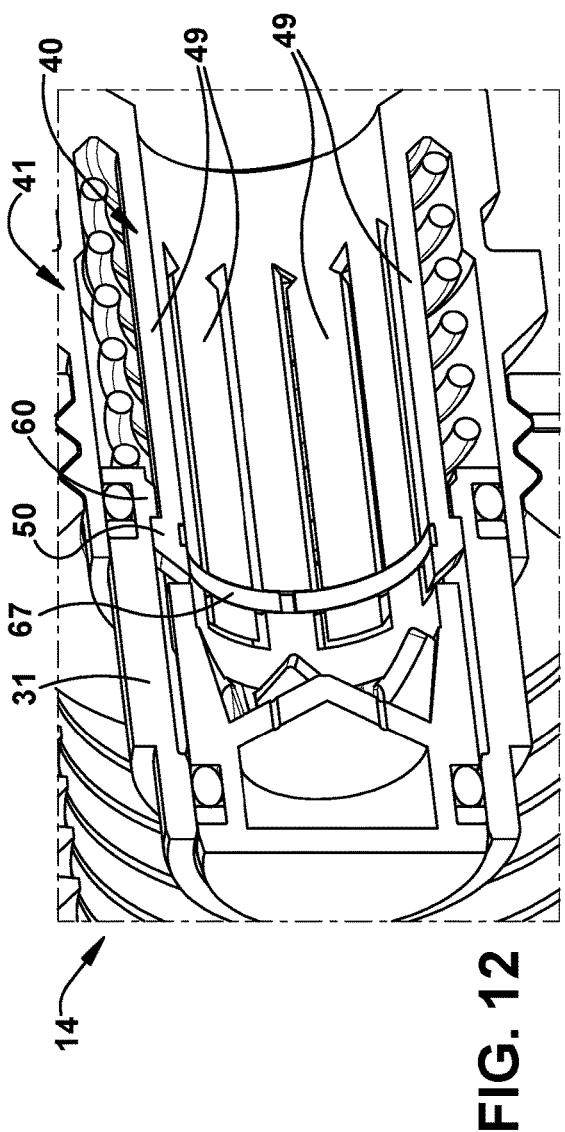

Referring particularly to FIGS. 9-12, the interlocking element 49 of the above-referenced female coupler 14 is described in further detail. In the illustrated embodiment, the interlocking element 49 is configured as a resilient interlocking element, including at least one flexible finger element (also referred to with reference numeral 49) which is formed by the radially inward portion 40 of the female valve body 23. FIG. 9 shows the sealing sleeve 31 prior to slidable securement with the female valve body 23, and FIG. 10 shows the sealing sleeve 31 slidably secured to a radially outer surface of the radially inward portion 40 of the female valve body 23. FIGS. 11 and 12 are close-up perspective views of FIGS. 9 and 10, respectively, except shown from the opposite side.

As discussed above, the at least one flexible finger element 49 is configured to interlockingly engage with the sealing sleeve 31 to permit the sealing sleeve to move between a forward and a rearward position within the female valve body 23. The flexible finger element 49 also includes stop 50, which is configured to restrict further forward movement of the sealing sleeve 31 beyond the forward position. In the illustrated embodiment, the stop 50 is formed as a radially outwardly protruding abutment at a forward end portion of the flexible finger element 49. In the illustrated embodiment, the stop 50 has a vertical surface 50a (e.g., perpendicular to the longitudinal axis) and an opposite tapered surface 50b. As discussed above, the sealing sleeve 31 provides corresponding stop 60 formed at a radially inward portion of the sealing sleeve 31. As shown, the stop 60 is configured as a radially inwardly protruding abutment having a vertical surface 60a (e.g., perpendicular to the longitudinal axis) and an opposite tapered surface 60b. It is understood, however, that in other exemplary embodiments, the surface 50a may be inclined relative to the longitudinal axis by an angle in the range from 30-degrees (e.g., the surface 50a inclined rearwardly and radially outwardly to form a concave space) to 90-degrees (perpendicular). Accordingly, the surface 60a may correspondingly be inclined relative to the longitudinal axis by an angle in the range from 30-degrees (e.g., the surface 60a inclined forwardly and radially inwardly to form a concave space) to 90-degrees (perpendicular) to thereby interface with the surface 50a.

As depicted in the exemplary illustrations of FIG. 9 and FIG. 10, when the sealing sleeve 31 is pushed towards the radially inward portion 40 of the female valve body 23 during installation, the tapered surface 60b of the sealing sleeve 31 will urge the flexible finger element 49 radially inwardly due to the wedge action between tapered surfaces 50b and 60b. By continuing to push the sealing sleeve 31 onto the radially inward portion 40, the flexible finger element 49 will bend inwardly and allow the sealing sleeve 31 to advance. The resiliency of the flexible finger element 49 will allow the finger element to bounce back toward its original position after the vertical surface 60a of the sealing sleeve 31 crosses the vertical surface 50a of the finger element 49. In this manner, the sealing sleeve 31 may be slidably secured onto the radially inward portion 40 of the female valve body 23 to permit the sealing sleeve 31 to move between forward and rearward positions, and the respective vertical surfaces 60a, 50a of the sealing sleeve 31 and the flexible finger element 49 enable the radially inward portion 40 of the coupler body to interlockingly engage with the sealing sleeve 31 to restrict further forward movement of the sealing sleeve 31 beyond the engagement position of the vertical surfaces 50a, 60a. Such a configuration allows the sealing sleeve 31 to be installed without additional tooling, and also makes the sealing sleeve difficult to remove after its installation on the female valve body 23.

In exemplary embodiments, the radially inward portion 40 of the female valve body forms a plurality of independently moveable flexible finger elements 49 that are circumferentially disposed about the longitudinal axis. The plurality of flexible finger elements 49 may each have the same size and configuration. In exemplary embodiments, the cross-sectional areas of the stops 50 and 60 may be configured to withstand full axial load from pressure, vibration, impulse environmental conditions, or other similar loads during use of the coupling 10.

Also shown in the illustrated embodiment, a snap ring 67 or other suitable structure may be utilized to restrict further radially inward movement of the flexible finger elements 49 after the sealing sleeve 31 has been slidably secured to the radially inward portion 40 of the female valve body. In the illustrated embodiment, the snap ring 67 is disposed within a radially inner groove 68 of the flexible finger elements 49, and will restrict the flexible finger elements from flexing radially inwardly during loading conditions, which otherwise could interrupt flow through the female valve body 23.

Referring to FIGS. 13 and 14, an alternative exemplary embodiment of a resilient interlocking element 149 that slidably secures sealing sleeve 131 to a radially inward portion 140 of female valve body 123 is shown, in which the resilient interlocking element 149 includes at least one flexible finger element (also referred to with reference numeral 149) which is formed by a portion of the sealing sleeve 131. The female coupler 114 shown in FIGS. 13 and 14 is substantially the same as or similar to the above-referenced female coupler 14, and consequently the same reference numerals but in the 100-series are used to denote structures corresponding to the same or similar structures in the female couplers. In addition, the foregoing description of the female coupler 14 is equally applicable to the female coupler 114, and thus aspects of the female couplers may be substituted for one another or used in conjunction with one another where applicable, except as noted below.

FIG. 13 shows the sealing sleeve 131 prior to slidable securement with the female valve body 123, and FIG. 14 shows the sealing sleeve 131 slidably secured to the radially inward portion 140 of the female valve body. In the illustrated embodiment, the resilient interlocking element 149 is formed by a rearward end portion of the sealing sleeve 131, which is configured to interlockingly engage with the radially inward portion 140 of the female valve body to permit the sealing sleeve 131 to move between a forward and a rearward position within the female valve body 123. The flexible finger element 149 also has a stop 160 that is configured to restrict further forward movement of the sealing sleeve 131 beyond the forward position. In the illustrated embodiment, the stop 160 is formed as a radially inwardly protruding abutment of the flexible finger element 149 having a vertical (e.g., perpendicular) surface 160a and an opposite stepped and tapered surface 160b. Also as shown, the radially inward portion 140 of the female valve body includes at least one axially extending slot 169, into which at least a portion of the flexible finger element 149 protrudes radially inwardly to provide slidable interlocking engagement between the sealing sleeve 131 and the female valve body 123.

More particularly, as depicted in the exemplary illustrations of FIG. 13 and FIG. 14, when the sealing sleeve 131 is pushed towards the female valve body 123 during installation, the at least one flexible finger element 149 of the sealing sleeve 131 will deflect radially outwardly and ride over the radially outward surface of the radially inward portion 140 of the female valve body. By continuing to push the sealing sleeve 131 onto the radially inward portion 140, the resiliency of the flexible finger element 149 will allow the finger element to snap into the slot 169 of the female valve body 123. In this manner, the flexible finger element 149 is guided by the slot 169 such that the sealing sleeve 131 may be slidably secured onto the radially inward portion 140 of the female valve body 123 to permit the sealing sleeve 131 to move between forward and rearward positions. Also as shown, the vertical surface 160a of the stop that is formed by the flexible finger element 149 of the sealing sleeve 131 is configured to interlockingly engage a surface that at least partially defines an axial end portion of the slot 169 to restrict further forward movement of the sealing sleeve 131 beyond the engagement position of the respective vertical surfaces (as shown in FIG. 14, for example). Such a configuration allows the sealing sleeve 131 to be installed without additional tooling, and also makes the sealing sleeve 131 difficult to remove after its installation on the female valve body 123. Furthermore, a separate snap ring may not be required for such a configuration.

It is understood that although one or more flexible finger elements 149 of the sealing sleeve 131 are shown as being disposed toward a rearward end portion of the sealing sleeve 131, the one or more flexible finger elements 149 may be provided toward an intermediate portion or forward end portion of the sealing sleeve 131. In addition, as shown in the illustrated embodiment, a plurality of independently moveable flexible finger elements 149 formed by corresponding portions of the sealing sleeve 131 may be provided. The plurality of flexible finger elements 149 may be circumferentially disposed about the longitudinal axis, and each flexible finger element 149 may each have the same size and configuration as each other. Correspondingly, the radially inward portion 140 of the female valve body 123 may have a plurality of axially extending slots 169 for receiving the plurality of flexible finger elements 149. In exemplary embodiments, the cross-sectional areas of the respective stops of the finger element(s) 149 and the end surface of the slot(s) 169 may be configured to withstand full axial load from pressure, vibration, impulse environmental conditions, or other similar loads during use of the coupling.

Referring to FIG. 15, an alternative exemplary embodiment of a resilient interlocking element 249 is shown, wherein the interlocking element 249 is configured as a resilient interlocking element including at least one flexible finger element formed by a portion of sealing sleeve 231, in which the at least one flexible finger element is configured as a spring leg (also referred to with reference numeral 249). It is understood that female coupler 214 shown in FIG. 15 is substantially the same as or similar to the above-referenced female coupler(s) (e.g., 14), and consequently the same reference numerals but in the 200-series are used to denote structures corresponding to the same or similar structures in the female couplers. In addition, the foregoing description of the female coupler(s) (e.g., 14) is equally applicable to the female coupler 214, and thus aspects of the female couplers may be substituted for one another or used in conjunction with one another where applicable, except as noted below.

In the illustrated embodiment, the at least one spring leg 249 has a radially inward bias, such that at least a portion of the spring leg may protrude radially inwardly into a slot 269 in the radially inward portion 240 of the female valve body 223 so that a portion of the spring leg may serve as a stop 260 that engages a surface defining at least a portion of the slot 269, thereby restricting further forward movement of the sealing sleeve 231. As shown, the spring leg 249 may have an inclined surface 260b that is configured to engage a corresponding inclined surface at one end of the slot 269, such that the spring leg 249 may move out of the slot 269 and allow the spring leg 249 to ride over a radially outward surface of the radially inward potion 240 of the female valve body, thereby enabling the sealing sleeve 231 to move between forward and rearward positions. Such a configuration allows the sealing sleeve 231 to be installed without additional tooling, and also makes the sealing sleeve difficult to remove after its installation on the female valve body 223. In exemplary embodiments, a plurality of independently moveable spring legs 249 formed by corresponding portions of the sealing sleeve 231 may be provided, in which the plurality of spring legs 249 may be circumferentially disposed about the longitudinal axis, with each spring leg 249 having the same size and configuration as each other. Correspondingly, the radially inward portion 240 of the female valve body may have a plurality of slots 269 for receiving the plurality of spring legs in the manner described above.

Referring to FIGS. 16 and 17, an alternative exemplary embodiment of a resilient interlocking element 349 that slidably secures sealing sleeve 331 to radially inward portion 340 of female valve body 323 is shown, in which the resilient interlocking element 349 includes a discrete snap ring (also referred to with reference numeral 349) which is disposed in a radial groove 369 of the radially inward portion 340 of the female valve body. The female coupler 314 shown in FIGS. 16 and 17 is substantially the same as or similar to the above-referenced female coupler(s) (e.g., 14), and consequently the same reference numerals but in the 300-series are used to denote structures corresponding to the same or similar structures in the female couplers. In addition, the foregoing description of the female coupler(s) (e.g., 14) is equally applicable to the female coupler 314, and thus aspects of the female couplers may be substituted for one another or used in conjunction with one another where applicable, except as noted below.

FIG. 16 shows the sealing sleeve 331 prior to slidable securement with the female valve body 323, and FIG. 17 shows the sealing sleeve 331 slidably secured to a radially outward surface of the radially inward portion 340 of the female valve body. As depicted in FIGS. 16 and 17, during installation the sealing sleeve 331 is pushed towards the female valve body 323 and passes over the snap ring groove 369 in the female valve body. Then, the snap ring 349 is secured in place in the groove 369, such as with a snap ring assembly tool. Such a configuration permits the sealing sleeve 331 to move between forward and rearward positions within the female valve body 323, and the snap ring 349 serves as a stop that is configured to restrict further forward movement of the sealing sleeve 331 beyond an engagement position in which the forward face of the sealing sleeve 331 engages the snap ring 349.

Referring to FIGS. 18 and 19, an alternative exemplary embodiment of an interlocking element 449 that slidably secures sealing sleeve 431 to radially inward portion 440 of female valve body 423 is shown, in which the interlocking element 449 includes captive screw thread(s) 449a on the sealing sleeve 431 and corresponding captive screw thread(s) 449b on the radially inward portion 440 of the female valve body. The female coupler 414 shown in FIGS. 18 and 19 is substantially the same as or similar to the above-referenced female coupler(s) (e.g., 14), and consequently the same reference numerals but in the 400-series are used to denote structures corresponding to the same or similar structures in the female couplers. In addition, the foregoing description of the female coupler(s) (e.g., 14) is equally applicable to the female coupler 414, and thus aspects of the female couplers may be substituted for one another or used in conjunction with one another where applicable, except as noted below.

FIG. 18 shows the sealing sleeve 431 prior to slidable securement with the female valve body 423, and FIG. 19 shows the sealing sleeve 431 slidably secured to a radially outward surface of the radially inward portion 440 of the female valve body. As depicted in FIGS. 18 and 19, the sealing sleeve 431 has radially inward thread portion 449a configured to thread past radially outward thread portion 449b of the radially inward portion 440 of the female valve body. In this manner, the sealing sleeve 431 is permitted to move between forward and rearward positions within the female valve body 423, and the respective thread portions 449a, 449b of the sealing sleeve 431 and female valve body 423 serve as stops that are configured to restrict further forward movement of the sealing sleeve 431 beyond the forward position.

In exemplary embodiments, both the radially outward thread portion 449b of the female valve body 423 and the radially inward thread portion 449a of the sealing sleeve 431 are configured as one or more standard screw threads. As shown, a lead surface 450b, 460b of the respective thread(s) 449b, 449a may be tapered for facilitating the threading of the sealing sleeve 431 beyond the thread(s) 449b of the radially inward portion 440 of the female valve body. The opposite side of the respective thread portions 449a, 449b of the sealing sleeve 431 and female valve body 423 may each have a vertical (e.g., perpendicular) surface 460a, 450a that serve as the respective stops. The radially inward portion 440 of the female valve body and the sealing sleeve 431 may have point contact due to the helical form of the respective threads 449a, 449b, but the threads may be deformed during proof pressure testing to further enhance the securement of the sealing sleeve 431 to the radially inward portion 440 of the female valve body 423. Such a configuration may have partial surface contact under load conditions. Moreover, such a configuration allows the sealing sleeve 431 to be installed without additional tooling, and also makes the sealing sleeve 431 difficult to remove after its installation on the female valve body 423.

Referring to FIGS. 20-29, various exemplary embodiments of the interlocking element that slidably secures the flow sleeve with the male valve body will be discussed in further detail.

Referring particularly to FIGS. 20 and 21, the interlocking element 38 of the above-referenced male nipple 12 is described in further detail. In the illustrated embodiment, the interlocking element 38 is configured as a resilient interlocking element, including at least one flexible finger element (also referred to with reference numeral 38) which is formed by a portion of the flow sleeve 30. FIG. 20 shows the flow sleeve 30 prior to slidable securement with the male valve body 16, and FIG. 21 shows the flow sleeve 38 slidably secured to the male valve body 16.

As shown, the at least one flexible finger element 38 is configured to interlockingly engage with the male valve body 16 to permit the flow sleeve 30 to move between a forward and a rearward position within the male valve body 16. The flexible finger element 38 also includes stop 39, which is configured to restrict further forward movement of the flow sleeve 30 beyond the forward position. In the illustrated embodiment, the at least one flexible finger element 38 is formed by a rearwardly extending portion of the flow sleeve 30, and the stop 39 is formed as a radially outwardly protruding abutment at a rearward end portion of the flexible finger element 38. As shown, the stop 39 has a vertical (e.g., perpendicular) surface 39a and an opposite tapered surface 39b. As discussed above, the male valve body 16 provides corresponding stop 59 formed at a radially inwardly portion of the male valve body 16. In the illustrated embodiment, the stop 59 is configured as a radially inwardly protruding abutment having a vertical (e.g., perpendicular)

surface 59*a* and an opposite tapered circumferential surface 59*b* that also defines a rearward portion of the radially enlarged pocket 37 of the male valve body 16. It is understood, however, that in other exemplary embodiments, the surface 39*a* may be inclined relative to the longitudinal axis by an angle in the range from 30-degrees (e.g., the surface 39*a* inclined forwardly and radially outwardly to form a concave space) to 90-degrees (perpendicular). Accordingly, the surface 59*a* may correspondingly be inclined relative to the longitudinal axis by an angle in the range from 30-degrees (e.g., the surface 59*a* inclined rearward and radially inwardly to form a concave space) to 90-degrees (perpendicular) to interface with the surface 39*a*

As depicted in the exemplary illustrations of FIG. 20 and FIG. 21, during installation the biasing member 34 of the male nipple 12 may first be compressed, such as by utilizing an external fixture or plastic tie straps. As shown, when the flow sleeve 30 is pushed towards the tapered surface 59*b* of the male valve body 16, the tapered surface 39*b* on the flexible finger element stop 39 will urge the flexible finger element 38 radially inwardly due to the wedge action between tapered surfaces 39*b*, 59*b*. By continuing to push the flow sleeve 30 over the radially inwardly protruding portion of the male valve body that forms the stop 59, the flexible finger element 38 will bend inwardly and allow the flow sleeve 30 to advance. The resiliency of the flexible finger element 38 will allow the finger element to bounce back toward its original position after the vertical surface 39*a* of the finger element stop 39 crosses the vertical surface 59*a* of the male valve body 16.

As discussed above, the male valve body 16 includes axially elongated radial groove 65 that is configured to slidably receive the abutment, or stop 39, of the flexible finger element 38, such that the flow sleeve 30 may be slidably secured within the male valve body 16 to permit the flow sleeve 30 to move between forward and rearward positions. In addition, the respective vertical surfaces 39*a*, 59*a* of the flow sleeve 30 and the male valve body 16 enables the flow sleeve 30 to interlockingly engage with the male valve body to restrict further forward movement beyond the engaged position of the vertical surfaces. Such a configuration allows the flow sleeve 30 to be installed without additional tooling, and also makes the flow sleeve difficult to remove after its installation in the male valve body 16.

In exemplary embodiments, the flow sleeve 30 forms a plurality of independently moveable flexible finger elements 38 that are circumferentially disposed about the longitudinal axis. The plurality of flexible finger elements 38 may each have the same size and configuration. In exemplary embodiments, the cross-sectional areas of the respective stops 39 and 59 may be configured to withstand full axial load from pressure, vibration, impulse environmental conditions, or other similar loads during use of the coupling.

As shown in FIG. 21, after the flow sleeve 30 has been slidably secured within the male valve body 16, the biasing member 34 may be uncoiled by removing the fixture or removing the tie straps. The biasing member 34 may abut a radially inward shoulder portion 70 of the flow sleeve 30, and may be in close proximity to the flexible finger elements 38 to thereby restrict the flexible finger elements 38 from flexing radially inwardly during loading conditions.

Referring to FIGS. 22 and 23, an alternative exemplary embodiment of a resilient interlocking element 538 that slidably secures flow sleeve 530 to male valve body 516 is shown, in which the resilient interlocking element 538 includes a plurality of spring legs (also referred to with reference numeral 538) that are disposed circumferentially about at least a portion of the flow sleeve 530. The male nipple 512 shown in FIGS. 22 and 23 is substantially the same as or similar to the above-referenced male nipple 12, and consequently the same reference numerals but in the 500-series are used to denote structures corresponding to the same or similar structures in the male nipples. In addition, the foregoing description of the male nipple 12 is equally applicable to the male nipple 512, and thus aspects of the male nipples may be substituted for one another or used in conjunction with one another where applicable, except as noted below.

In the illustrated embodiment, the plurality of spring legs 538 are formed by a forward portion of the flow sleeve 530, such as via an additive manufacturing technique, and are axially aligned with each other. As shown, each spring leg 538 is independently moveable and has a radially outward bias, such that at least a portion of the spring leg 538 may protrude radially outwardly into the enlarged pocket 537 of the male valve body 516. The enlarged pocket 537 may thereby enable the flow sleeve 530 to move between forward and rearward positions in the male valve body 516. Each spring leg 538 also includes a stop 539 for engaging the male valve body 516, thereby restricting further forward movement of the flow sleeve 530 beyond the engaged forward position. In the illustrated embodiment, at least a portion of the respective spring legs 538 serve as the stop 539 that engages a stop surface 559 of the male valve body 516, such as a vertical (e.g., perpendicular) surface. As shown, the spring legs 538 may each have a flat surface that serves as the stop 539 for engage the vertical surface 559 of the male valve body.

As depicted in the exemplary illustrations of FIG. 22 and FIG. 23, when the flow sleeve 530 is pushed towards the male valve body 516 during installation, the spring legs 538 of the flow sleeve 530 will deflect radially inwardly and ride over the seal member 532 and corresponding seal groove in the male valve body 516. By continuing to push the flow sleeve 530 over the male body 516, the spring legs 538 of the flow sleeve 530 will spring into the pocket 537 formed by the male valve body. Such a configuration allows the flow sleeve 530 to be installed without additional tooling, and also makes the flow sleeve difficult to remove after its installation into the male valve body 516. As shown, each spring leg 538 may have the same size and configuration as each other, although it is understood that the spring legs 538 also may be different from one another. In exemplary embodiments, the cross-sectional areas of the respective stop portions 539 and 559 may be configured to withstand full axial load from pressure, vibration, impulse environmental conditions, or other similar loads during use of the coupling.

Referring to FIGS. 24 and 25, an alternative exemplary embodiment of a resilient interlocking element 638 that slidably secures flow sleeve 630 to male valve body 616 is shown, in which the resilient interlocking element 638 includes a plurality of spring-biased pins (also referred to with reference numeral 638) that are disposed circumferentially about at least a portion of the flow sleeve 630. The male nipple 612 shown in FIGS. 24 and 25 is substantially the same as or similar to the above-referenced male nipple(s) (e.g., 12), and consequently the same reference numerals but in the 600-series are used to denote structures corresponding to the same or similar structures in the male nipples. In addition, the foregoing description of the male nipple(s) (e.g., 12) is equally applicable to the male nipple 612, and thus aspects of the male nipples may be substituted for one another or used in conjunction with one another where applicable, except as noted below.

In the illustrated embodiment, the plurality of spring-biased pins 638 are formed at a forward portion of the flow sleeve 630 and are axially aligned with each other. As shown, each spring-biased pin 638 may include a spring 671 disposed in a spring chamber of the flow sleeve 630, such that each pin 638 is independently moveable and has a radially outward bias. In this manner, at least a portion of each pin 638 may protrude radially outwardly into the enlarged pocket 637 of the male valve body 616. The enlarged pocket 637 may thereby enable the flow sleeve 630 to move between forward and rearward positions in the male valve body 616. Each pin 638 also includes a stop 639 for engaging the male valve body, thereby restricting further forward movement of the flow sleeve 630 beyond the engaged forward position. As shown, at least a portion of the respective pins 638 serve as the stop 639 that engages a surface 659 of the male valve body. In the illustrated embodiment, the forward surface of each pin 638 is tapered to engage the corresponding surface 659 of the male valve body, which is also tapered, to thereby serve as the respective stops 639, 659.

As depicted in the exemplary illustrations of FIG. 24 and FIG. 25, when the flow sleeve 630 is pushed towards the male valve body 616 during installation, the spring-biased pins 638 of the flow sleeve 630 will move radially inwardly and ride over the seal member 632 and corresponding seal groove in the male valve body 616. By continuing to push the flow sleeve 630 over the male body 616, the spring-biased pins 638 of the flow sleeve 630 will spring into the pocket 637 formed by the male valve body 616. Such a configuration allows the flow sleeve 630 to be installed without additional tooling, and also makes the flow sleeve difficult to remove after its installation into the male valve body. As shown, each spring-biased pin 638 may have the same size and configuration as each other. In exemplary embodiments, the cross-sectional areas of the respective pins 638 may be configured to withstand full axial load from pressure, vibration, impulse environmental conditions, or other similar loads during use of the coupling.

Referring to FIGS. 26 and 27, an alternative exemplary embodiment of a resilient interlocking element 738 that slidably secures flow sleeve 730 to male valve body 716 is shown, in which the resilient interlocking element 738 includes a discrete snap ring (also referred to with reference numeral 738) which is disposed in a radial groove 772 of the flow sleeve 730. The male nipple 712 shown in FIGS. 26 and 27 is substantially the same as or similar to the above-referenced male nipple(s) (e.g., 12), and consequently the same reference numerals but in the 700-series are used to denote structures corresponding to the same or similar structures in the male nipple. In addition, the foregoing description of the male nipple(s) (e.g., 12) is equally applicable to the male nipple 712, and thus aspects of the male nipples may be substituted for one another or used in conjunction with one another where applicable, except as noted below.

FIG. 26 shows the flow sleeve 730 prior to slidable securement with the male valve body 716, and FIG. 27 shows the flow sleeve 730 slidably secured to the male valve body 716. As depicted in FIGS. 26 and 27, during installation the flow sleeve 730 is pushed towards the male valve body 716 and beyond the sealing member 732 and a radial shoulder portion 759 of the male valve body 716. Then, the snap ring 738 is secured in place in the radial groove 772 of the flow sleeve 730, such as with a snap ring assembly tool. Such a configuration permits the flow sleeve 730 to move between forward and rearward positions within the male valve body 716, and the snap ring 738 serves as a stop that is configured to restrict further forward movement of the flow sleeve beyond an engagement position in which the radial shoulder portion 759 of the male valve body 716 engages the snap ring 738.

Referring to FIGS. 28 and 29, an alternative exemplary embodiment of an interlocking element 838 that slidably secures flow sleeve 830 to male valve body 816 is shown, in which the interlocking element 838 includes captive screw thread(s) 838a on the flow sleeve 830 and corresponding captive screw thread(s) 838b on a radially inward portion of the male valve body 816. The male nipple 812 shown in FIGS. 28 and 29 is substantially the same as or similar to the above-referenced male nipple(s) (e.g., 12), and consequently the same reference numerals but in the 800-series are used to denote structures corresponding to the same or similar structures in the male nipple. In addition, the foregoing description of the male nipple(s) (e.g., 12) is equally applicable to the male nipple 812, and thus aspects of the male nipples may be substituted for one another or used in conjunction with one another where applicable, except as noted below.

FIG. 28 shows the flow sleeve 830 prior to slidable securement with the male valve body 816, and FIG. 29 shows the flow sleeve 830 slidably secured to the male valve body 816. As depicted in FIGS. 28 and 29, the flow sleeve 830 has radially outward thread portion 838a configured to thread past radially inward thread portion 838b of the male valve body 816. In this manner, the flow sleeve 830 is permitted to move between forward and rearward positions within the male valve body 816, and the respective thread portions 838a, 838b of the flow sleeve 830 and male valve body 816 serve as stops that are configured to restrict further forward movement of the flow sleeve 830 beyond an engaged forward position.

In exemplary embodiments, both the radially inward thread portion 838b of the male valve body 816 and the radially outward thread portion 838a of the flow sleeve 830 are configured as a one or more standard screw thread(s). As shown, a lead surface 839b of the flow sleeve thread(s) 838a and a lead surface 859b of the male body thread(s) 838b may each be tapered for facilitating the threading of the flow sleeve 830 beyond the thread(s) 838b of the male valve body 816. The opposite side of the respective thread portions 838b, 838a of the male valve body 816 and the flow sleeve 830 may each have a vertical (e.g., perpendicular) surface that serve as the respective stops. The male valve body 816 and the flow sleeve 830 may have point contact due to the helical form of the respective thread(s) 838a, 838b, but the thread(s) may be deformed during proof pressure testing to further enhance the securement of the flow sleeve 830 to male valve body 816. Such a configuration may have partial surface contact under load conditions. Moreover, such a configuration allows the flow sleeve 830 to be installed without additional tooling, and also makes the flow sleeve difficult to remove after its installation on the male valve body 816.

Referring to FIGS. 30-34, various exemplary embodiments of the interface that couples the rotatable thread sleeve to the female valve body will be discussed in further detail. As discussed above, the rotatable thread sleeve is generally coupled to the radially outward portion of the female valve body at the interface, which is configured to permit the thread sleeve to freely rotate about the longitudinal axis of the female valve body, independent of movement of the female valve body, and while also axially constraining the thread sleeve.

Figure 30:
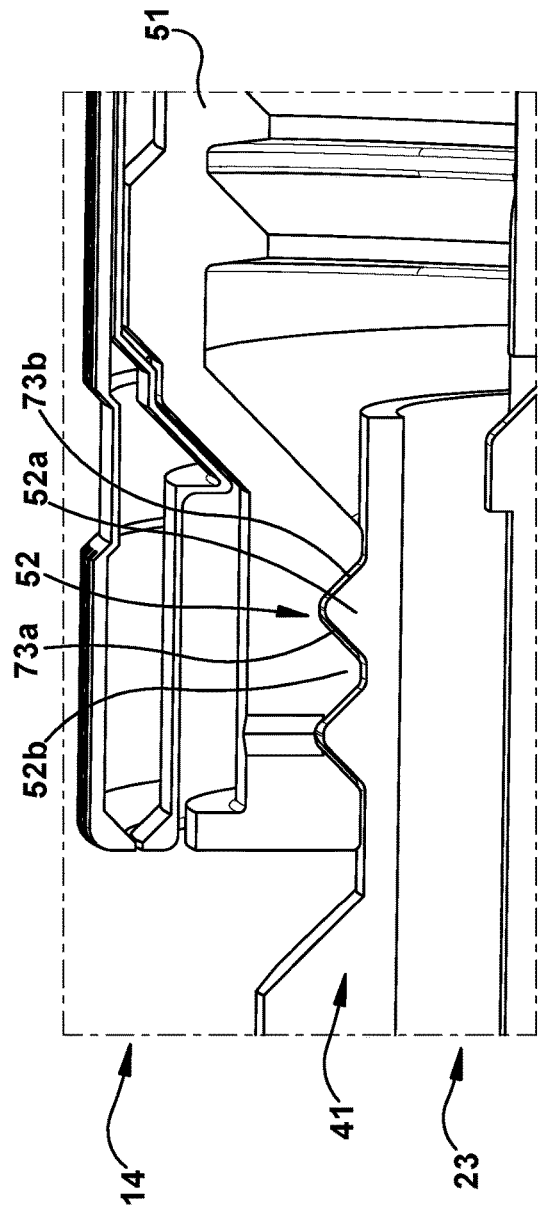
FIG. 30 is an enlarged cross-sectional side view of a portion of the female coupler in FIG. 1, showing exemplary opposing interlocking teeth that form an interface for coupling a rotatable thread sleeve to the female valve body.
Figure 31:
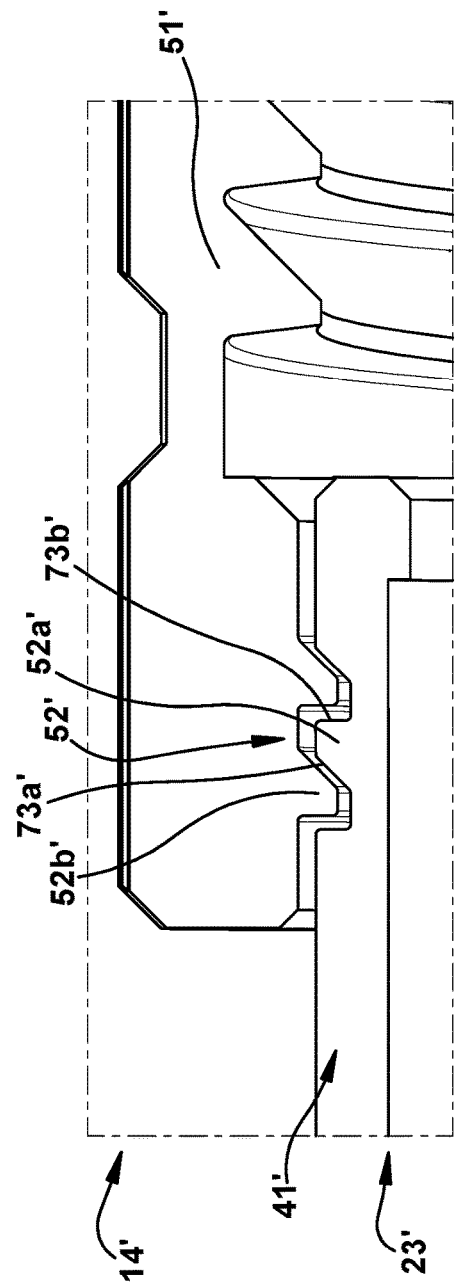
FIG. 31 is a cross-sectional side view of another exemplary embodiment of opposing interlocking teeth that form an interface for coupling a rotatable thread sleeve to an exemplary female valve body.

Referring particularly to FIGS. 30 and 31, the interface 52, 52' that couples the rotatable thread sleeve 51, 51' to the female valve body 23, 23' includes opposing interlocking teeth disposed on the female valve body and on the rotatable thread sleeve. More particularly, as shown in the illustrated embodiments, the radially outward portion 41, 41' of the female valve body includes one or more radially outwardly protruding teeth 52a, 52a', and the rotatable thread sleeve 51, 51' includes one or more radially inwardly protruding teeth 52b, 52b' that are configured to interlock with each other to permit the thread sleeve 51, 51' to rotate freely about the female valve body 23, 23', while restricting axial movement of the thread sleeve.

FIG. 30 shows one exemplary embodiment of the interface 52 configured as interlocking teeth 52a, 52b. In the illustrated embodiment, the cross-sectional profile of each tooth 52a on the female valve body has a first side 73a and an axially opposite second side 73b, in which the first side 73a is inclined relative to the radially outward portion 41 of the female valve body by an angle in a range of 30-degrees to 60-degrees, and the second side 73b is inclined relative to the radially outward portion of the female valve body by an angle of 30-degrees to 60-degrees. More particularly, the respective angles of the first side 73a and second side 73b may be about 45-degrees. As shown, the radially inwardly protruding teeth 52b of the rotatable thread sleeve 51 have the same configuration to rotatably engage the teeth of the female valve body.

FIG. 31 shows another exemplary embodiment of the interface 52' configured as interlocking teeth 52a', 52b'. As shown, the teeth 52a' of the female valve body have a first side 73a' that is inclined relative to the radially outward portion 41' of the female valve body by an angle in a range of 30-degrees to 60-degrees, and the second side 73b' is inclined relative to the radially outward portion 41' of the female valve body by an angle of 80-degrees to 100-degrees. More particularly, the first side 73a' may be inclined by an angle of about 45-degrees and the second side 73b' may be inclined by an angle of about 90-degrees. As shown, the radially inwardly protruding teeth 52b' of the rotatable thread sleeve 51' have the same configuration to rotatably engage the teeth of the female valve body.

Providing one side of the thread in a range of 30-degrees to 60-degrees, more preferably 45-degrees, may help to additively manufacture the corresponding interlocking teeth of the female valve body and thread sleeve according to various additive manufacturing principles without the need for a support structure during the printing process. Moreover, such a configuration of the threads having 30-degrees to 60-degrees one side and 80-degrees to 100-degrees on the opposite side also will facilitate additive manufacturing while further enhancing strength during thrust loading.

In exemplary embodiments, the gap between the interlocking teeth 52 or 52' may be suitably formed depending on the manufacturing methodology (e.g., additive manufacturing) and the material utilized. The gap may be filled with lubricants to reduce the friction. Lubricants such as oil, solid, grease, dry, penetrating, film, and/or other suitable lubricants may be utilized to reduce the friction, in which the thickness of the lubricant utilized may depend on the type of application.

Figure 32:
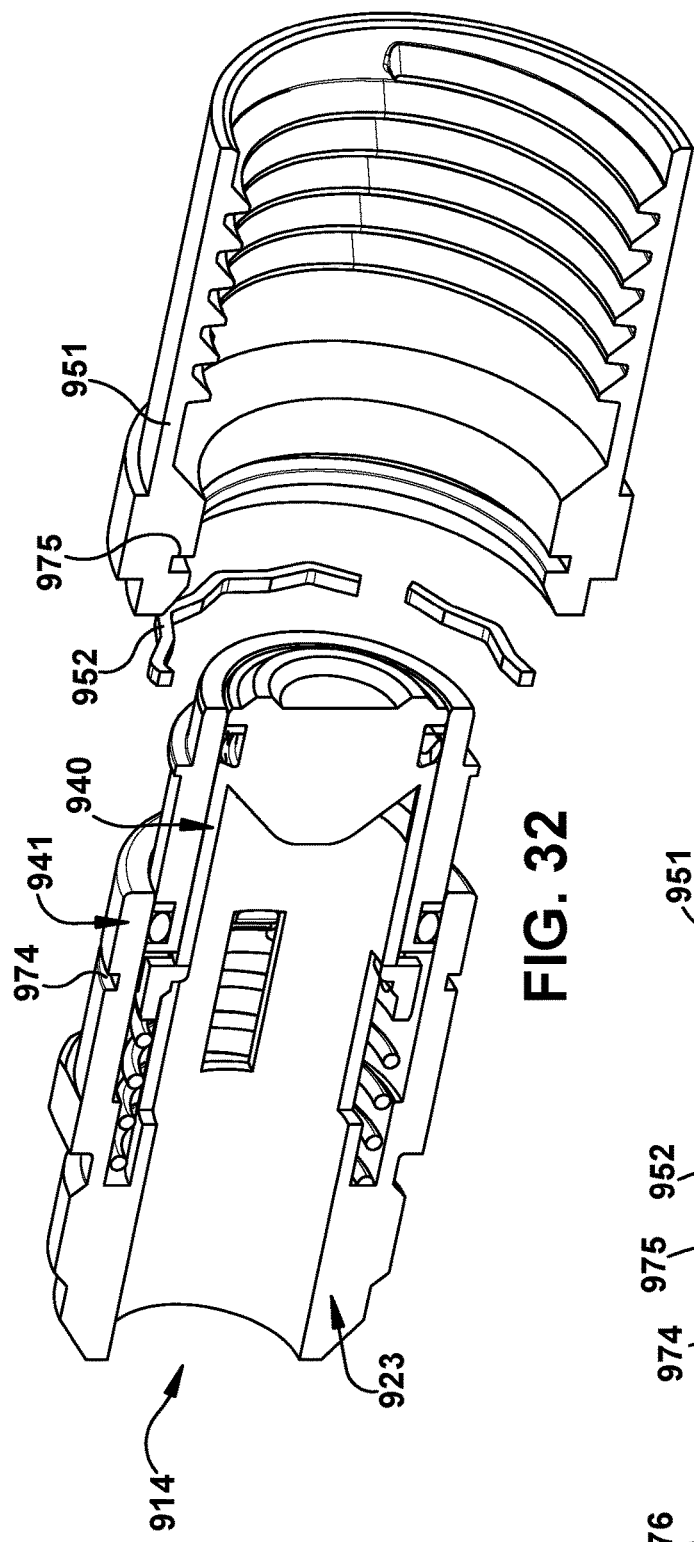
FIG. 32 is a perspective cutaway view of another exemplary embodiment of a female coupler showing an exemplary thread sleeve prior to being coupled to an exemplary female valve body, in which a marcel spring forms an interface for coupling the thread sleeve to the female valve body.
Figure 33:
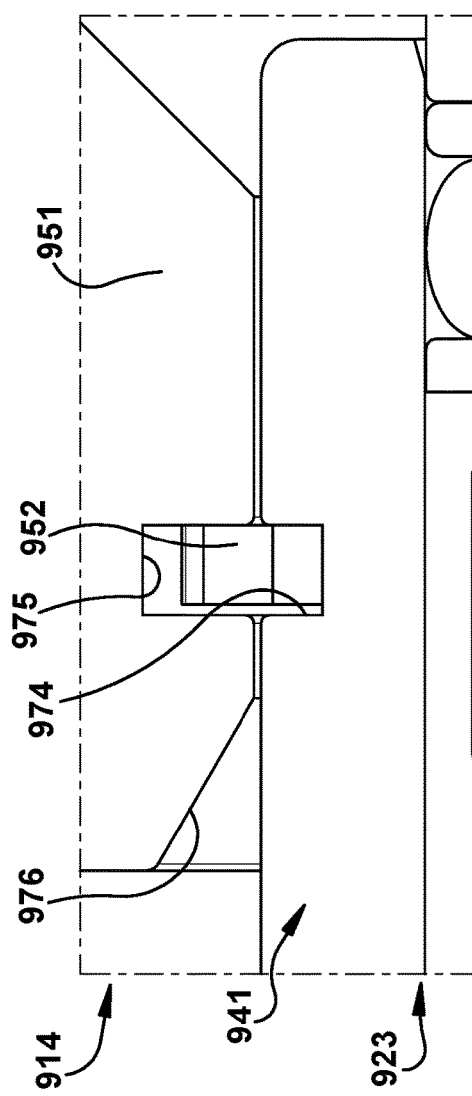
FIG. 33 is an enlarged cross-sectional view showing the thread sleeve in FIG. 32 rotatably coupled to the female valve body via the marcel spring.

Referring to FIGS. 32-34, alternative exemplary embodiments of an interface 952, 1052 that couples rotatable thread sleeve 951, 1051 to female valve body 923, 1023 are shown, in which the interface 952, 1052 is a resilient element that permits the thread sleeve 951, 1051 to freely rotate about the longitudinal axis of the female valve body 923, 1023 while axially constraining the thread sleeve 951, 1051.

FIGS. 32 and 33 show an embodiment in which the resilient element 952 is a marcel spring (also referred to with reference numeral 952). FIG. 32 shows the thread sleeve 951 prior to being coupled to the female valve body 923, and FIG. 33 shows the thread sleeve 951 coupled to the female valve body 923. The female coupler 914 shown in FIGS. 32 and 33 is substantially the same as or similar to the above-referenced female coupler(s) (e.g., 14), and consequently the same reference numerals but in the 900-series are used to denote structures corresponding to the same or similar structures in the female couplers. In addition, the foregoing description of the female coupler(s) (e.g., 14) is equally applicable to the female coupler 914, and thus aspects of the female couplers may be substituted for one another or used in conjunction with one another where applicable, except as noted below.

As shown, the marcel spring 952 is a discrete element that is disposed in a radial groove 974 of the radially outward portion 941 of the female valve body 923 and a corresponding radial groove 975 of the thread sleeve 951 when in the coupled together state. To provide such coupling, the marcel spring 952 is first placed in the groove 974 of the radially outward portion 941 of the female valve body 923. Then the thread sleeve 951 is pushed onto the coupler body 923 until the marcel spring 952 is urged into the groove 975 of the thread sleeve 951. A tapered surface 976 toward a rearward end of the thread sleeve 951 may facilitate such installation. Such a configuration allows the thread sleeve 951 to be installed onto the female valve body 923 without additional tooling, and also makes the thread sleeve 951 difficult to remove after its installation on the female valve body 923. The marcel spring 952 is configured to withstand axial load conditions that may be exerted while the coupling is in use.

FIG. 34 shows an alternative embodiment in which the resilient element 1052 is a snap ring (also referred to with reference numeral 1052). The female coupler 1014 shown in FIG. 34 is substantially the same as or similar to the above-referenced female coupler(s) (e.g., 14), and consequently the same reference numerals but in the 1000-series are used to denote structures corresponding to the same or similar structures in the female couplers. In addition, the foregoing description of the female coupler(s) (e.g., 14) is equally applicable to the female coupler 1014, and thus aspects of the female couplers may be substituted for one another or used in conjunction with one another where applicable, except as noted below.

In exemplary embodiments, the snap ring 1052 is a discrete element that is disposed in at least one groove of the female valve body 1023 and/or the thread sleeve 1051. In the illustrated embodiment, the snap ring 1052 is disposed in a radial groove 1074 of the radially outward portion 1041 of the female valve body 1023, and is configured to engage an axial end of the thread sleeve 1051. A forward portion of the radially outward portion 1041 of the female valve body 1023 has a radially outwardly protruding abutment 1077 opposite the snap ring 1052 that is configured to engage a corresponding radially inwardly protruding portion 1078 of the thread sleeve 1051. The abutment 1077 of the female valve body 1023 cooperates with the snap ring 1052 to axially constrain the thread sleeve 1051 while also permitting the thread sleeve to rotate freely relative to the female valve body 1023. The snap ring 1052 will also hold the thread sleeve 1051 under axial load conditions. Such a configuration may require an assembly tool.

Referring to FIGS. 35 and 36, the actuating sleeve 55 and thread sleeve 51 of the above-referenced female coupler 14 is described in further detail. As discussed above, the actuating sleeve 55 is co-rotatable with the thread sleeve 51, and is configured to move between a forward position and rearward position relative to the thread sleeve 51 for engaging or disengaging from the male nipple 12 to provide a locking feature for the quick coupling 10.

In the illustrated embodiment, the thread sleeve 51 has a bendable web portion 79 that is configured to contain the biasing spring 58 in a spring chamber 80 that is formed between a portion of the thread sleeve 51 and a portion of the actuating sleeve 55. FIG. 35 shows the thread sleeve 51 with the bendable web portion 79 in an uninstalled, or as-manufactured position, in which the web portion 79 is inclined outwardly to allow insertion of the spring 58 into the spring chamber 80. In exemplary embodiments, the inclined angle of the web portion 79 can vary from 30-degrees to 75-degrees relative to the longitudinal axis, and there may be a plurality of web portions 79 circumferentially spaced about the thread sleeve 51 to contain the spring 58. FIG. 36 shows the web portion 79 of the thread sleeve 51 bent upward to contain the spring 58 in the spring chamber 80. As shown, the web portion 79 is disposed at a rearward end portion of the thread sleeve 51, such that the actuating sleeve 55 is biased forwardly by a spring 58.

In exemplary embodiments, the actuating sleeve 55 has a hollow annular internal chamber 81 that encompasses the female valve body 23. The hollow chamber 81 may reduce the overall weight of the female coupler 14, and also may enable the female coupler to withstand increased vibrational loads.

In addition, the hollow chamber 81 may be filled with fire protection sealed materials to protect the quick disconnect from an elevated temperature condition, such as in the case of fires. In exemplary embodiments, the actuating sleeve 55 may be formed by additive manufacturing, which may allow the actuating sleeve to have the annular chamber 81 with a generally seamless construction. The thread sleeve 51 with the web portion 79 also may be formed by an additive manufacturing technique.

FIG. 37 shows an alternative embodiment in which a discrete snap ring 1182 couples actuating sleeve 1155 to thread sleeve 1151, instead of a web portion 79 of the thread sleeve 51. In the illustrated embodiment, a snap ring groove 1183 is machined in the actuating sleeve 1155, within which the snap ring 1182 is disposed to support the biasing force of spring 1158. As shown, the actuating sleeve 1155 is pushed along with spring 1158 over the rotating thread sleeve 1151 up to a radially outward shoulder 1184 of the thread sleeve 1051. The snap ring 1182 will hold the actuating sleeve 1155 and is configured to withstand axial and vibrational load conditions. It is understood that the female coupler 1114 shown in FIG. 37 is substantially the same as or similar to the above-referenced female coupler(s) (e.g., 14), and consequently the same reference numerals but in the 1100-series are used to denote structures corresponding to the same or similar structures in the female couplers. In addition, the foregoing description of the female coupler(s) (e.g., 14) is equally applicable to the female coupler 1114, and thus aspects of the female couplers may be substituted for one another or used in conjunction with one another where applicable, except as noted below.

Referring to FIGS. 38-46, another exemplary embodiment of a quick coupling 1210 is shown, in which male nipple 1212 includes a movable actuating sleeve 1255 and the female coupler 1214 is devoid of an actuating sleeve. The quick coupling 1210, including female coupler 1214 and male nipple 1212, is substantially the same as or similar to the above-referenced quick coupling(s) (e.g., 10), including female coupler(s) (e.g., 14) and male nipple(s) (e.g., 12), and consequently the same reference numerals but in the 1200-series are used to denote structures corresponding to the same or similar structures in the coupling and corresponding coupling members. In addition, the foregoing description of the coupling(s) (e.g., 10) and corresponding coupling member(s) (e.g., 12, 14) is equally applicable to the coupling 1210 and corresponding coupling members 1212, 1214, and thus aspects of the coupling and coupling members may be substituted for one another or used in conjunction with one another where applicable, except as noted below.

Figure 39:
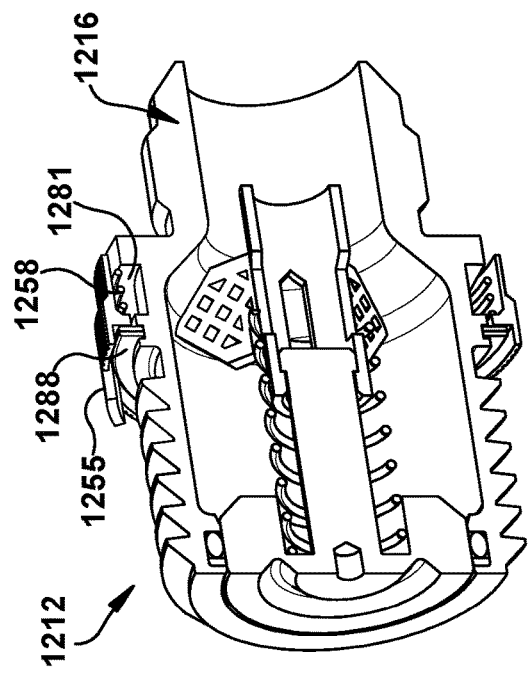
FIG. 39 is a front perspective cutaway view of the male nipple in FIG. 38.
Figure 38:
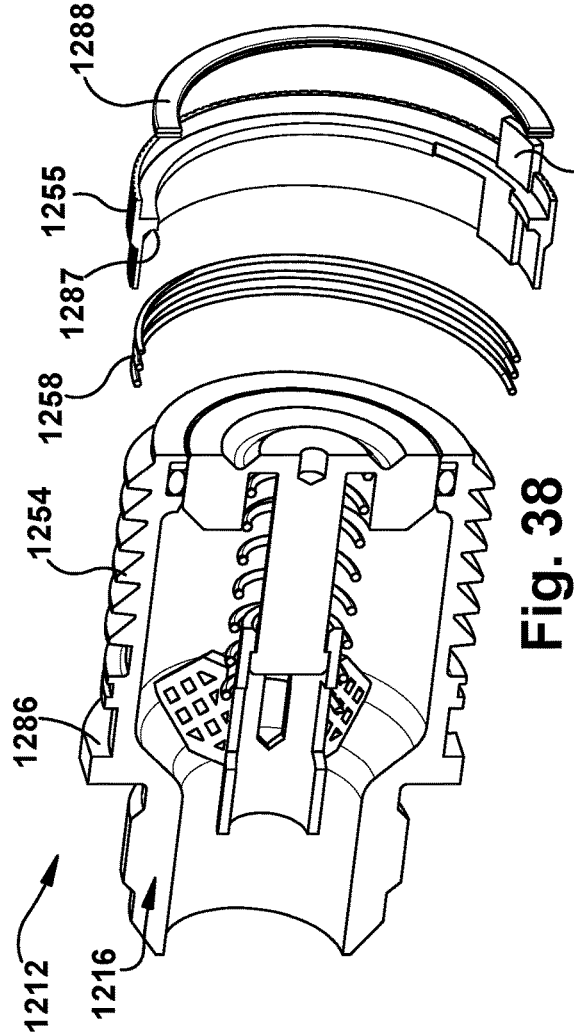
FIG. 38 is a perspective cutaway exploded view of another exemplary embodiment of a male nipple having an exemplary actuating sleeve.
Figure 41:
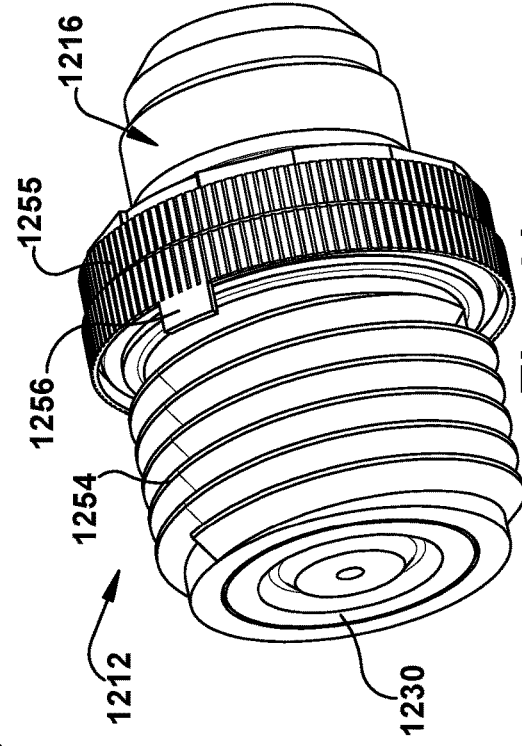
FIG. 41 is a front outer perspective view of the male nipple in FIG. 39.
Figure 40:
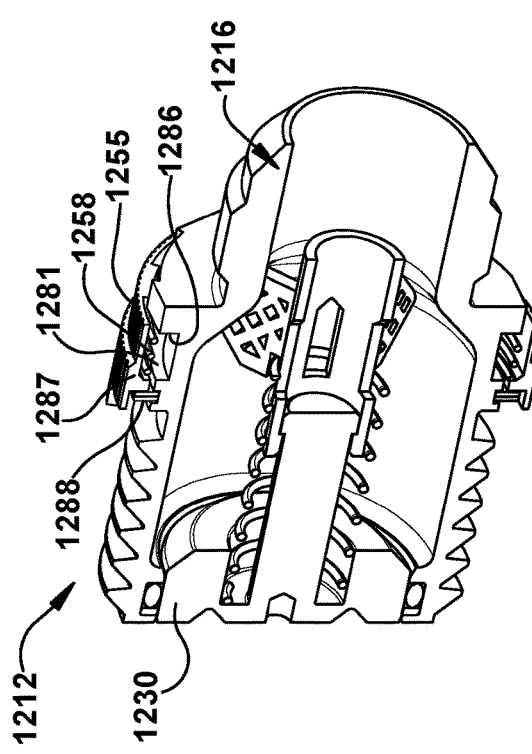
FIG. 40 is a rear perspective cutaway view of the male nipple in FIG. 39.

FIG. 38 shows an exploded cutaway front perspective view of the exemplary male nipple 1212. FIG. 39 shows a front perspective cutaway view from the opposite side, in which the actuating sleeve 1255 is installed on the male nipple 1212. FIG. 40 shows a rear perspective cutaway view of the male nipple 1212 with actuating sleeve 1255. FIG. 41 shows an outer perspective view of the male nipple 1212 with actuating sleeve 1255.

As shown in the illustrated embodiment, the actuating sleeve 1255 of the male nipple 1212 is disposed radially outwardly of the male valve body 1216, and is configured to be axially movable between forward and rearward positions via a biasing member 1258, such as a spring. The biasing member 1258 is disposed in a spring chamber 1281 that is located toward a rearward portion of the male valve body 1216. As shown, the spring chamber 1281 is at least partially defined by a rearward radially outward shoulder 1286 of the male valve body 1216, which one end of the biasing member 1258 engages, and an opposite radially inward protrusion 1287 of the actuating sleeve 1255, which the other end of the biasing member 1258 engages. In this manner, the actuating sleeve 1255 is biased forwardly to lockingly engage the thread sleeve 1251 of the female coupler 1214 with one or more forwardly protruding tangs 1256 of the actuating sleeve 1255, as discussed in further detail below. The male nipple 1212 also includes a stop, such as a snap ring 1288 disposed in a radially outer groove in the male valve body 1216, which restricts further forward movement of the actuating sleeve 1255 beyond the stop.

FIG. 42 shows a front perspective cutaway view of the female coupler 1214, and FIG. 43 shows an outer front perspective view of the female coupler 1214. As shown in the illustrated embodiment, the female coupler 1214 is devoid of an actuating sleeve. Instead, the thread sleeve 1251 of the female coupler 1214 has one or more locking slots 1257 at its forward end, which are configured to receive the one or more locking tangs 1256 of the actuating sleeve 1255. By providing the actuating sleeve 1255 on the male nipple 1212 instead of the female coupler 1214, the overall weight of the quick coupling 1210 may be reduced.

Referring to FIGS. 44-46, an exemplary operation of threadably and lockingly coupling the female coupler 1214 and the male nipple 1212 is shown. FIG. 44 is a cross-sectional view of the female coupler 1214 fully threaded onto the male nipple 1212 with the actuating sleeve 1255 of the male nipple 1212 pulled back to compress the spring 1258. FIG. 45 is an outer perspective side view of the quick coupling 1210 before the locking tang 1256 of the actuating sleeve 1255 is received into the locking slot 1257 the thread sleeve 1251. FIG. 46 is an outer perspective side view of the locking tang 1256 of the actuating sleeve 1255 lockingly received into the locking slot 1257 of the thread sleeve 1251.

As shown, the female coupler 1214 is threaded via the threads 1253 of the thread sleeve 1251 onto the threads 1254 of the male nipple 1212 in a manner described above. As discussed above, once the female coupler 1214 advances onto the male nipple 1212 by a sufficient distance, the flow sleeve 1230 and the sealing sleeve 1231 of the respective coupling members will begin to open. The female thread sleeve 1251 continues to rotate and threadably advance on the male nipple 1212 until the locking tangs 1256 of the actuating sleeve 1255 of the male nipple 1212 snap into the locking slots 1257 of the thread sleeve 1251 of the female coupler 1214, which indicates that the quick coupling 1210 is fully engaged. The actuating sleeve 1255 is biased forwardly so that the actuating sleeve engages the thread sleeve 1251 of the female coupler to restrict rotational movement of the thread sleeve 1251 to prevent disengagement without pulling the actuating sleeve 1255 away from the female coupler 1214. Once the actuating sleeve 1255 is pulled back to a rearward position, the locking tangs 1256 of the actuating sleeve 1255 disengage from the locking slots 1257 of the thread sleeve 1251 to permit rotational movement of the thread sleeve 1251, thereby permitting the female coupler 1214 to be threadably decoupled from the male nipple 1212.

Referring to FIGS. 47-52, alternative exemplary embodiments of a fluid orifice portion 1389 of the male nipple (e.g., 12) and/or the female coupler (e.g., 14) are shown. As discussed above, the fluid orifice(s) 36 of the male nipple 12 may be formed by the flow sleeve 30 for enabling fluid flow through the male valve body 16 when the flow sleeve 30 is disengaged from the sealing member 32 in an open position (as shown in FIG. 5, for example). Also discussed above, the fluid orifice 48 of the female coupler 14 may be formed by a radially inward portion 40 of the female valve body 23 for enabling fluid flow through the female valve body when the sealing sleeve 31 is disengaged from the sealing member 42 in an open position (as shown in FIG. 5, for example). The utilization of such fluid orifice portions 1389 shown in FIGS. 47-52 is substantially the same as for the fluid orifices (e.g., 36 and/or 48) of the above-referenced female coupler(s) (e.g., 14) and/or male nipple(s) (e.g., 12), and consequently the foregoing description of the female coupler(s) (e.g., 14) and/or male nipple(s) (e.g., 12) is equally applicable for the various fluid orifice portions shown in FIGS. 47-52. It is understood that although the fluid orifice portions 1389 in FIGS. 47-52 are shown as being discrete with a connection 1390 for coupling to the respective male nipple (e.g., 12) and/or female coupler (e.g., 14), these fluid orifice portions 1389 may be integrated into corresponding portions (e.g., 30, 31) of the coupling member(s) (e.g., 12, 14) according to any of the foregoing embodiments of the male nipple and/or female coupler described above, including those embodiments having resilient elements, and the like.

Generally, the fluid orifice portion 1389 is configured to divert fluid flow from the axial direction to the radial direction and vice versa. In exemplary embodiments, the fluid orifice portion 1389 has an equal or variable number and/or size of circumferential orifice(s) or opening(s) 1391, which correspond to the orifice(s) 36 in the flow sleeve 30 of male nipple 12 and/or orifice(s) 48 in the radially inward portion 40 of female valve body 23. These openings 1391 are separated and supported by axially extending legs 1392 (referred to as "axial legs"). Consequently, the design of the axial legs 1392 may change the configuration of the openings 1391. Generally, the size of the axial legs 1392 depends on the number of openings 1391 desired, the diameter of the flow orifice portion 1389 for the male nipple (e.g., flow sleeve 30) and/or female coupler (e.g., radially inward portion 40 of the female valve body), and the angle with respect to the outer circumferential surface of the flow orifice portion 1389. In exemplary embodiments, the axial legs 1392 may have a constant cross-section, may have a variable cross section, may be inclined relative to the circumferential direction of the fluid orifice portion surface, and/or may be shaped like a square, circle, semi-circle, polygon, or combination of shapes. The fluid orifice portion 1389 also may include a flow deflection surface 1393 for facilitating the diversion of flow from the axial direction to the radial direction through the openings 1391. In exemplary embodiments, the flow deflection surface 1393 is inclined relative to a longitudinal axis, such as by an angle in the range of 30-degrees to 70-degrees, which may depend on the opening design and desired flow conditions, as would be understood by those having ordinary skill in the art.

The fluid orifice portions 1389 shown in FIGS. 47-52 are substantially the same as or similar to each other, and consequently the same reference numerals but with the suffixes "a"-"f" are used to denote structures corresponding to the same or similar structures.

Figure 47:
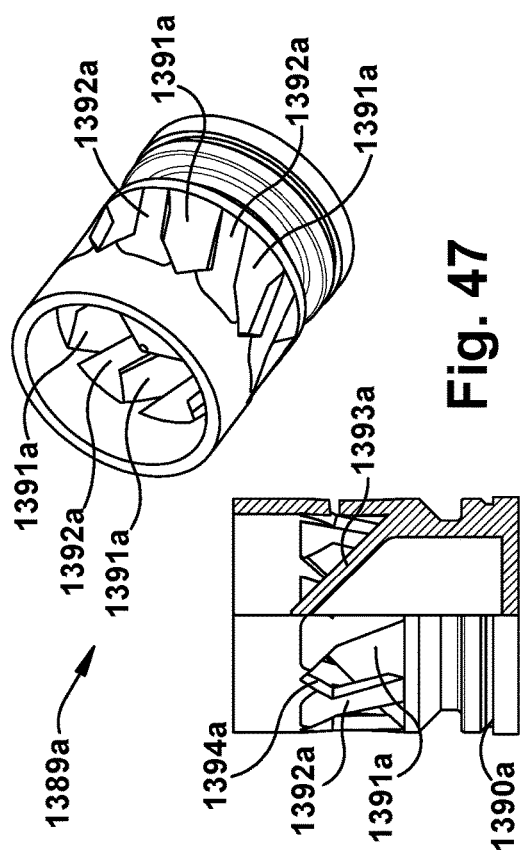

FIG. 47 shows one exemplary embodiment of a fluid orifice portion 1389$a$, in which the openings 1391$a$ are axially elongated and have triangular castellations 1394$a$. In the illustrated embodiment, the axial legs 1392$a$ are circumferentially slanted or inclined relative to the axial direction.

Figure 48:
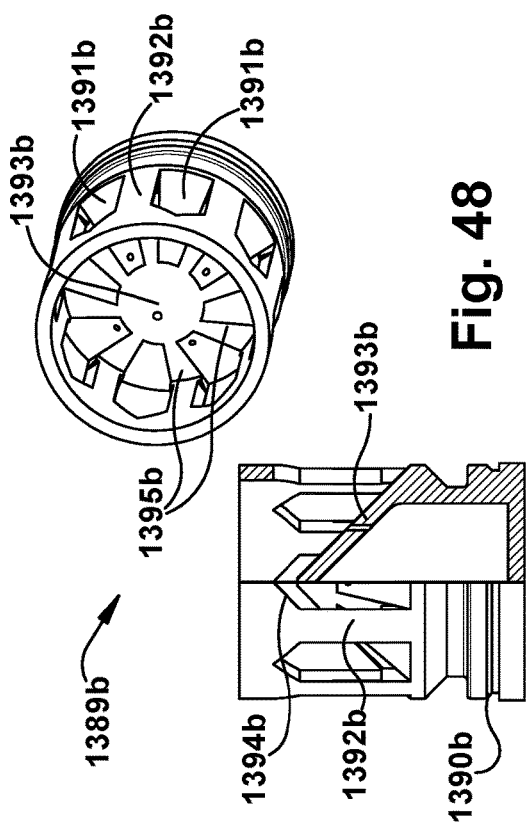
FIGS. 47-52 show alternative exemplary embodiments of a fluid orifice portion of the male nipple and/or female coupler.

FIG. 48 shows another embodiment of a fluid orifice portion 1389$b$ in which the openings 1391$b$ are axially elongated and have triangular castellations 1394$b$. In this embodiment, the axial legs 1392$b$ extend in the axial direction. Each axial leg 1392$b$ has a radially inward portion connecting with the inclined deflection surface 1393$b$ to form a plurality of vanes 1395$b$.

Figure 49:
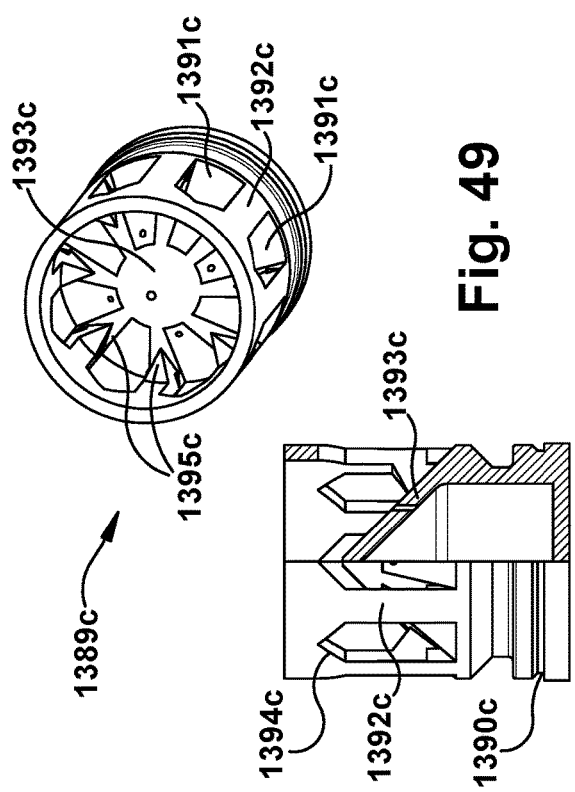

FIG. 49 shows another embodiment of a fluid orifice portion 1389$c$ in which the openings 1391$c$ are axially elongated and have triangular castellations 1394$c$. In this embodiment, the axial legs 1392$c$ extend in the axial direction, and each leg 1392$c$ has a radially inward portion connecting with the inclined deflection surface 1393$c$ to form a plurality of vanes 1395$c$. In this embodiment, the radially inward portion of each leg 1392$c$ has a tapered surface, which tapers in both the axial and radial directions to provide a multi-faceted vane 1395$c$.

Figure 50:
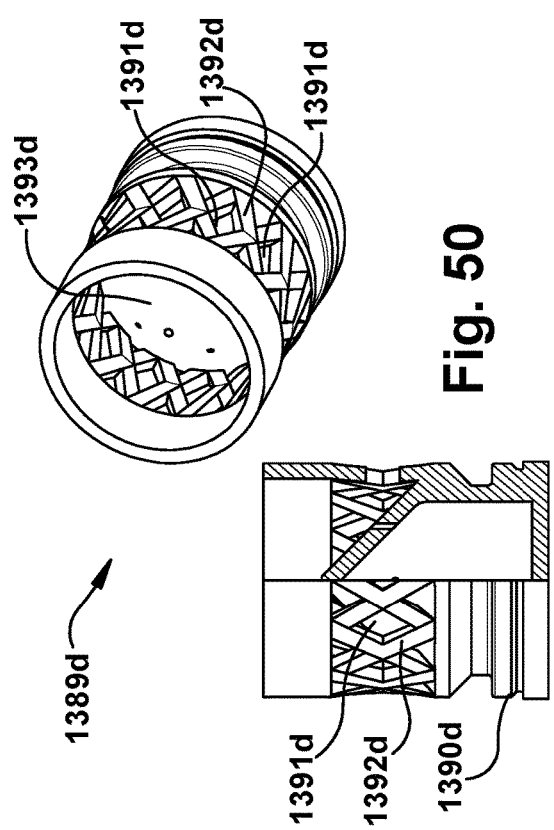

FIG. 50 shows another embodiment of a fluid orifice portion 1389$d$ in which the openings 1391$d$ form a diamond-shaped pattern via a zig-zag or crisscross of the legs 1392$d$.

Figure 51:
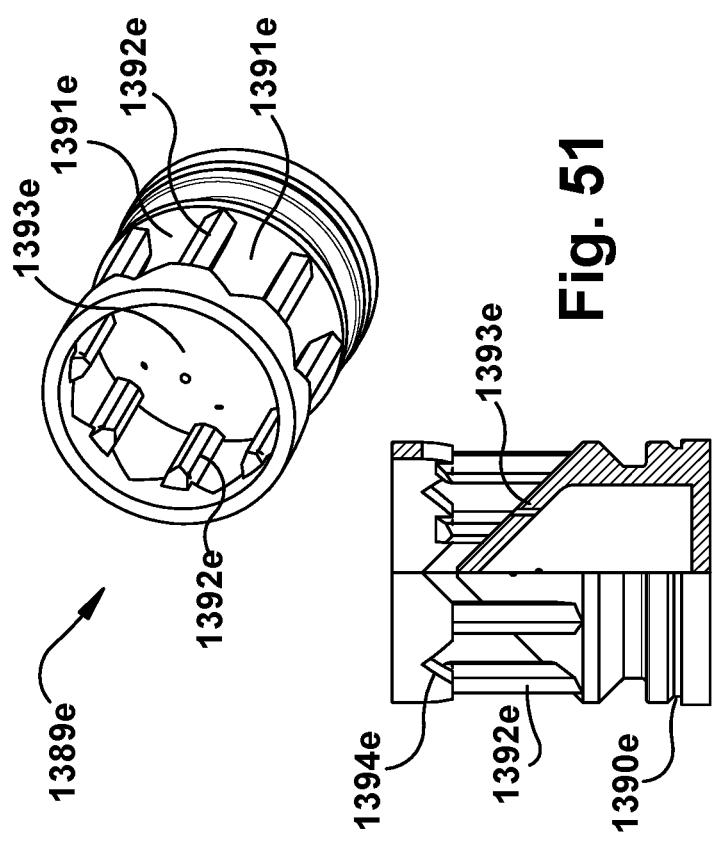

FIG. 51 shows another embodiment of a fluid orifice portion 1389$e$ in which the openings 1391$e$ are axially elongated and have triangular castellations 1394$e$, and in which the axial legs 1392$e$ extend in the axial direction. This embodiment does not have radially inwardly protruding vanes formed by radially inwardly protruding portions of the axial legs 1392$e$ connected with the inclined deflection surface 1393$e$.

Figure 52:
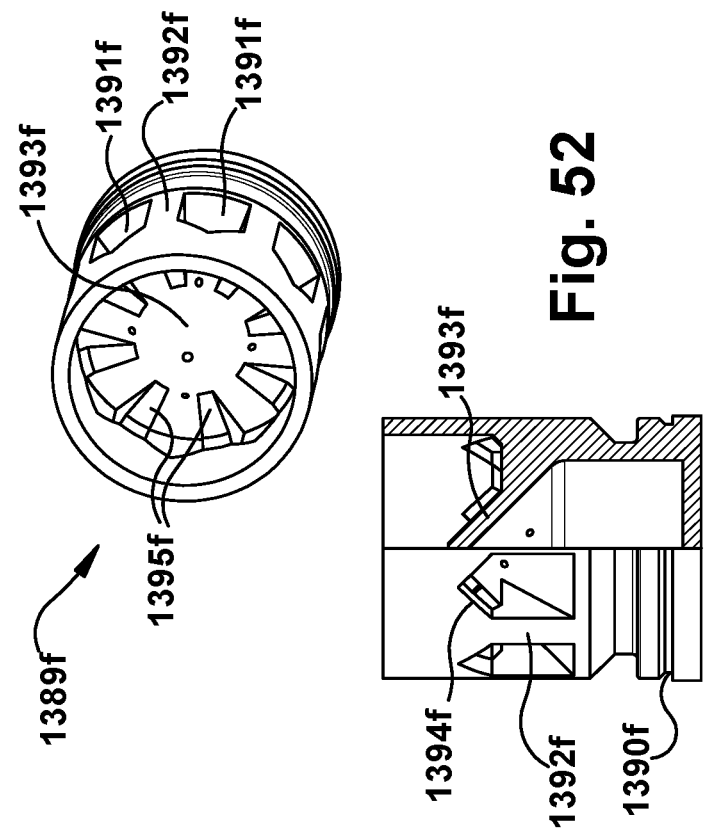

FIG. 52 shows another embodiment of a fluid orifice portion 1389$f$ in which the openings 1391$f$ are axially elongated and have triangular castellations 1394$f$. In this embodiment, the axial legs 1392$f$ extend in the axial direction, and each leg 1392$f$ has a radially inward portion connecting with the inclined deflection surface 1393$f$ to form a plurality of vanes 1395$f$. In this embodiment, the radially inward portion of each leg 1392$f$ has a tapered surface, which tapers in the axial direction and has a slight taper in the radial direction to form the vane 1395$f$.

In exemplary embodiments, the fluid orifice portions 1389$a$-$f$ in FIGS. 47-52 are formed via an additive manufacturing process to enhance the tailorability and capability of the orifice design. As such, the various fluid orifice portions also may include one or more hollow regions for minimizing weight and/or may include depowdering holes for enabling powder metallurgy additive techniques to remove unfused powder from the orifice.

Figure 53:
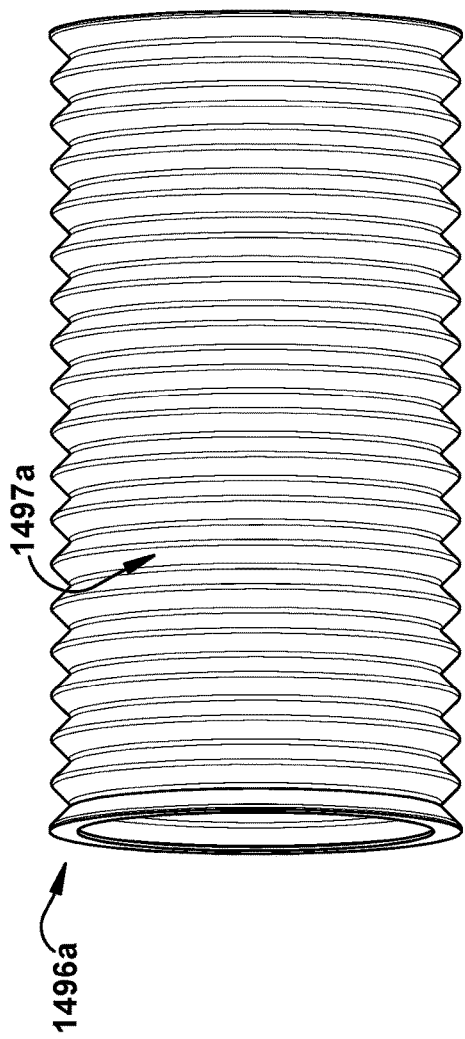
FIG. 53 shows an alternative exemplary embodiment of a biasing member of the male nipple and/or female coupler, in which the biasing member has a bellows configuration.
Figure 54:
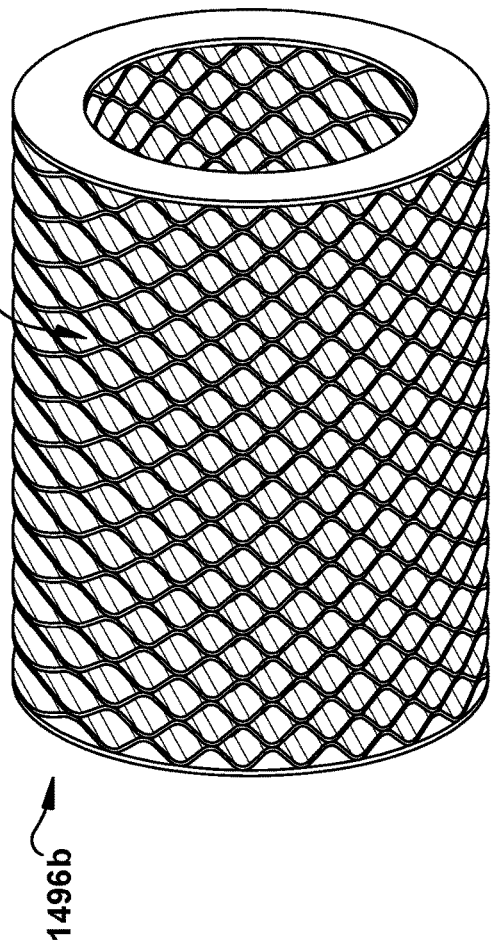
FIG. 54 shows another alternative exemplary embodiment of a biasing member of the male nipple and/or female coupler, in which the biasing member has a diamond-fold configuration.

Referring to FIGS. 53 and 54, alternative exemplary embodiments of a biasing member 1496 for the male nipple (e.g., 12) and/or female coupler (e.g., 14) are shown. As discussed above, the biasing member 34 of the male nipple 12 is configured to bias the flow sleeve 30 forwardly toward the closed position, such that a radially outward portion of the flow sleeve 30 sealingly engages the sealing member 32 to restrict flow through the male valve body 16 (as shown in FIG. 2, for example). Also discussed above, the female coupler 14 also includes biasing member 46 that is configured to bias the sealing sleeve 31 forwardly toward its closed position, such that a radially inward portion of the sealing sleeve 31 sealingly engages the sealing member 42 to restrict flow through the female valve body 23 (as shown in FIG. 2, for example). Furthermore as discussed above, the female coupler 14 may include biasing member 58 that is interposed between corresponding portions of the actuating sleeve 55 and the thread sleeve 51 to provide a forward bias for the actuating sleeve 55 of the female coupler 14. The utilization of the biasing members 1496 in FIGS. 53 and 54 is substantially the same as for the biasing member(s) (e.g., 34, 46 and/or 58) of the above-referenced female coupler(s) (e.g., 14) and/or male nipple(s) (e.g., 12), and consequently the foregoing description of the female coupler(s) (e.g., 14) and/or male nipple(s) (e.g., 12) is equally applicable for the various biasing members shown in FIGS. 53 and 54.

Generally, the biasing member 1496 may be configured to hold and move the respective flow sleeve (e.g., 30) and/or sealing sleeve (e.g., 31) in the corresponding male and/or female valve body while withstanding the system pressure and loading conditions. In addition, the biasing member 1496 when used for the actuating sleeve (e.g., 55) may be utilized to hold and move the actuating sleeve in position to lock the actuating sleeve with the tangs (e.g., 56) of the nipple body, as discussed above. In the description above, the foregoing biasing members 34, 46 and 58 are configured as coil springs having a configuration that fulfills the foregoing functionality. The coil spring design may vary in terms of the wire diameter, wire cross-sectional shape, wire material, constant or variable outside or inside diameter, force distribution (compression, tension or torsion), and/or different end configuration (flat, ground, opened, closed, and/or combinations thereof).

The biasing members 1496 shown in FIGS. 53 and 54 are substantially the same as or similar to each other, and consequently the same reference numerals but with the suffixes "a" and "b" are used to denote structures corresponding to the same or similar structures.

FIG. 53 shows an alternative embodiment to the coil spring design, in which the biasing member 1496a has a bellows configuration. As shown, the biasing member 1496a has a generally cylindrical configuration with concertinaed sides 1497a that allow it to expand and contract.

FIG. 54 shows another alternative embodiment, in which the biasing member 1496b has a diamond-fold or waveshape configuration along its sides 1497b that allow it to expand and contract.

It is understood that the foregoing configuration of the biasing members 1496a, 1496b may have different thickness of the sides, different shapes, materials, constant or variable outside or inside diameter, and/or different end configurations. In exemplary embodiments, the biasing members in FIGS. 53 and 54 are formed via an additive manufacturing process to enhance the tailorability and capability of the orifice design. In addition, additively manufacturing the biasing member may allow the biasing member to be printed together with and/or integrated into portions of the corresponding male nipple and/or female coupler.

Referring to the various embodiments described above, the sealing member(s) (e.g., 42, 43) of the female coupler (e.g., 14) and/or the sealing member(s) (e.g., 32) of the male nipple (e.g., 12) may be optimized for sealing functionality depending on the desired requirements, as would be understood by those having ordinary skill in the art. Generally, the various sealing members in each coupling member serve to close the flow path in each coupling member during the disengaged condition, and serve to permit flow between the coupling members when in an engaged condition under pressure, while also restricting external leakage outside of the engaged or disengaged coupling to the outside environment.

In the embodiments described above, the sealing member(s) (e.g., 32, 42 and/or 43) are each configured as an O-ring seal, optionally with a backup ring disposed in the corresponding O-ring groove. In exemplary embodiments, however, the sealing member may instead be configured as a flat gasket or may be a ring with any cross-sectional shape as may be desirable depending on the system requirements. In exemplary embodiments, the sealing member may be made of one or more of the following elastomeric materials: perfluoroelastomer (FFKM/FFPM), fluoroelastomer (FKM/FPM), TFE/Propropylene Rubber (FEPM), polydimethylsiloxane (silicone rubber—Q, MQ, VMQ, PMQ, PVMQ), Tetrafluoroethylene Propylene (AFLAS), Fluorosilicone rubber (silicone rubber—FMQ, FVMQ), Polytetrafluoroethylene (PTFE), Polyethylenetetrafluoroethylene (ETFE), and/or Ethylene Propylene Rubber (EPR, EPDM). In exemplary embodiments, the elastomeric material may include filler materials such as, but not limited to, metal strips and/or graphite. It is noted that the foregoing capitalized designations (e.g., FKM, FPM, Q, MQ, etc.) refer to class designations as defined by ASTM D1418-17, "Standard Practice for Rubber and Rubber Latices-Nomenclature," which is incorporated herein by reference in its entirety.

In exemplary embodiments, a single or multiple seal members may be used. For example, multiple seal members (such as an O-ring seal) may be used in a consecutive order with the same or different ring size to seal at high-temperature conditions. The multiple seal members may be made from any combination of the elastomeric materials described above. In addition, the seal member gland and groove configuration may be any combination of one or more of the following: male or piston gland without back-up ring, male or piston gland with one back-up ring, male or piston gland with two back-up rings, female or cylinder gland without back-up ring, female or cylinder gland with one back-up ring, female or cylinder gland with two back-up rings, face seal gland, dovetail groove gland, half dovetail groove gland, and/or triangular groove gland.

In exemplary embodiments, the single or multiple seal members may be flat gaskets. For example, multiple flat gaskets may be used in a consecutive order with the same or different length, diameter, and/or thickness to seal the quick coupling. The flat gasket design feature may include a seamless design, a full-faced design, and/or a segmented design with overlap. The flat gaskets may be made from a single layer of the above-mentioned elastomeric materials and/or multi-layers of a single or combination of the elastomeric materials above.

Referring to the various embodiments described above, one or more parts of the male nipple (e.g., 12) and/or female coupler (e.g., 14) may be formed by an additive manufacturing process. For example, the female valve body (e.g., 23), including the radially inner portion (e.g., 40) and the radially outer portion (e.g., 41), may be additively manufactured together to form a unitary seamless structure, including the formation of the axial flow passage (e.g., 24), the one or more fluid orifices (e.g., 48), and/or the spring chamber (e.g., 47) between radially inner and radially outer portions of the female valve body. As discussed above, the radially inner portion (e.g., 40) of the female valve body (e.g., 23) also may include integral resilient elements (e.g., 49) that are formed as a unitary structure with the female valve body. The sealing sleeve (e.g., 31) of the female coupler also may be additively manufactured as a unitary structure, including any such resilient elements (e.g., 149) according to the embodiments discussed above. The thread sleeve (e.g., 51) of the female coupler (e.g., 14) also may be additively manufactured, including the threads (e.g., 53) for threadably coupling to the male nipple, the interfacing teeth (e.g., 52), and/or the web portion (e.g., 79) for containing the spring for the actuating sleeve. The actuating sleeve (e.g., 55) also may be additively manufactured as a unitary seamless structure, including the hollow annular chamber (e.g., 81) which may be filled with fireproofing material. As noted above, one or more of the springs (e.g., 46 and/or 58) of the female coupler also may be additively manufactured, such as with a bellows-type configuration or diamond-fold-type configuration.

The male valve body (e.g., 16) also may be additively manufactured as a unitary seamless structure, including the axial flow passage (e.g., 17), the radially enlarged pocket (e.g., 37), the radially outwardly protruding threads (e.g., 54) and/or other features of the male valve body. As discussed above, the flow sleeve (e.g., 30) also may be additively manufactured, including the fluid orifice(s) (e.g., 36) and/or the resilient elements (e.g., 38), such as the flexible finger elements. As noted above, the spring (e.g., 34) of the male nipple also may be additively manufactured, such as with a bellows-type configuration or diamond-fold-type configuration.

In exemplary embodiments, the additive manufacturing process may be any suitable additive manufacturing process for forming the foregoing features of the quick coupling as would be understood by those having ordinary skill in the art. Exemplary additive manufacturing techniques may include, by way of non-limiting examples: powder bed fusion additive manufacturing processes, direct energy deposition processes, binder jetting processes, material extrusion and deposition processes, or the like. For example, suitable powder bed fusion additive manufacturing processes may include: selective layer sintering (SLS), selective layer melting (SLM), direct metal laser sintering (DMLS), electron beam melting (EBM), or multi-jet fusion (MJF). For example, suitable direct energy deposition processes may include: laser engineered net shape (LENS) or electron beam additive manufacturing (EBAM). For example, suitable binder jetting processes may include dispensing a binding agent onto a powder bed to build a part layer-by-layer, optionally with subsequent sintering and infiltration. For example, suitable material extrusion and deposition may include fused deposition modeling.

It should be understood that the various parts of the quick coupling described above may be made of any suitable material, such as metals, plastics and/or composites, which may be selected in a well-known manner to accommodate the pressures, flow rate, temperature, fluid types, external environment, size, configuration, assembly, and other factors that would be understood by those having ordinary skill in the art from the foregoing description. Preferably, the various structural components, including the male valve body, flow sleeve, female valve body, sealing sleeve, and thread sleeve are each made of metal materials that may withstand elevated temperatures and pressures that may be experienced when the fluid coupling is in use, such as in an aerospace application.

It is understood that in the discussion above and to follow, the positional terms "upper", "lower", "top", "bottom," "end," "inner," "left," "right," "above," "below," "horizontal," "vertical," etc. may refer to an arbitrary frame of reference, such as when the quick coupling is shown in a horizontal position as shown in FIG. 1 for example, rather than an ordinary gravitational frame of reference. This is done realizing that the coupling, such as when used on vehicles, can be mounted on the top, bottom, or sides of other components, or can be inclined with respect to the vehicle, or can be provided in various other positions. Thus, a top surface, a bottom surface, a front surface, and a rear surface may extend upwardly, downwardly, diagonally, or horizontally in a gravitational frame of reference.

It is also understood that all ranges and ratio limits disclosed in the specification and claims may be combined in any manner. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, or 0.01% of the stated value, as well as values intervening such stated values.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling member for a quick connect/disconnect coupling, the coupling member comprising:
   a valve body extending along a longitudinal axis, the valve body having an axially extending through-passage;
   a valve member axially moveable within the valve body between a closed-position, which restricts fluid flow through the valve body, and an open position, which permits fluid flow through the valve body; and a resilient interlocking element configured to slidably secure the valve member within the valve body;

wherein the resilient interlocking element is formed as a flexible portion of the valve member or the valve body that is radially movable to enable insertion of the valve member into the valve body when the flexible portion is at a first radial position, and wherein the flexible portion is biased toward a second radial position to slidably secure the valve member within the valve body when the valve member is assembled within the valve body.

2. The coupling member according to claim 1, wherein the flexible portion includes a radially extending abutment which forms a stop that restricts removal of the valve member from the valve body when the flexible portion is in the second radial position.

3. The coupling member according to claim 1, wherein the coupling member is a female coupler, the valve body is a female valve body, and the valve member is a sealing sleeve;

wherein the sealing sleeve is slidably disposed radially outwardly of a radially inward portion of the female valve body; and wherein the flexible portion includes at least one flexible finger element formed by the radially inward portion of the female valve body, the at least one flexible finger element being configured to interlockingly engage with the sealing sleeve to permit the sealing sleeve to move between a forward and a rearward position within the female valve body, in which the flexible finger element has a stop that is configured to restrict further forward movement of the sealing sleeve beyond the forward position.

4. The coupling member according to claim 1, wherein the coupling member is a female coupler, the valve body is a female valve body, and the valve member is a sealing sleeve;

wherein the sealing sleeve is slidably disposed radially outwardly of a radially inward portion of the female valve body; and wherein the flexible portion includes at least one flexible finger element formed by a portion of the sealing sleeve, the at least one flexible finger element being configured to interlockingly engage with the radially inward portion of the female valve body to permit the sealing sleeve to move between a forward and a rearward position within the female valve body, in which the flexible finger element has a stop that is configured to restrict further forward movement of the sealing sleeve beyond the forward position.

5. The coupling member according to claim 4, wherein the flexible finger element formed by the portion of the sealing sleeve is disposed toward a rearward portion of the sealing sleeve, wherein at least a portion of the flexible finger element protrudes radially inwardly into an axially extending slot in the radially inward portion of the female valve body, and wherein the stop of the flexible finger element is configured to engage a surface that at least partially defines an axial end portion of the slot; or wherein the flexible finger element formed by the portion of the sealing sleeve is configured as a spring leg having a radially inward bias, such that at least a portion of the flexible finger element protrudes radially inwardly into an axially extending slot in the radially inward portion of the female valve body, and wherein a portion of the spring leg serves as the stop, and is configured to engage a surface that at least partially defines an axial end portion of the slot.

6. The coupling member according to claim 1, wherein the coupling member is a male nipple, the valve body is a male valve body, and the valve member is a flow sleeve;

wherein the flexible portion includes at least one flexible finger element formed by a portion of the flow sleeve, the at least one flexible finger element being configured to interlockingly engage with the male valve body to permit the flow sleeve to move between a forward and a rearward position within the male valve body, in which the flexible finger element has a stop that is configured to restrict further forward movement of the flow sleeve beyond the forward position.

7. The coupling member according to claim 1, wherein the coupling member is a male nipple, the valve body is a male valve body, and the valve member is a flow sleeve;

wherein the flexible portion includes a plurality of spring legs that are disposed circumferentially about at least a portion of the flow sleeve, the plurality of spring legs being configured to interlockingly engage with the male valve body to permit the flow sleeve to move between a forward and a rearward position within the male valve body; and wherein each of the plurality of spring legs is configured to have a radially outward bias, and each of the plurality of spring legs has a stop that is configured to engage the male valve body to restrict further forward movement of the flow sleeve beyond the forward position.

8. The coupling member according to claim 1, wherein the coupling member is a female coupler, and the valve body is a female valve body; the female coupler further comprising:

a rotatable thread sleeve radially outwardly of the female valve body, the rotatable thread sleeve having radially inwardly protruding threads that are configured to threadably engage corresponding threads of a male nipple to couple the female coupler to the male nipple;

wherein the rotatable thread sleeve is coupled to a radially outward portion of the female valve body with a resilient element that permits the thread sleeve to freely rotate about the longitudinal axis of the female valve body while axially constraining the thread sleeve.

9. The coupling member according to claim 8, wherein the resilient element includes a marcel spring, the marcel spring being disposed in corresponding grooves of the female valve body and the thread sleeve.

10. The coupling member according to claim 8, wherein the resilient element includes a snap ring, the snap ring being disposed in at least one groove of the female valve body and/or the thread sleeve.

11. The coupling member according to claim 1, wherein the coupling member is a female coupler, and the valve body is a female valve body; the female coupler further comprising:

a rotatable thread sleeve radially outwardly of the female valve body, the rotatable thread sleeve having radially inwardly protruding threads that are configured to threadably engage corresponding threads of a male nipple to couple the female coupler to the male nipple; and an actuating sleeve radially outwardly of the rotatable thread sleeve, wherein the actuating sleeve has a hollow annular internal chamber; and optionally, wherein the hollow annular internal chamber is filled with fireproof material.

12. The coupling member according to claim 11, wherein the actuating sleeve is biased forwardly by a spring, and wherein the thread sleeve has a bendable web portion that is configured to contain the spring in a spring chamber that is formed between a portion of the thread sleeve and a portion of the actuating sleeve.

13. The coupling member according to claim 1, wherein the coupling member is a female coupler, and the valve body is a female valve body; the female coupler further comprising:
a rotatable thread sleeve radially outwardly of the female valve body, the rotatable thread sleeve having radially inwardly protruding threads that are configured to threadably engage corresponding threads of a male nipple to couple the female coupler to the male nipple;
a spring-biased actuating sleeve radially outwardly of the rotatable thread sleeve; and
a snap ring that couples the actuating sleeve to the thread sleeve, the snap ring being configured to permit the actuating sleeve to move between a forward and rearward position relative to the thread sleeve.

14. A quick connect/disconnect fluid coupling comprising the coupling member according to claim 1, wherein the coupling member is a female coupler, and the valve body is a female valve body, the quick connect/disconnect fluid coupling further comprising a male nipple that is couplable to the female coupler;
the female coupler further having:
a rotatable thread sleeve radially outwardly of the female valve body, the rotatable thread sleeve being supported by the female valve body and being configured to freely rotate about the longitudinal axis of the female valve body;
the male nipple having:
a male valve body extending along a longitudinal axis, the male valve body having an axially extending through-passage; and
a spring-biased actuating sleeve radially outwardly of the male valve body;
wherein a radially outward portion of the male valve body has radially outwardly protruding threads that are configured to threadably engage corresponding radially inwardly protruding threads of the thread sleeve; and
wherein the actuating sleeve of the male nipple is biased forwardly, and wherein the actuating sleeve is configured to move relative to the male valve body between a forward position, in which the actuating sleeve of the male nipple is configured to engage the thread sleeve of the female coupler to restrict rotational movement of the thread sleeve, and a rearward position, in which the actuating sleeve of the male nipple is configured to disengage from the thread sleeve of the female coupler to permit rotational movement of the thread sleeve, thereby permitting the female coupler to be threadably decoupled from the male nipple.

15. A quick connect/disconnect fluid coupling comprising the coupling member according to claim 1, wherein the coupling member is a female coupler, and the valve body is a female valve body, the quick connect/disconnect fluid coupling further comprising a male nipple that is couplable to the female coupler:
the male nipple having:
a male valve body extending along a longitudinal axis, the male valve body having an axially extending through-passage;
wherein a radially outward portion of the male valve body has radially outwardly protruding threads, each thread having a first side and an axially opposite second side, wherein the first side is inclined relative to the radially outward portion of the male valve body by a first angle in a range of 30-degrees to 60-degrees, and wherein the second side is inclined relative to the radially outward portion of the male valve body by a second angle in a range of 80-degrees to 100-degrees; and
the female coupler further having:
a rotatable thread sleeve radially outwardly of the female valve body, the rotatable thread sleeve being supported by the female valve body and being configured to freely rotate about the longitudinal axis of the female valve body;
wherein the rotatable thread sleeve has radially inwardly protruding threads that are configured to threadably engage the threads of the male nipple to couple the female coupler to the male nipple.

16. A quick connect/disconnect fluid coupling comprising the coupling member according to claim 1, wherein the coupling member is a female coupler, the valve body is a female valve body, and the valve member is a sealing sleeve, the quick connect/disconnect fluid coupling further comprising a male nipple that is couplable to the female coupler:
the male nipple having:
a male valve body extending along a longitudinal axis, the male valve body having an axially extending through-passage;
a flow sleeve axially moveable within the male valve body between a closed-position, which restricts fluid flow through the male valve body, and an open position, which permits fluid flow through the male valve body; and
a spring configured to bias the flow sleeve toward the closed position;
the female coupler further having:
the sealing sleeve axially moveable within the female valve body between a closed-position, which restricts fluid flow through the female valve body, and an open position, which permits fluid flow through the female valve body; and
a spring configured to bias the sealing sleeve toward the closed position;
wherein the spring of the female coupler and/or the spring of the male nipple has a bellows configuration; or
wherein the spring of the female coupler and/or the spring of the male nipple has a diamond-fold configuration.

17. The coupling member according to claim 1, wherein one or more of the following is formed by an additive manufacturing process:
the valve body, and/or
the valve member.

18. The coupling member according to claim 1, wherein the coupling member is a female coupler, and the valve body is a female valve body, wherein the female valve body is formed as a unitary structure including a radially inner portion and a radially outer portion, the radially inner portion defining an axial flow passage and having a fluid orifice for enabling fluid flow through the female valve body.

19. A quick connect/disconnect fluid coupling comprising the coupling member according to claim 1, wherein the coupling member is a male nipple, and the valve body is a male valve body, the quick connect/disconnect fluid coupling further comprising a female coupler that is couplable to the male nipple:

the female coupler having:
- a female valve body extending along a longitudinal axis, the female valve body having an axially extending through-passage; and
- a rotatable thread sleeve radially outwardly of the female valve body, the rotatable thread sleeve being supported by the female valve body and being configured to freely rotate about the longitudinal axis of the female valve body;

the male nipple having:
- a spring-biased actuating sleeve radially outwardly of the male valve body;

wherein a radially outward portion of the male valve body has radially outwardly protruding threads that are configured to threadably engage corresponding radially inwardly protruding threads of the thread sleeve; and wherein the actuating sleeve of the male nipple is biased forwardly, and wherein the actuating sleeve is configured to move relative to the male valve body between a forward position, in which the actuating sleeve of the male nipple is configured to engage the thread sleeve of the female coupler to restrict rotational movement of the thread sleeve, and a rearward position, in which the actuating sleeve of the male nipple is configured to disengage from the thread sleeve of the female coupler to permit rotational movement of the thread sleeve, thereby permitting the female coupler to be threadably decoupled from the male nipple.

20. A quick connect/disconnect fluid coupling comprising the coupling member according to claim 1, wherein the coupling member is a male nipple, and the valve body is a male valve body, the quick connect/disconnect fluid coupling further comprising a female coupler that is couplable to the male nipple:
- wherein a radially outward portion of the male valve body has radially outwardly protruding threads, each thread having a first side and an axially opposite second side, wherein the first side is inclined relative to the radially outward portion of the male valve body by a first angle in a range of 30-degrees to 60-degrees, and wherein the second side is inclined relative to the radially outward portion of the male valve body by a second angle in a range of 80-degrees to 100-degrees; and
- wherein the female coupler includes:
  - a female valve body extending along a longitudinal axis, the female valve body having an axially extending through-passage; and
  - a rotatable thread sleeve radially outwardly of the female valve body, the rotatable thread sleeve being supported by the female valve body and being configured to freely rotate about the longitudinal axis of the female valve body;
- wherein the rotatable thread sleeve has radially inwardly protruding threads that are configured to threadably engage the threads of the male nipple to couple the female coupler to the male nipple.

21. A quick connect/disconnect fluid coupling comprising the coupling member according to claim 1, wherein the coupling member is a male nipple, the valve body is a male valve body, and the valve member is a flow sleeve, the quick connect/disconnect fluid coupling further comprising a female coupler that is couplable to the male nipple:
the male nipple further having:
- the flow sleeve axially moveable within the male valve body between a closed position, which restricts fluid flow through the male valve body, and an open position, which permits fluid flow through the male valve body; and
- a spring configured to bias the flow sleeve toward the closed position;

the female coupler having:
- a female valve body extending along a longitudinal axis, the female valve body having an axially extending through-passage;
- a sealing sleeve axially moveable within the female valve body between a closed-position, which restricts fluid flow through the female valve body, and an open position, which permits fluid flow through the female valve body; and
- a spring configured to bias the sealing sleeve toward the closed position;

wherein the spring of the female coupler and/or the spring of the male nipple has a bellows configuration; or wherein the spring of the female coupler and/or the spring of the male nipple has a diamond-fold configuration.

22. The coupling member according to claim 1, wherein the coupling member is a male nipple, the valve body is a male valve body, and the valve member is a flow sleeve, wherein the flow sleeve is formed as a unitary structure, in which the flow sleeve has a sealing portion for engaging a seal member of the male nipple, and a fluid orifice for enabling fluid flow through the male valve body.

23. A female coupler for a quick connect/disconnect coupling, comprising:
- a female valve body extending along a longitudinal axis, the female valve body having an axially extending through-passage;
- a sealing sleeve axially moveable within the female valve body between a closed-position, which restricts fluid flow through the female valve body, and an open position, which permits fluid flow through the female valve body; and
- a resilient interlocking element configured to slidably secure the sealing sleeve within the female valve body;

wherein:
(i) the sealing sleeve is slidably disposed radially outwardly of a radially inward portion of the female valve body, and the resilient interlocking element includes at least one flexible finger element formed by the radially inward portion of the female valve body, the at least one flexible finger element being configured to interlockingly engage with the sealing sleeve to permit the sealing sleeve to move between a forward and a rearward position within the female valve body, in which the flexible finger element has a stop that is configured to restrict further forward movement of the sealing sleeve beyond the forward position; or (ii) the sealing sleeve is slidably disposed radially outwardly of a radially inward portion of the female valve body, and the resilient interlocking element includes at least one flexible finger element formed by a portion of the sealing sleeve, the at least one flexible finger element being configured to interlockingly engage with the radially inward portion of the female valve body to permit the sealing sleeve to move between a forward and a rearward position within the female valve body, in which the flexible finger element has a stop that is configured to restrict further forward movement of the sealing sleeve beyond the forward position.

24. A male nipple for a quick connect/disconnect coupling, comprising:
- a male valve body extending along a longitudinal axis, the male valve body having an axially extending through-passage;
- a flow sleeve axially moveable within the male valve body between a closed-position, which restricts fluid flow through the male valve body, and an open position, which permits fluid flow through the male valve body; and
- a resilient interlocking element configured to slidably secure the flow sleeve within the male valve body; wherein:
- (i) the resilient interlocking element includes at least one flexible finger element formed by a portion of the flow sleeve, the at least one flexible finger element being configured to interlockingly engage with the male valve body to permit the flow sleeve to move between a forward and a rearward position within the male valve body, in which the flexible finger element has a stop that is configured to restrict further forward movement of the flow sleeve beyond the forward position; or
- (ii) the resilient interlocking element includes a plurality of spring legs that are disposed circumferentially about at least a portion of the flow sleeve, the plurality of spring legs being configured to interlockingly engage with the male valve body to permit the flow sleeve to move between a forward and a rearward position within the male valve body; and wherein each of the plurality of spring legs is configured to have a radially outward bias, and each of the plurality of spring legs has a stop that is configured to engage the male valve body to restrict further forward movement of the flow sleeve beyond the forward position.

* * * * *